United States Patent [19]
Velasco et al.

[11] Patent Number: 6,115,823
[45] Date of Patent: Sep. 5, 2000

[54] SYSTEM AND METHOD FOR TASK PERFORMANCE BASED DYNAMIC DISTRIBUTED POWER MANAGEMENT IN A COMPUTER SYSTEM AND DESIGN METHOD THEREFOR

[75] Inventors: Francisco Velasco, Los Gatos; Xuyen N. Phung, San Jose; Phillip M. Mitchell, San Jose; Henry T. Fung, San Jose, all of Calif.

[73] Assignee: Amphus, Inc., San Jose, Calif.

[21] Appl. No.: 09/376,271

[22] Filed: Aug. 18, 1999

Related U.S. Application Data

[63] Continuation-in-part of application No. 08/877,140, Jun. 17, 1997, Pat. No. 5,987,614.

[51] Int. Cl.[7] .................. G06F 1/26; G06F 1/32
[52] U.S. Cl. ............... 713/322; 713/310; 713/323; 713/324; 713/300; 710/9; 710/16; 710/18
[58] Field of Search ................... 713/300–340; 710/8, 9, 10, 15, 16, 18

[56] References Cited

U.S. PATENT DOCUMENTS

| | | | |
|---|---|---|---|
| 4,316,247 | 2/1982 | Iwamoto | 363/707 |
| 4,317,180 | 2/1982 | Lies | 364/707 |
| 4,381,552 | 4/1983 | Nocilini et al. | 364/900 |
| 4,398,192 | 8/1983 | Moore et al. | 340/825.44 |
| 4,463,440 | 7/1984 | Nishiura et al. | 364/900 |
| 4,479,191 | 10/1984 | Nojima et al. | 364/707 |
| 4,545,030 | 10/1985 | Kitchin | 395/560 |
| 4,698,748 | 10/1987 | Juzswik et al. | 364/200 |
| 4,766,567 | 8/1988 | Kato | 364/900 |
| 4,780,843 | 10/1988 | Tietjen | 364/900 |
| 4,809,163 | 2/1989 | Hirosawa et al. | 364/200 |
| 4,823,292 | 4/1989 | Hillion | 364/707 |
| 4,841,440 | 6/1989 | Yonezu et al. | 364/200 |
| 4,963,769 | 10/1990 | Hiltpold et al. | 307/465 |
| 4,968,900 | 11/1990 | Harvey et al. | 307/296.3 |
| 4,980,836 | 12/1990 | Carter et al. | 364/483 |
| 5,025,387 | 6/1991 | Frane | 364/493 |
| 5,041,964 | 8/1991 | Cole et al. | 364/200 |
| 5,083,266 | 1/1992 | Watanabe | 395/275 |
| 5,123,107 | 6/1992 | Mensch, Jr. | 395/800 |
| 5,129,091 | 7/1992 | Yorimoto et al. | 395/750 |
| 5,167,024 | 11/1992 | Smith et al. | 395/375 |
| 5,175,845 | 12/1992 | Little | 395/550 |
| 5,201,059 | 4/1993 | Nguyen | 395/800 |
| 5,218,704 | 6/1993 | Watts, Jr. et al. | 395/750 |
| 5,222,239 | 6/1993 | Rosch | 395/750 |
| 5,247,164 | 9/1993 | Takahashi | 235/492 |
| 5,247,655 | 9/1993 | Khan et al. | 395/550 |
| 5,249,298 | 9/1993 | Bolan et al. | 395/750 |
| 5,809,263 | 9/1998 | Farmwald et al. | 395/309 |
| 5,987,614 | 11/1999 | Mitchell et al. | 713/300 |

*Primary Examiner*—Ario Etienne
*Attorney, Agent, or Firm*—Flehr Hohbach Test Albritton & Herbert

[57] ABSTRACT

In a computer system having a device and a communications link for communicating with the device. A method for dynamically managing power consumption by the computer system comprises associating a particular device identifier with the device. Communications are monitored over the communications link to determine whether the communications include the particular device identifier. A clock input is withheld from the device when the communications do not include the particular device identifier. Clock input is provided to the device only when the communications include the particular device identifier. The clock input causes the device to transition from a non-operational power conservative state to an operational state wherein the device consumes more power than in the non-operational state. A performance requirement is established for a task to be executed. Clock frequency is dynamically controlled according to the performance requirement established for the task being executed.

4 Claims, 44 Drawing Sheets

DISTRIBUTED POWER MANAGEMENT TIMING DIAGRAM

FIG. 24
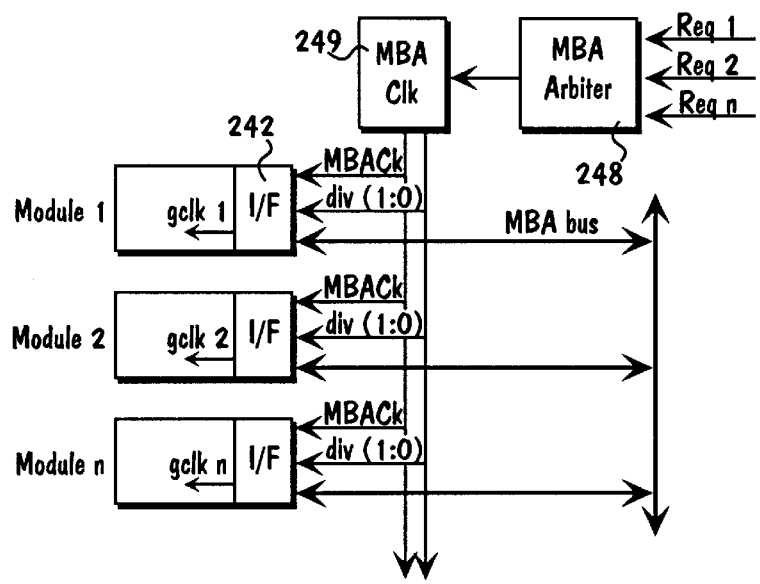
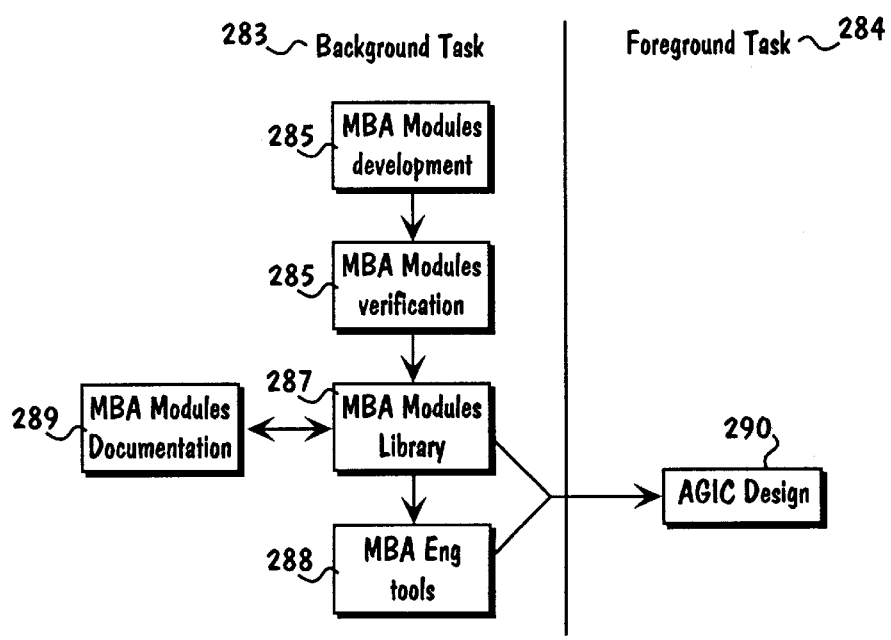
FIG. 25

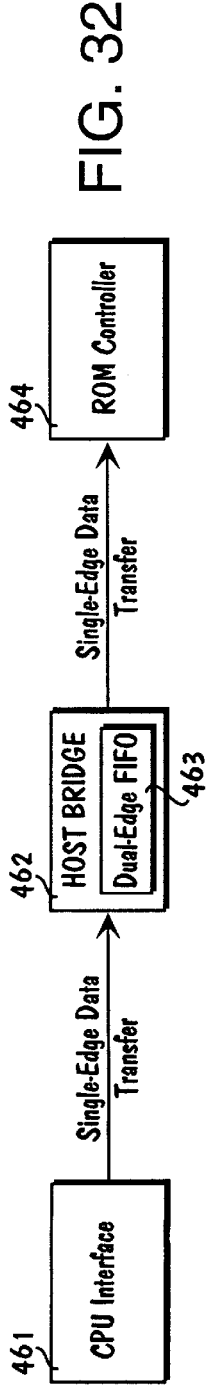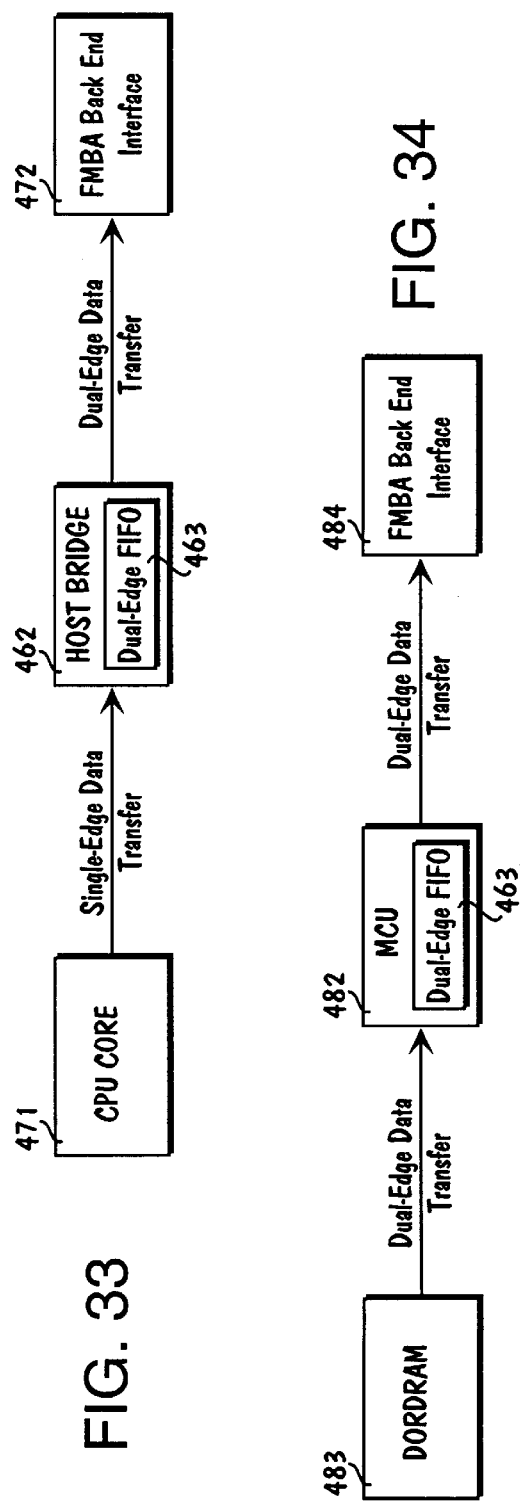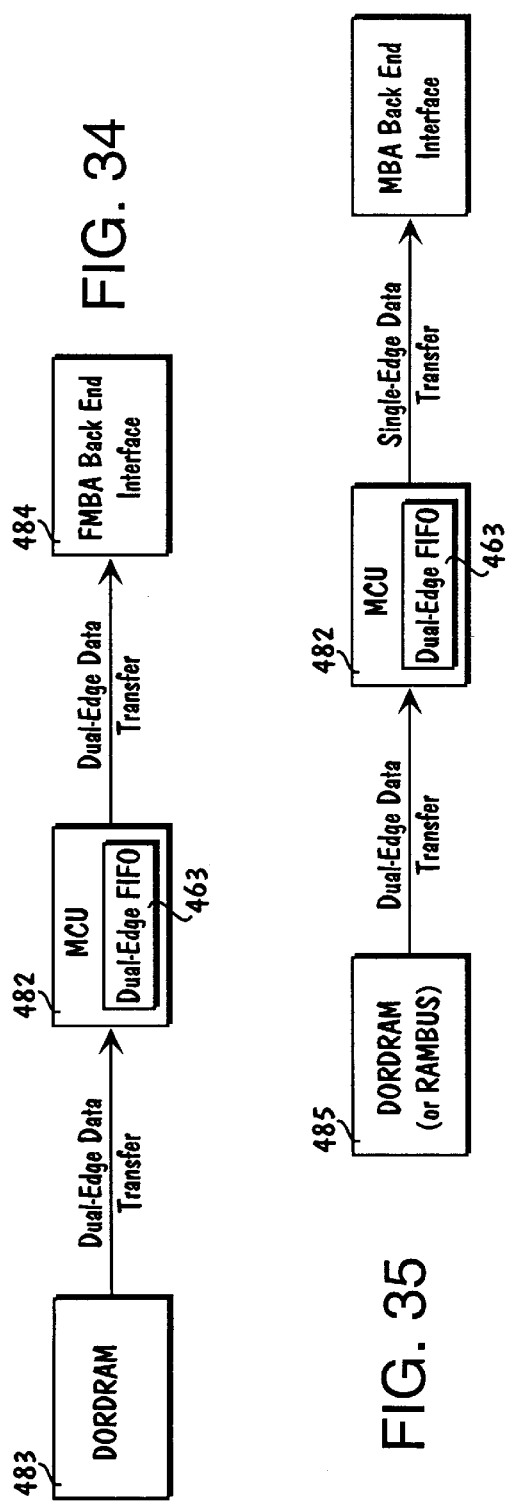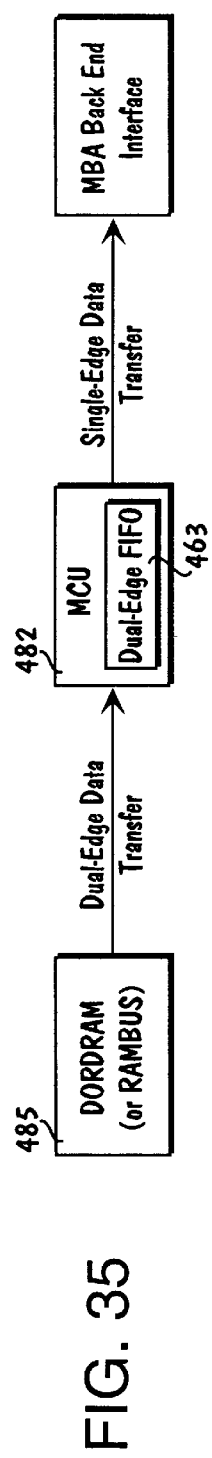

SYSTEM AND METHOD FOR TASK PERFORMANCE BASED DYNAMIC DISTRIBUTED POWER MANAGEMENT IN A COMPUTER SYSTEM AND DESIGN METHOD THEREFOR

RELATED APPLICATIONS

This patent application is a continuation-in-part application of U.S. patent application Ser. No. 08/877,140 filed Jun. 17, 1997, now U.S. Pat. No. 5,987,614, issued Nov. 16, 1999 and hereby incorporated by reference in its entirety.

FIELD OF THE INVENTION

This invention pertains generally to the field of computer system power management, and more particularly to a distributed power management system and method wherein power management functions are delegated to individual modular subsystems or functional components within the overall computer system.

BACKGROUND OF THE INVENTION

Power management has been, and continues to be, a major concern in the development and implementation of battery powered or battery operated microprocessor based systems, such as laptop computers, notebook computers, palmtop computers, personal data assistants (PDAs), hand-held communication devices, wireless telephones, and any other devices incorporating microprocessors in a battery-powered unit, including units that are occasionally battery powered, but that also operate from a power line (AC) source. The need for power management is particularly acute for battery-operated single-chip microcomputer systems, where the desirability or requirement for overall reduction in physical size (and/or weight) also imposes severe limits on the size and capacity of the battery system, and yet where extending unit operating time without sacrificing performance is a competing requirement. Conventional methods for power managing these types of systems have typically been based on a centralized power management unit architecture.

For example, in an exemplary conventional centralized power management unit 20, such as that illustrated in FIG. 1, an activity monitor 21, monitors accesses to specific system resources, such as access to serial ports 31, parallel ports 32, a display subsystem controller 33, memory controller 34, keyboard controller 35, and like resources. Such activity monitor 21 may be implemented in hardware or software, and in either case may be configured (such as by hard wiring, firmware, or software) to accommodate specification of a particular system resource address range or ranges to be monitored. The centralized power management unit (PMU) passively watches activity on the bus concerning other system resource units. The occurrence of one or more pre-identified addresses or address ranges on address bus 26 is recognized by the activity monitor, which in turn operates to trigger a particular predetermined action, such as to alter the operating state or mode of one or more system devices to affect a change in the power consumption state of the system.

In one conventional power management system, five operating states are provided: ON, DOZE, SLEEP, SUSPEND, and OFF. These names are not uniformly standardized, but each of the DOZE, SLEEP, and SUSPEND modes represents intermediate power consumption states between fully ON and fully OFF. By way of example, under one set of rules, in the ON state, the bus clock may operate at fall speed, the LCD display system may be ON, memory may be ON, and the system as a whole may be ON. In the DOZE state, the bus clock may be slowed or stopped, the LCD is ON, memory is ON, and the system is ON. The SLEEP state provides a bus clock which is either slow or stopped, as compared to the full speed bus clock, the liquid crystal display is OFF, memory remains ON, and the system as a whole remains ON and responsive. In the SUSPEND state, the bus clock is typically stopped, the liquid crystal display is OFF, memory is ON, but the system as a whole is OFF. Maintaining memory in the ON state is important for rapid resumption of processing, such as when a keyboard key is struck by a user to reinitiate input processing on the computer system. Finally, in the OFF state, the bus clock is stopped and the subsystem power supply to the LCD, memory, and system are OFF.

Other conventional centralized power management systems may implement more or fewer states or power consumption modes, and such systems may control power delivery to devices and/or modify clock frequency.

Activity masks 22 may also be provided, and, when present, permit control of which of the monitored system resources will generate an activity indicator when accessed. Such activity indicators are used to control transitions of the computer from one state to another, such as, for example, in the context of the exemplary system described above, a transition from SLEEP state to the DOZE state, or the ON state, in response to a user of the computer making a keyboard key entry. When activity masks are implemented, those resources which are to be monitored for activity are unmasked, and those resources which may be ignored and are not monitored are masked. Some implementations provide a unique activity mask for each power management state.

Activity timers 23 may also be provided. The activity timers are typically initialized by software to specify the amount of "idle" time which may be allowed to elapse before moving to the next (typically lower) power consumption state. The value of the idle time may typically vary for each power state or state transition, but tends to be defined as the following order of magnitude timings: a power state transition from ON to DOZE is implemented with a first idle time of between about 1 millisecond ($1 \times 10^{-3}$ seconds) and some small number of seconds, for example, from about 1 to about 30 seconds. The transition from a DOZE state to a SLEEP state is typically implemented with a second idle time of seconds to one or a few minutes. And, the power state transition from SLEEP to SUSPEND state is typically implemented with a third idle time of a few minutes to several minutes. U.S. Pat. No. 5,396,635 herein incorporated by reference, includes a description of one particular power management system which has an activity monitor, and uses activity masks and activity timers.

Note that for a microprocessor operating at 200 MHZ, each clock cycle represents 5.0 nanoseconds ($5 \times 10^{-9}$ sec), and for a system bus operating at a 100 MHZ clock, each clock cycle represents 10 nanoseconds. Furthermore, it is noted that external memory access typically requires 40–60 nanoseconds, while internal memory may operate at the microprocessor clock rate. It is therefore easily appreciated that even the shortest conventional idle period of, for example 1 millisecond, is long compared to a system bus cycle (10 nanoseconds) by a factor of $10^5$.

In conventional computer power management systems, one activity timer, or timer value, is normally allocated per power management state. When unmasked activity is detected, the activity timer is reloaded or reset with the "time out" timing value programmed by software. Then, when the activity timer for a particular power management state expires, either an interrupt is generated to allow software to control the transition to the next power management state, or the transition occurs automatically by hardware control.

Transition from a lower power consumption state to higher power consumption state may occur relatively more quickly. For example, the operating state may transition directly from the SUSPEND state upon detection of a single keyboard key entry to the ON state, or such change may require a plurality of events for such transition to occur.

With further reference to FIG. 1, the power state block 24 controls the system power management state and interfaces to the clock control logic 25. Clock control logic block 25 receives a clock input signal (clock_in) at a first clock frequency ($f_1$) and controls the state of the output bus clock. Clock control 25 may pass the clock_in signal through, may slow the clock to a lower frequency ($f_2$), or may stop the bus clock for the entire system during certain low power consumption power management states. State transitions can be initiated by software, or can occur automatically in hardware when an activity timer expires.

Centralized power management architecture, such as that exemplified by the system in FIG. 1, has the disadvantage that, when the system is operating in a reduced power consumption state, an access to any unmasked system resource typically causes an exit (state transition) from that reduced power state to a higher power consumption state, and, in the worst case, it transitions to a full "ON" state independent of the access required. This transition may occur for all system resources independent of any actual requirement for participation by that resource at that time. Furthermore, since, in conventional systems, the finest timer resolution is typically controlled by the preset or programmed "idle" times which are measured and/or implemented in the millisecond or longer ranges, the computer system may need to wait unnecessarily to return to a lower power consumption or power saving state, even when access to a system resource is no longer required, or the required access cannot be made during a particular time interval due to multitasking constraints.

A further disadvantage from such conventional systems, is that system resource components receiving the bus clock continue to receive the bus clock signals at all times independent of any actual access to that resource, and that such signals are propagated to each and every component of the system. Because several hundred or several thousand gates are dynamically switching in response to the bus clock triggered transitions, independent of the actual access by the system of the resource, substantial power is consumed unnecessarily. This switching loss is particularly disadvantageous in current CMOS-based implementations where static operation has a much lower power consumption than dynamically switched operations.

Even for systems that may stop the bus clock propagation to certain devices during a very power conservative state (e.g. SUSPEND), propagation is typically either completely enabled or completely disabled, and when enabled, the clock propagates to all portions and circuits of each system resource without regard for functionality.

A further disadvantage of conventional systems which results in increased power consumption, pertains to the structure of the bus-to-device-interface interposed between a system bus and a particular system component.

A further disadvantage of conventional systems, particularly for software-based power management, is the delay associated with initiating access to a device which has been placed in a lower power consumption state. Once a device is placed in a reduced power consumption state, significant time delays (for example, delays on the order of tens of hundreds of micro seconds ($10^{-6}$ seconds) may be required to reconfigure the device for access.

SUMMARY

In one aspect the invention, structure and method are provided for controlling and thereby reducing power consumption in a computer system having a bus and at least one device coupled to the bus without sacrificing computer performance or inhibiting a computer user's rapid access to the computer. A unique identifier is associated with each device or resource associated with the computer, such as for example, memory, keyboard controller, mouse controller, input/output ports, and any other computer resource or peripheral. This unique identifier may typically be a device address or other device identifier such as a device serial number, network device address, and the like. Communications over a communications link such as a system or other parallel bus, serial bus, or wireless link, are monitored by each device for a predetermined time period to determine device identifiers communicated over communications link during that time period, and these identifiers (e.g. device addresses) are compared to the particular unique identifier associated or allocated to the monitoring device. Each device monitors the communications activity and is responsible for self-controlling its operating condition to minimize power consumption. Each device includes a first component which operates continuously so as to provide the monitoring functionality and a second component that operates in a low power consumption mode unless first component signals the second component that its operation is needed during that time period. The first component withholds a device operating input from the second component when none of the communicated identifiers match the particular device; and provide the device operating input to the second component when one of said communicated device identifiers match that particular device. The number of circuit components is reduced to a minimum in the first component so that the number of circuit elements which are continuously active are reduced. In one embodiment of the invention, the device operating input is a clock signal operating at the bus clock frequency. Power consumption is reduced due to the reduction in the number of circuits which are actively clocked. The inventive structure and method provide very fine temporal control of power consumption in the computer system.

In another aspect, the invention provides structure and method for a modular bus architectural (MBA) and fast modular bus architectural (FMBA) frames for System-on-a-Chip (SOC) designs including MBA/FMBA library modules that decrease design time. In another aspect, the invention provides structure and method for adjusting bus clock speed in accordance with bus activity and task performance requirements so that further control of power consumption in the system is achieved without sacrificing performance. In one embodiment, the clock rate is adjusted in accordance with preassigned performance factors associated either with a functional unit or with a task type so that the task completes within a desired time without unnecessary power consumption. In another aspect, the FMBA/MBA is provided with a configurable interface that provides alternative single-edge and double-edge First-In-First-Out buffers. Among other advantages, these FIFO structures permit interconnection of MBA/FMBA modules at the core logic level, MBA/FMBA block level, and chip level so that systems are readily and reliable designed and implemented with minimum redesign.

BRIEF DESCRIPTION OF THE DRAWINGS

FIG. 6 is a diagrammatic illustration of an exemplary subsystem for DRAM memory used with a display controller and the relationship between the bus interface, core logic, graphic port interface, I/O buffers and the like.

FIG. 15b is an exemplary timing diagram showing performance of a distributed power management system of the present invention during the same multitasking processing session as illustrated in FIG. 15a.

FIG. 24 is a diagrammatic representation of an exemplary embodiment of an MBA architecture providing dynamic control of MBA bus clock speed.

FIG. 25 is a diagrammatic representation of an embodiment of the inventive method providing separation between background task module design and foreground design of other modules.

FIG. 32 is a diagrammatic representation of an exemplary FMBA/MBA Host Bridge Unit (HBU) having a dual-edge FIFO and supporting single-edge data transfer from a CPU interface and single-edge data transfer from dual-edge FIFO to a ROM controller.

FIG. 33 is a diagrammatic representation of an exemplary FMBA/MBA Host Bridge Unit (HBU) having a dual-edge FIFO and supporting single-edge data transfer to a CPU core and dual-edge data transfer to FMBA back-end interface.

FIG. 34 is a diagrammatic representation of an exemplary MCU having a dual-edge FIFO and supporting dual-edge data transfer to a DDRDRAM (or RAMBUS) and single-edge data transfer to FMBA back-end interface FIG. 35 is a diagrammatic representation of an exemplary MCU having a dual-edge FIFO and supporting dual-edge data transfer to a DDRDRAM (or RAMBUS) and dual-edge data transfer to MBA back-end interface.

DETAILED DESCRIPTION OF EMBODIMENTS OF THE INVENTION

Figure 1:
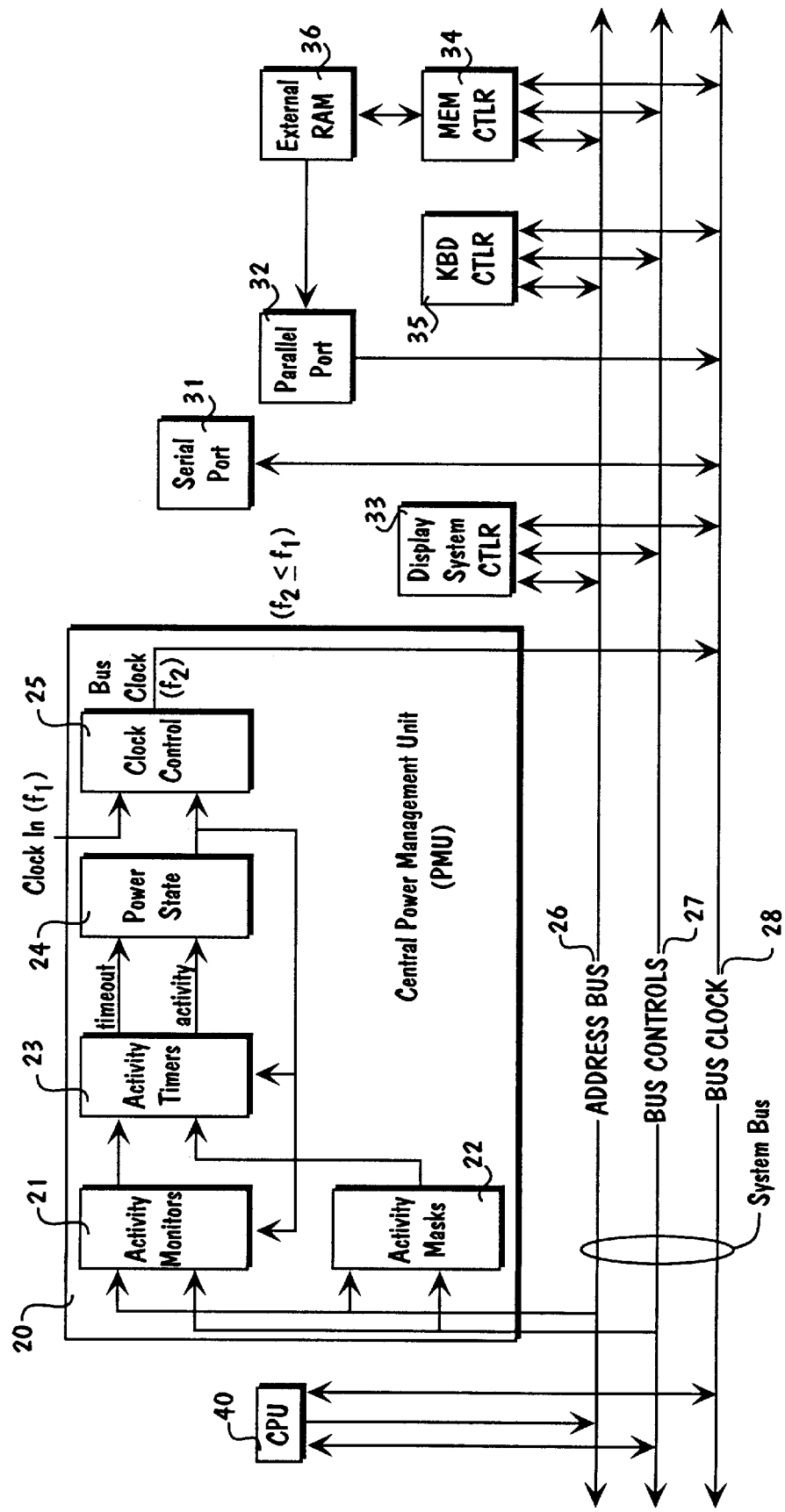
FIG. 1 is a diagrammatic representation of portions of a conventional centralized power management system.
Figure 2:
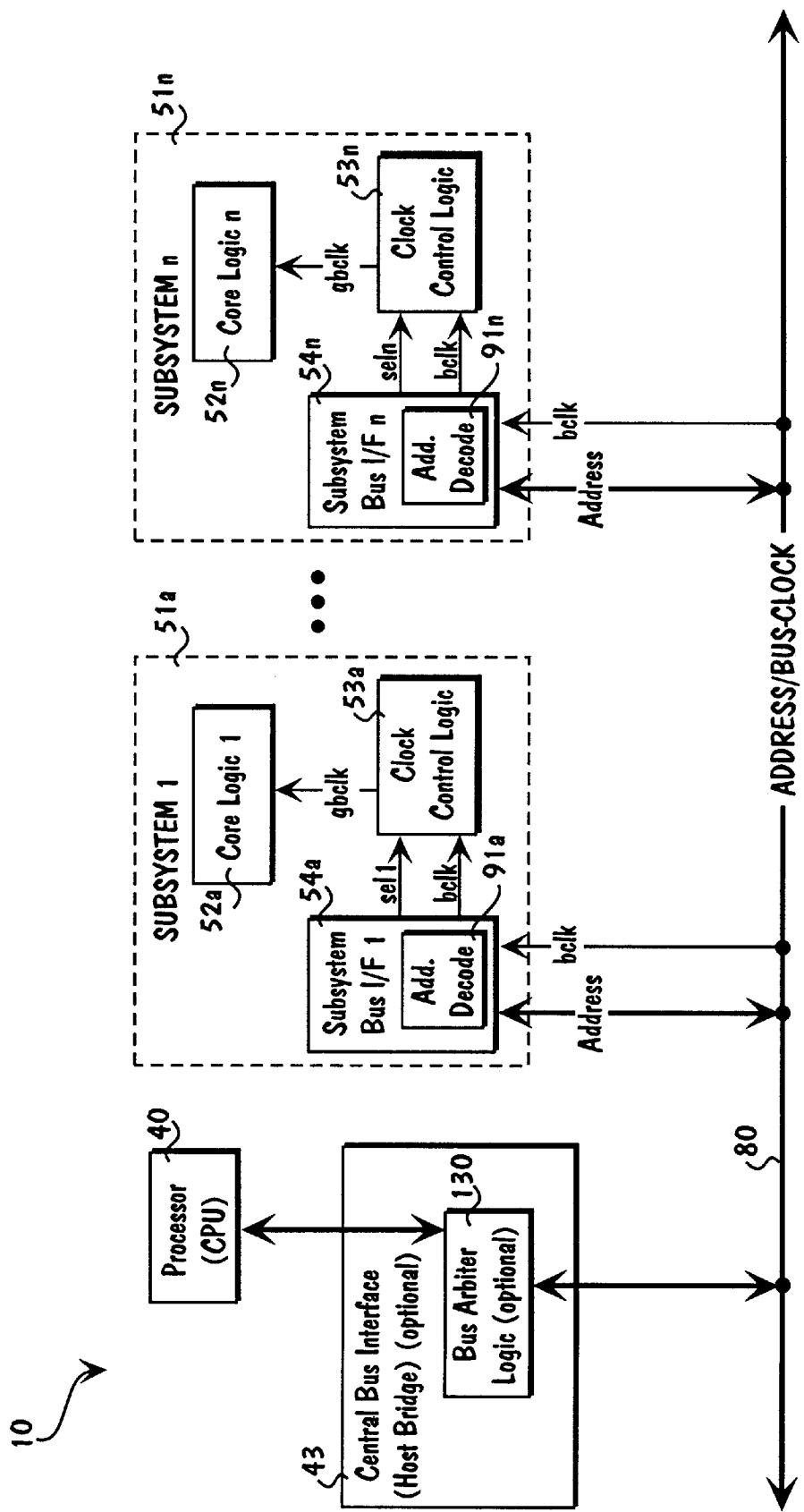
FIG. 2 is a diagrammatic representation of a first embodiment of a computer system implementing a distributed power management system according to the present invention.

The inventive distributed power management system (DPMS) and method (DPMM) is now described with respect to the exemplary implementation of a computer system 10 in FIG. 2. A host processor, microprocessor, or central processing unit (CPU) 40 (such as made by Intel, Advanced Micro Devices, Cyrix, Motorola, Apple Computer, for example) is coupled to the other system components via central or main system bus 80 which propagates control and data signals including bus clock signals (bclk) and address signals (add). An optional host CPU-to-central bus interface 43 (referred to as a host bridge) may also be provided to accept signals from CPU 40 over a host bus 41, and translate, reformat, adjust timing, or the like processing of these signals, prior to placing them on the system bus 80 (See FIG. 3 for additional details). Such bus interface 43 may optionally but advantageously be provided as a bridge circuit so that CPU 40 may be modified or replaced by alternative designs without requiring redesign of the peripheral circuits or subsystem modules, that is of subsystem 1, . . . , n. This advantageously allows modular system design and implementation and easier and lower cost upgrade path. However, neither the host bridge 43 nor the bus arbiter logic 130 within the bridge are required to realize the fundamental advantages of the DPMS and DPMM. Examples of modular architecture incorporating a central bus interface 43 and a plurality of connected modular subsystems is described subsequently in this disclosure. Note that recognition of the address occurs by the receiving subsystem which itself, independent of the CPU or other centralized power management unit, then initiates responsive action.

In simplest terms, processor 40 places device (subsystem) address and bus clock signals on central bus 80. Each subsystem 51a, . . . , 51n includes an address monitor/decoder unit 91a, . . . , 91n, which is connected to receive device (e.g. subsystem) addresses communicated over the bus 80 and decode them. When a received and decoded address identifies a device associated with or controlled by the particular addressed subsystem (e.g. subsystem 51a), the subsystem bus interface 54a generates a subsystem select signal (sel__1) which it communicates to clock control logic 53a within the subsystem along with the bus clock signal (bclk). Subsystem interface 54a and clock control logic 53a desirably have only a minimum number of logic elements since they are continuously active; core logic 52a contains the circuitry that actually performs the desired function and receives no clock unless actually accessed.

In a simple implementation, clock control logic 53a is merely a logical "AND" gate that receives the bus clock signal and subsystem select signal and passes or gates the bus clock signal (bclk) from subsystem bus interface 54a to core logic 52a when the subsystem select signal (seln) is enabled. Other more complex clock control logic implementations are described hereinafter that provide additional features and functionality. The bus clock signal may alternatively be provided directly to the clock control logic circuitry without passing through the subsystem bus interface 54a. It should be noted that both the subsystem bus interface 54a, . . . , 54n, and the core logic 52a, . . . , 52n, will typically be different for each subsystem unless duplicate subsystems are provided, and even in such instances each will have different assigned addresses. Furthermore, for the sake of simplicity of description, and so as not to obscure the invention, various data and/or control signals of conventional type and apparent to those workers having ordinary skill in the art are not shown or described in the embodiments of FIGS. 2 or 3. Exemplary configuration and structures for subsystems are described hereinafter in connection with preferred embodiments of the invention.

Figure 3:
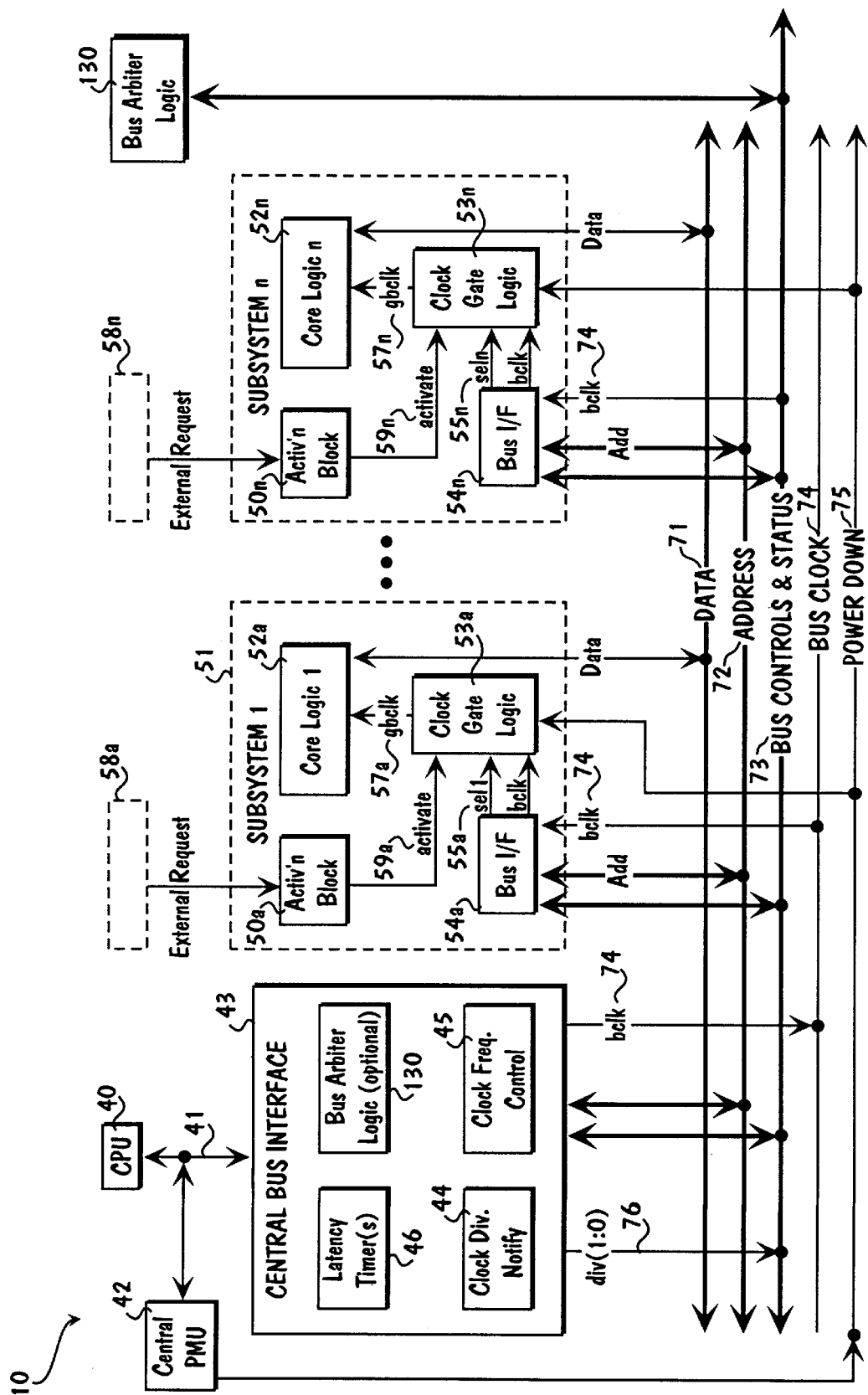
FIG. 3 is a diagrammatic representation of a second embodiment of a computer system implementing a distributed power management system according to the present invention and providing additional features.

A second embodiment of the inventive power management system and method is shown in FIG. 3, which includes additional features or enhancements beyond those shown and described relative to the FIG. 2 embodiment. The overall power management of the computer system 10 may optionally, but advantageously, also include a centralized power management unit 42 of conventional type. This embodiment also includes a central bus interface 43 having bus clock frequency control circuitry 45 and bus clock frequency change notification circuitry 44, the later two being useful to provide an overall decrease in power consumption as a result of slower switch frequency and fewer switch transitions, and to assist in the maintenance of any real time clocks, which may be present in certain of the subsystems 51c, . . . , 51n.

As used herein, the term "subsystem" means any circuit, device, component subsystems, or the like, that interfaces to the other computer system circuits, devices, system resources or components. Subsystems include but are not limited to for example, memory and memory controllers, display controllers and devices, processors, keyboard controller, mass storage devices, printer, scanner, video devices, CD ROMs, PC cards, modems, serial and parallel ports, and other input/output devices without limitation.

The DPMS delegates power management functions to each computer subsystem, and, in some implementations, to a bridge circuit in the Central Bus Interface 43, that forms a part of the component. Particular embodiments of the invention that include one or more "bridge" circuits to increase modularity of the computer system.

Advantageously, the microcomputer is a single-chip microcomputer wherein the busses communicating address data and control information (e.g. central bus 80) are formed and contained entirely on the common substrate of a single chip. Such an "internal bus" implementation is not pin-limited, and therefore multiplexing and/or de-multiplexing of signals (address, data, control, and the like) is not required. However, those having ordinary skill in the art in light of the disclosure contained herein, will appreciate that the inventive distributed power management system and method may be implemented for an "external bus" architecture wherein some signals, pins, or busses may require multiplexing and de-multiplexing so that excessive pin connections are avoided. It is noted that the Peripheral Component Interconnect Bus (PCI) is a pin-limited, external bus architecture, which requires multiplexing and de-multiplexing of signals at the interface, to which the inventive distributed power management system can be applied.

The inventive DPMS limits the amount of logic circuitry provided in each subsystem module so that power consumption by such logic circuitry is kept at a minimum level. For a computer system implemented with one, or with multiple, subsystem modules connected to an internal bus, such as subsystem 1, subsystem 2, . . . , subsystem n as shown in the embodiment of FIG. 3, a predetermined set of signals facilitates implementation of the distributed power management system and method. Other signals shown in FIG. 3, are not required and are optional, but are advantageously provided to implement additional system capabilities and power saving features.

As illustrated in FIG. 3, the bus interface logic 54a, . . . 54n of each subsystem module, runs off the bus clock signal (bclk) 74 which is generated by central bus interface block 43 and routinely derived from the CPU processor clock signal, albeit at a slower rate than the CPU clock, and each of the bus interface logic units 54n, continuously monitors activity, such as the occurrence of an address identified to that particular subsystem on address bus 72. During each bus access cycle, a particular subsystem module (referred to here as the current bus master), after having requested and been granted access to the central bus during that time period, drives valid address and command and control signals onto the address bus 72, control and status bus 73, which may be a common central system bus. The command and control may include status information such as the div(1:0) information.

When a subsystem module detects that a particular bus cycle requires access to resources within, or controlled by, that subsystem module, it asserts its subsystem module-select signal (seln identifying module "n") which in turn enables the clock gate logic 53n so that the gated clock signal (gbclk) passes to the core logic 52n of the subsystem module 51n, to which access is required.

For example, if access to resources within, or controlled by, subsystem 1 are required as indicated by detection of the address identifying that subsystem 1, the bus interface within subsystem 1 asserts its module-select signal (sel 1) to enable the clock gate logic 53 and provide gated clock signal (gbclk) to core logic 1, thereby causing core logic 1 to respond to the gated clock signal and commence operation and to effectively exit from its power consumption saving state or mode. After the bus cycle has finished, and access to that particular subsystem has completed for that particular bus cycle, the subsystem deasserts the select signal so that gated bus clock (gbclk) 57 is stopped, and the core logic component 52 of the subsystem then reenters its power saving mode. Note that power savings is achieved at the bus cycle level and that no formal status or mode transitions, such as might be controlled by a state machine, are involved or required. Of course those workers having ordinary skill in the art in light of the description contained herein will appreciate that the clock control logic may be implemented so that the gated clock signal is stopped or passed in response to either assertion or deassertion of the select signal, and that either logical high or logical low state may be used. The details of the clock gate circuit provides for glitch-free clock switching by using two stages of flip-flops that operate at both edges of the clock.

It should be noted that only the bus interface circuitry 54a, . . . , 54n and the clock gate logic 53 within each subsystem receives the ungated bus clock signal bclk 74, and that the core logic 52n does not receive the bus clock until selected. It is further noted that the bus interface 54n is advantageously implemented with a minimum number of gates so that only the minimum number of circuits, including logic gates, latches, flip-flops, and the like, receive clock signal and transition dynamically. Various embodiments of bus interface 54n are described in greater detail hereinafter.

The subsystem modules may also be connected to various external resources 58n which may require operation of the particular core logic 52n independent of activity on the bus 72. Such external resources may, for example, include communication interfaces such as modem interface (I/F) or RS232, or direct memory access peripherals (DMA) such as floppy disk controllers, or other external resources which generate asynchronous interrupts to the CPU to request service.

For subsystem modules having such external connectivity, receipt of an external request signal from the external resources 58n will result in generation of the activate signal 59n by an optional subsystem activation block 50n. In such implementations, circuitry is provided within the clock gate logic 53n to enable the clock gate logic and allow the gated bus clock signal 57n to reach the respective core logic 52n when externally activated. When the external request has completed, activate signal 59n is deasserted and provision of the gated bus clock (gbclk) to the core logic 52 is stopped or disabled.

Figure 4:
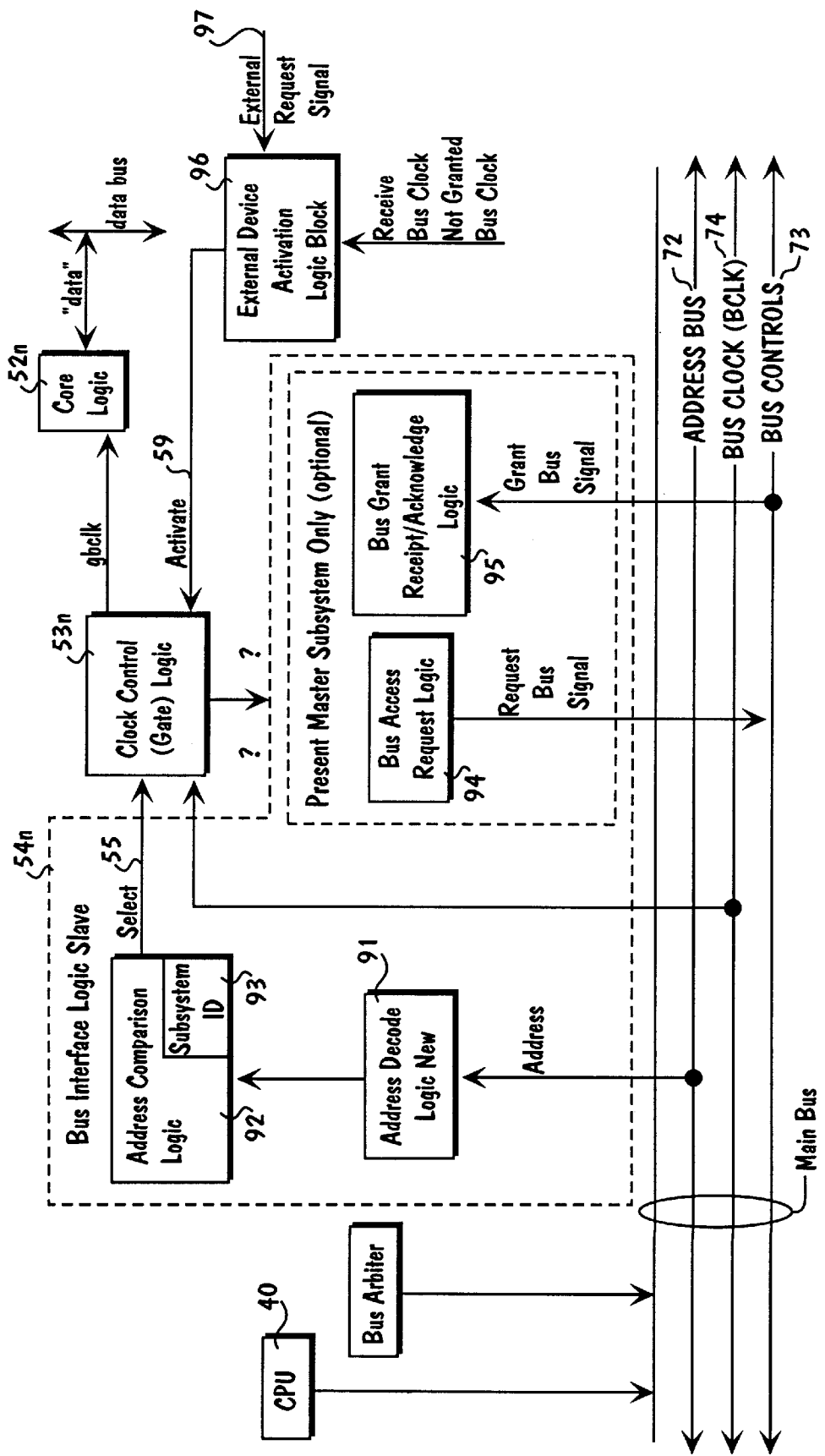
FIG. 4 is a diagrammatic representation of an exemplary subsystem bus interface logic block according to the invention.

The structure and process by which bus interface 54n recognizes various addresses and controls generation of the particular select signal 55n to the clock gate logic 53n and the structure and operation of a particular exemplary embodiment bus interface logic block 54n is now described relative to FIG. 4. In the simple embodiment earlier illustrated and described with respect to FIG. 2, the subsystem bus interface 54 was shown configured to receive address information and bus clock information from the central system bus 80, and to generate a sel_n signal (where "n" designate the subsystem unit selected), and communicate that sel_n signal to clock control logic 53. Furthermore, subsystem bus interface 54 received the bus clock signal 74 and communicated that bus signal to the clock control logic circuit 53.

An address decode logic block 91 is coupled to receive address information from the address bus 72 portion of the main bus, and to decode that address information in a conventional manner. For example, address decode logic 91 may include combinational logic, equality comparators and flip-flops. The decoded address is communicated to an address comparison logic block 92 which either stores a particular unique subsystem address or other identification 93, or receives that subsystem address identification from an external source. When the decoded address compares to, that it matches the stored subsystem address, bus interface logic 54 identifies the received address as matching the address of that particular bus interface unit. Of course, each subsystem n will have a different unique address. The select signal 55 is then communicated along with the bus clock signal to clock control or gate logic 53n. This clock control or gate logic 53n passes the gated bus clock signal to core logic 52n, thereby enabling operation of the core logic 52n as described elsewhere in this specification. Data paths to and from core logic 52n, are of conventional type and are not described further. In fact the inventive distributed power management structure and method are data and data path independent.

The address decode logic 91, address comparison logic 92, subsystem ID 93, and the select and bus clock signals are provided in the bus interface logic of both "slave" subsystems and "master" subsystems. However, in master subsystems, that is those subsystems which can initiate a request for bus access and receive a bus grant receipt or acknowledgment from the bus granting that particular subsystem authority to receive and/or transmit data or other information on the bus, a bus access request logic block 94, and bus grant receipt or acknowledgment 95 are also required. These two logic blocks are illustrated as optional components in FIG. 4 and transmit and receive request bus signals (REQ_n) and grant (GNT_n) bus signals respectively from a bus control or arbiter portion of the central system bus. Master subsystem configurations may generally be advantageous for devices such as Direct Memory Access Controllers (DMAC) which can transfer data from memory subsystems to I/O subsystems and visa versa without CPU intervention, high speed communication subsystems such as 4 Mbit Irda Controllers or USB controllers. Master subsystems are advantageously provided in an operations computer system, but are not required to implement distributed power management and conservation features.

An optional external device activation logic block 95, generally provided external to the bus interface logic 54, and which receives a request signal from an external device (such as for example, a DMA request input) and generates an activate signal which it communicates to clock Control Gate Logic 53 in order to control the gated bus clock signal (gbclk). One may also generate or otherwise provide an "activate" signal to clock control logic 53 to cause the clock control logic circuit to enable the gated bus clock to the core logic 52n.

This distributed power management system and method operates independently of any central power management process or control that may also optionally be provided, but may also be overridden by optional "power down" command, "power up" command, or other such control signal(s) as may be issued by central power management unit 42, CPU, or by other hardware or software derived control signal. In the embodiment illustrated in FIG. 5, the aforementioned power down command is input directly to the clock gate logic 53 and causes the gated bus clock (gbclk) that might otherwise be provided to core logic 52 to stop. It should be noted that in this particular embodiment, the power down command signal does not withhold operating power, such as transistor bias voltages, $V_{cc}$ voltage, or the like, but rather stops communication of the bus clock signal to the respective core logic elements so that power consumed by switching is reduced. However, those workers having ordinary skill in the art will appreciate that this distributed power management system and method may be extended to provide additional power conservation features on a subsystem by subsystem basis. Selection of one or more subsystem modules may alternatively be accomplished by control other than address monitoring.

The inventive distributed power management system (DPMS) and method (DPMM) provides power management with high temporal resolution so that power consumption is significantly reduced even during normal full-speed operation of the system. It also provides extremely rapid "transition" of devices (e.g. subsystem modules) from a non-operational power conserve state to a fully operational state. For example, transitions may occur as quickly as within about 10 nanoseconds for a 50 Mhz bus clock signal. It provides this power saving by enabling communication of the bus clock, or clock signals internal to the unit derived from the bus clock, only to the subsystem or subsystems which are actually being used during that bus cycle. In an architecture having a common bus structure that couples the CPU with each of the subsystems, such as that illustrated in the embodiments of FIGS. 2 and 3, only two of the subsystems can generally be active at the same time, that is, either providing or receiving information over the common bus during the same bus cycle. The remaining subsystems may therefore operate in a power saving mode during that bus cycle. Such power saving operation is not achievable with any other known conventional central power management system or method, including any hardware or software based system or method which may power manage by controlling the direction of operating power (e.g. circuit bias voltage or current) or clock signal to any one or more devices.

While conventional central power management systems and methods may provide some level of power conservation when the system is inactive, when certain resources of the system are inactive, or when the system is partially active, such central power management systems do not reduce power consumption when the system is operating in its normal mode or state. In most such systems, normal mode or state comprises maximum possible processor and peripheral bus clock speeds, display on, disc drive controller active and disc spinning, and the like. By comparison, the inventive distributed power management system and method provides a deeper level of power saving, including all of the benefits of the aforementioned conventional forms of power conservation when the system is inactive, when certain of the resources are inactive, and when the system is partially active, and further provides significant reduction of power consumption when the system is operating in its normal mode or state. The manner which these significant further reductions of power are achieved are described hereinafter. For example operation is described relative to the distributed power management timing diagram in FIG. 13, relative to the multi-tasking timing diagrams in FIG. 14 and 15, and relative to the flow-chart diagram of FIG. 16.

Figure 5:
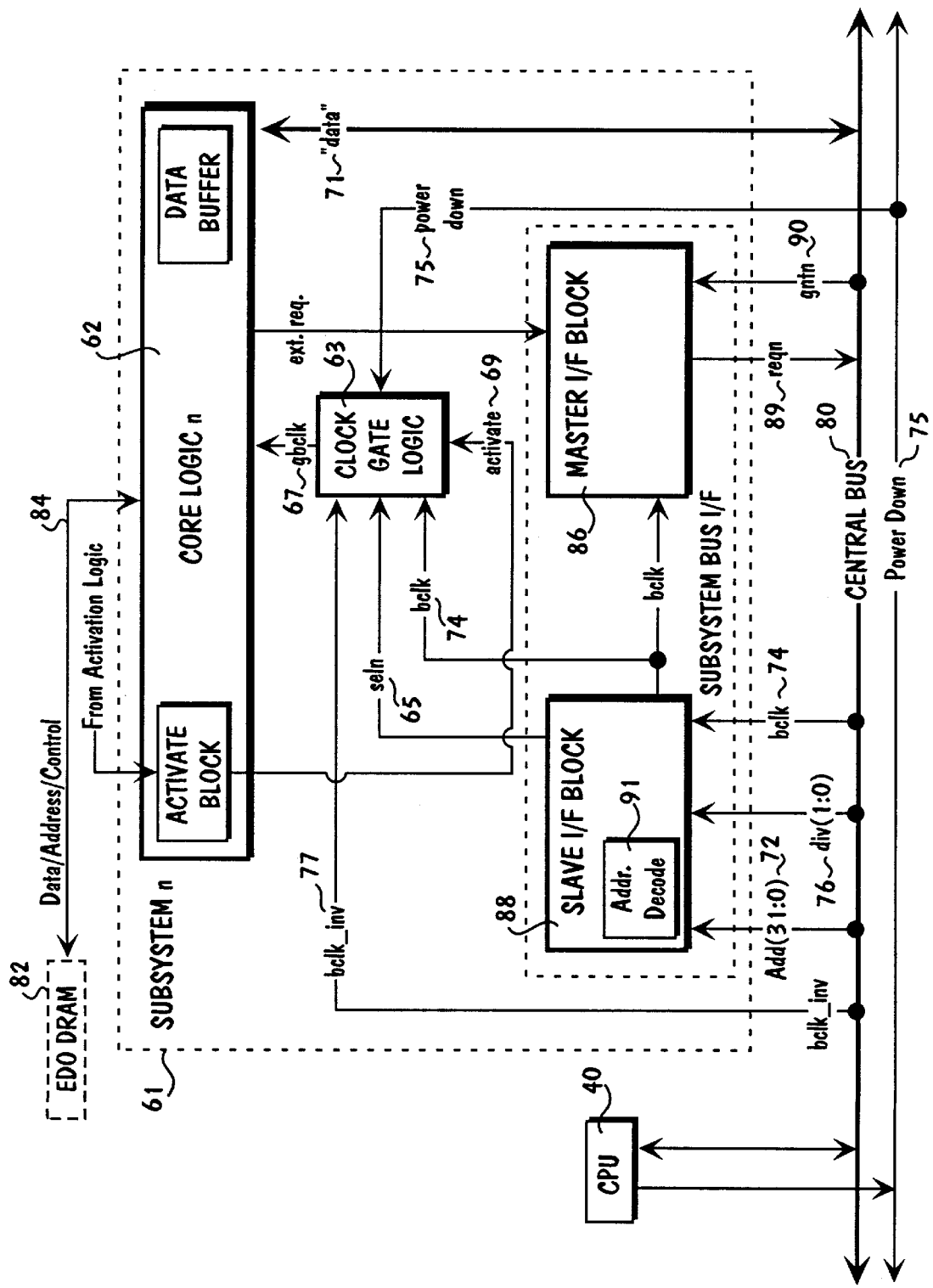
FIG. 5 is a diagrammatic illustration of an exemplary subsystem of the computer system illustrated in FIGS. 2 and 3.

An exemplary subsystem n is now described relative to FIG. 5. For the sake of simplicity, data bus 71, address bus 72 and bus control 73, as well as bus clock 74, are all shown as a single central bus 80 in FIG. 5. Power down signal 75 shown as a separate line in FIG. 5 could also be communicated over the common bus.

The inventive power management system and method may be implemented with any bus architecture including bus architectures having some or all of following characteristics: address bus; data bus, (multiplexed or non-multiplexed); control signals, such as (data flow control) and commands; timing signals, such as: bus clock, and bus access arbitration signals. Each subsystem or module interfacing to the bus should be compatible with the particular bus characteristics in conventional manner. For example, if the bus includes an N-bit address bus, then each subsystem module should be able to decode N bits or at least a sufficient number of those bits to determine whether the N-bit address propagated over the bus is identified to that particular module. An additional requirement is that the subsystem module must know when it is being addressed so it can be enabled and begin gating the bus clock to the core logic associated with that subsystem module. This later request is requested by the subsystem rather than the bus architecture itself.

In the exemplary subsystem module n shown in FIG. 5, the core logic n is shown controlling EDO DRAM 82 so that data, address, and/or control signals 84 may be communicated between the EDO DRAM 82 and core logic 62. Those workers having ordinary skill in the art will realize in light of the description provided herein, that the core logic may itself include EDO DRAM functionality and/or other functionality required or typically associated with operation of a computer system, and that such description here is not limited to subsystems including or controlling such EDO DRAM. EDO RAM is an external device controlled by subsystem n in FIG. 5. Each subsystem n may be either a "slave subsystem module" or a "master subsystem module" as described herein before. A "master subsystem module" is capable of requesting bus access via a request bus signal (req_n) 89, and of receiving a grant bus (gnt_n) signal 90 from the system. A "slave subsystem module" may not request or be granted bus access, but merely responds to such requests by other master subsystem modules. A master subsystem module may desirably be provided where external requests for the core logic are to be provided. The CPU 40 is effectively operates on a master subsystem in the context of this invention. It requests and is granted bus access, and where present is generally subject to bus arbitration rules. Where desired, the CPU may be subject to different bus priorities than other subsystem modules, particularly if there are a relatively large number of other subsystems.

Each master subsystem module 61, comprises both master interface block 86 and slave interface block 88, but a slave subsystem module does not include the optional master interface block 86. In any event, each of these master and slave interface blocks implement a minimum layer of logic to monitor addresses communicated over the bus during each bus cycle, or to initiate a request during a bus cycle in the case of a master interface block. By minimum layer of logic, we mean the smallest (or an optimally small) number of circuit elements (e.g. gates) so that operating this interface block continuously by providing operating power and bus clock signals does not result in excessive power consumption. For example, an interface layer for a slave module device may typically include about 50 gates and will not include the write/read buffers and the data phase of the cycle, which is typically included in conventional interfaces providing the same functionality, but without the inventive power conservation features. Such conventional interfaces may typically include about 1200 gates and consume a proportionately larger amount of power due to the larger number of clocked gates. Where required for operation of the particular subsystem, write buffers or read-ahead buffers are part of the core logic 62, and only consume significant power when the gated bus clock is active in the core logic.

Each slave interface block 88 includes an address decode portion 91 which receives addresses 72 communicated over central bus 80, and makes a determination whether such received address identifies that particular subsystem. If that subsystem is identified for access, slave interface block 88 includes circuitry to generate or enable a subsystem select signal 65, which is communicated to control gate logic 63. As described elsewhere in this specification, control gate logic 63 processes both the select signal 65 and bus clock 74 signal to provide the gated clock signal 67 which is to core logic 62. Alternatively, the activate logic block (See, for example, FIG. 5) may generate an activate signal 69 either as a result of an external request, for example by a refresh request signal (REFREQ) or a liquid crystal display (LCD) request, which also results in generation of a gated clock signal to core logic 62 (See, for example, FIG. 6).

Figure 6:
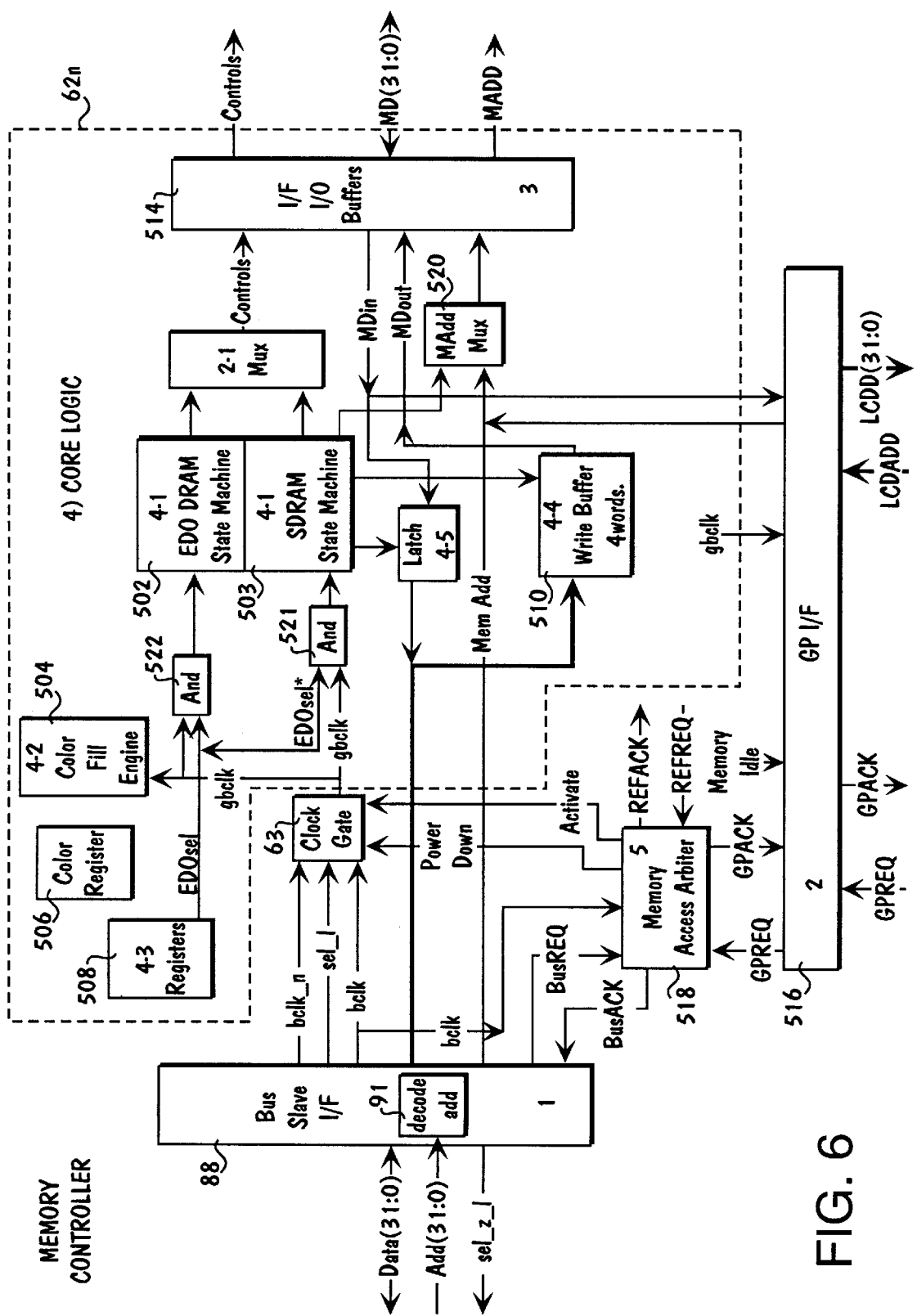

An alternative embodiment of the invention is now described relative to FIG. 6 which provides an exemplary function block diagram of a slave interface block 88 receiving an address (Add(31:0)) which is decoded by address decoder logic block 91. The Slave interface 88 provides bus clock signal (bclk) and a selection signal (sel_1) to the clock gate logic 63. Depending on the state of the selection line, and optionally on the states of the activate and/or power down signal lines, the bus clock is gated to core logic 62 in the manner already described relative to the embodiment in FIG. 5.

Here, the core logic 62 is an EDO DRAM and synchronous DRAM controller (SDRAM) and includes primary functional blocks as follows: EDO DRAM State machine 502, SDRAM state machine 503, color block fill engine 504, color registers 506, registers 508, write buffers 510, a memory data input latch 512, and a Memory Address Multiplexer 520. Core logic 62 also interfaces to an external DRAM interface 514. A Graphic Port interface 516 also operates off of the gated bus clock. This interface receives Graphic Port Request (GPREQ), acknowledgment (GPACK), and LCD addresses (LCDADD) and data (LCDD (31:0)). A memory access arbiter 518 generates an activate signal upon receiving a DRAM refresh request signal (REFREQ) or a graphic port request signal (GPREQ). The memory access arbiter 518 is an example of an external activation logic block 50 already described relative to the embodiment in FIG. 5. Operation of the EDO memory, Graphic Port Buffers, and the like, are conventional and not described further. Note, however, that the gated clock is propagated to and from the clock gate logic 63 to several AND gates 521, 522 which also receive the EDO select signal (EDOSEL) to control clock propagation to the two state machines and to the color fill engine. Where continuous propagation of the bus clock to a component of core logic is desirable, it may be so propagated albeit with some additional power consumption penalty.

The exemplary system already described relative to FIG. 3 also illustrated the manner in which the optional central bus interface 43 provides an optional clock frequency control block 44 to modify clock frequency, and clock division notify block 45. These two components are further options, even if a central bus interface is provided for other reasons. Clock frequency control block 44 provides circuitry for modifying the frequency of the bus clock, for example, for reducing the bus clock frequency by a selected predetermined divisor or factor (div). For example, if the bus clock nominally operates at a 100 Mhz frequency, the clock frequency control block may reduce the clock frequency by dividing by a factor such as 2, 3, 4, . . . , or m, to provide a reduced frequency bus clock signal, for example reduced from 100 Mhz to 50 Mhz, 33 Mhz, 25 Mhz, . . . on 100/m Mhz. Clock frequency reduction is beneficial for reducing power consumption of the system as a whole, and of reducing power consumption within any active subsystem. However, such clock frequency control by itself does not provide the advantages of the inventive system and method and the inventive system and method continues to provide power conservation even when operating at a reduced clock frequency.

To the extent that some subsystems may require maintenance of real-time clocks or functionality, the inventive system optionally but advantageously provides a clock division or clock frequency notification circuit 45 which communicates the frequency reduction or multiplication factor (div) from the notification block 45 within central bus interface 43 via a communication channel (either over the bus or via a separate wired connection) to each of the subsystem bus interfaces 54*n*.

As shown in FIG. 5, a "div (1:0)" signal 76 having two bits is provided from the central bus and received by slave interface block 88. This divisor signal may then be used either within clock gate logic 63 or directly by core logic 62 to maintain a real-time clock or other circuitry which must operate at a fixed (constant) frequency such as for a display subsystem which must continue to transmit data to the display at a fixed rate, for example 60 Hz. For these subsystems, the divisor signal acts as a notification that the frequency of bclk has changed, and by what factor. The subsystems may in turn modify their own internal clock divider circuits to adjust to the new bclk frequency. Consider, for example, a fixed frequency timer which generates an interrupt for system software to perform task switching or other related functions. If this timer must generate an interrupt every one millisecond and the nominal operating frequency of bclk is 100 MHZ, then the circuitry generating the interrupt must include a clock divider which divides bclk by a factor of 100,000, when bclk is operated at 100 MHZ, and divides it by a factor of 25,000 when bclk is operated at 25 MHZ.

Figure 7:
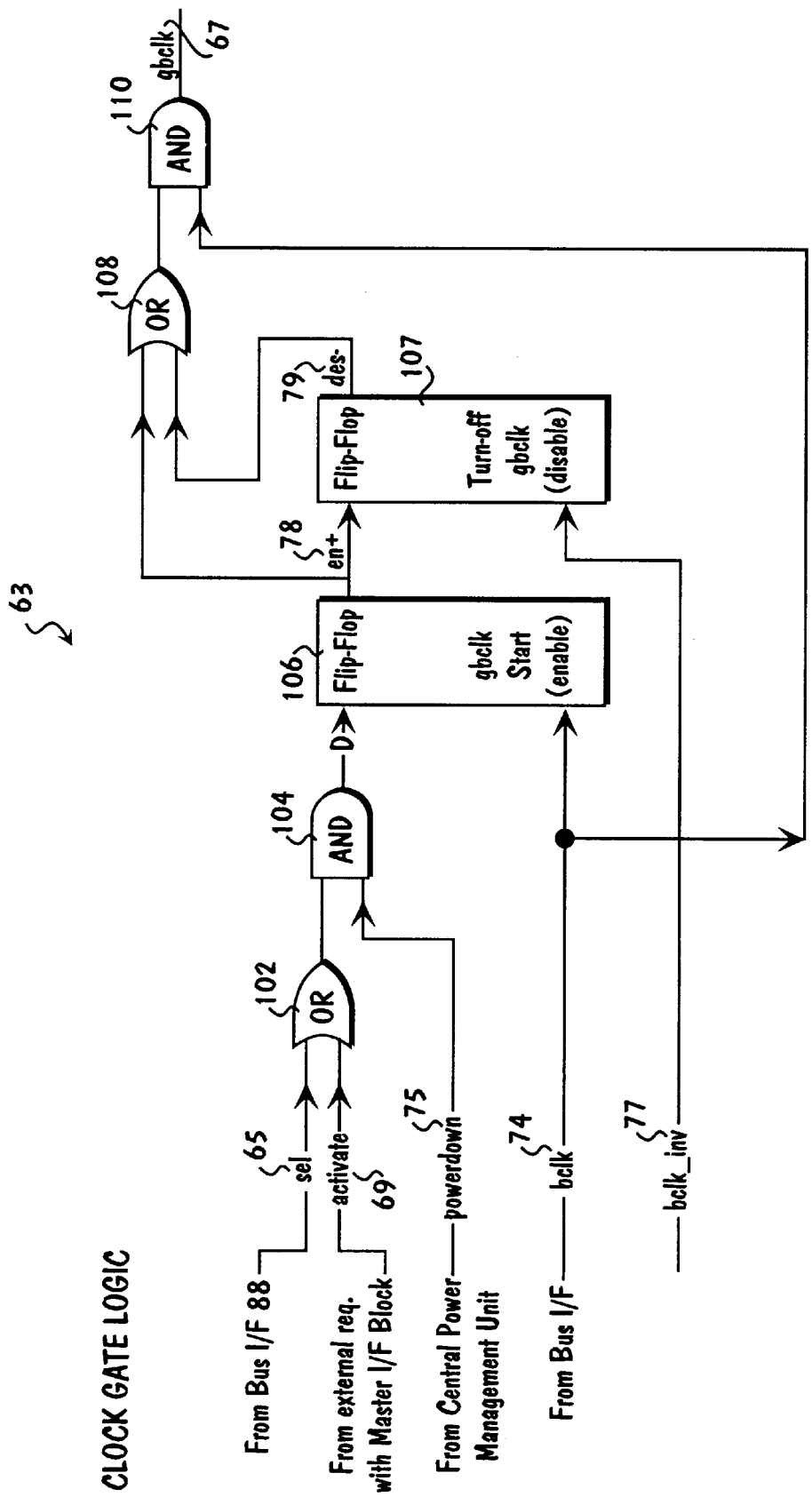
FIG. 7 is a diagrammatic illustration of an exemplary embodiment of clock gate control logic according to the present invention.

An embodiment of clock gate logic circuit 52*n* is now described with reference to FIG. 7. This description is by way of example only, as those workers having ordinary skill in the art in light of this disclosure will appreciate that there may be other ways to implement the clock gate logic circuitry of the present invention so as to selectively control transmission of the bus clock signal to the core logic.

Figure 8:
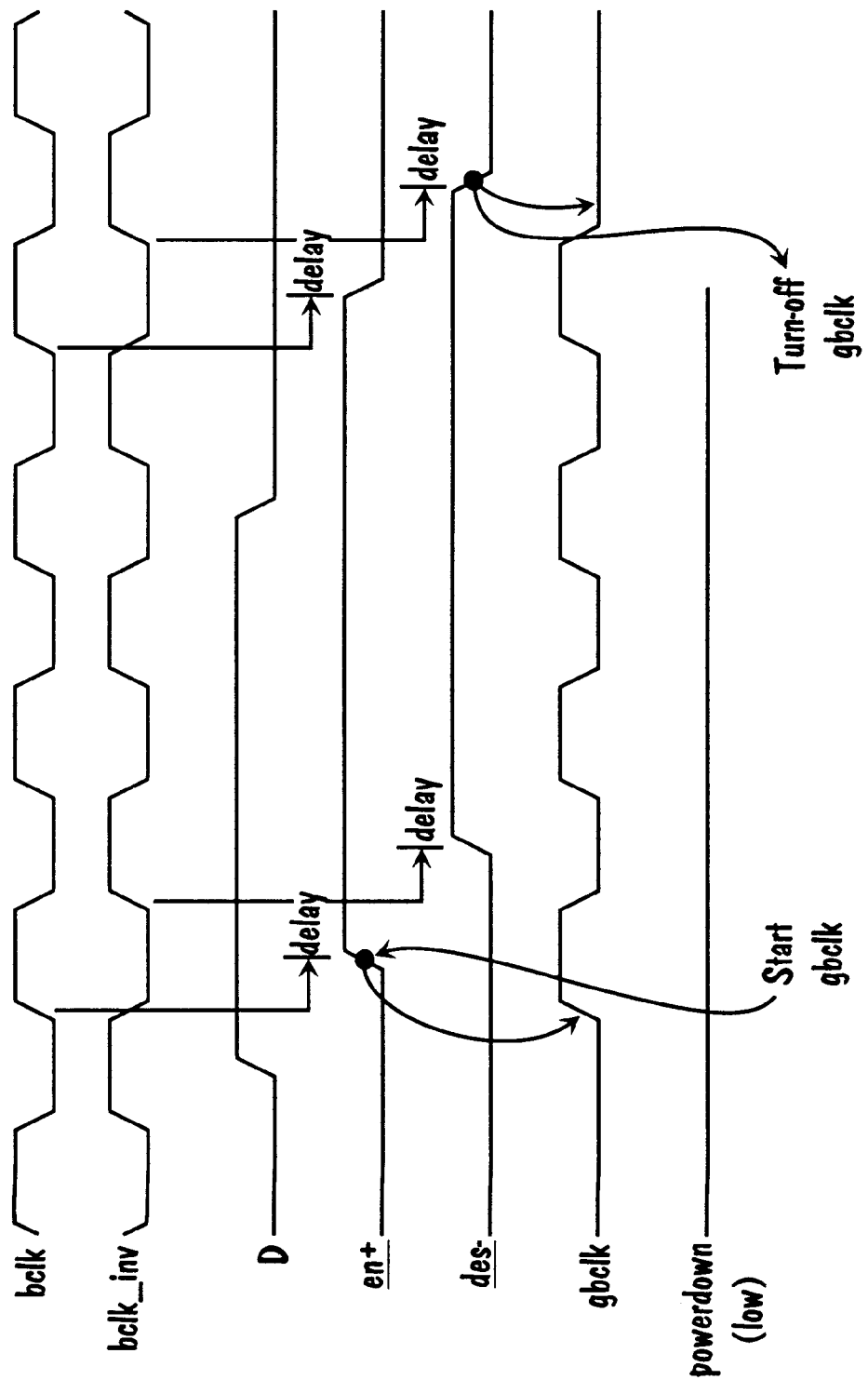
FIG. 8 is an exemplary timing diagram for the clock gate logic circuit.

The select signal (sel) 65 and activate signal 69 are received from a bus interface block 88 as earlier described, and input to OR circuit 102. Either of these signals may serve as an input to AND gate 104 to gate the bus clock. The output of OR 102 is communicated as a first input to AND gate 104 which also receives a power-down signal 75 (normally high or logical "1") so that the output of AND gate 104 (referred to as D in the figure), is high or logical "1", when it is desired to gate bus clock signal 74 to core logic 62. Flip-flop 106 receives the D output from AND gate 104 and bclk 74, so that when the D input is "1", en$^+$ appears at the output of flip-flop 106, but when the output of AND 104 is "0", the output of bclk 74 is suppressed and does not reach core logic 62. In the event that power-down signal 75 goes low (logical 0), the output of AND gate 104 is also "0", thereby suppressing appearance of the gated bus clock 74 at the output of flip-flop 106. The output of flip flop 106 is referred to as the en$^+$ (or enable signal) in the timing diagram of FIG. 8, since it is responsible for starting the gated clock.

A second flip-flop 107, OR gate 108, AND gate 110, and an inverted version of bus clock signal (bclk_inv) 77 is also provided for disabling or turning-off the gated clock. This disable signal is identified "des−" in the circuit of FIG. 7, and the timing diagram of FIG. 8. If the bus clock signal is used to disable the clock, a glitch in the gated clock will appear due to the delay of the gbclk with respect to the bclk. Therefore, an inverted version of the bus clock (bclk_inv) is used to turn off the gated clock as shown. The "en$^+$" signal of flip flop 106 is provided to start the gated bus clock (gbclk), and is clocked of the rising edge of the bus clock signal (bclk). The "des$^-$" signal from flip-flop 107 is provided to stop gbclk, and is clocked off the rising edge of the inverted bus clock signal (bclk_inv).

Figure 9:
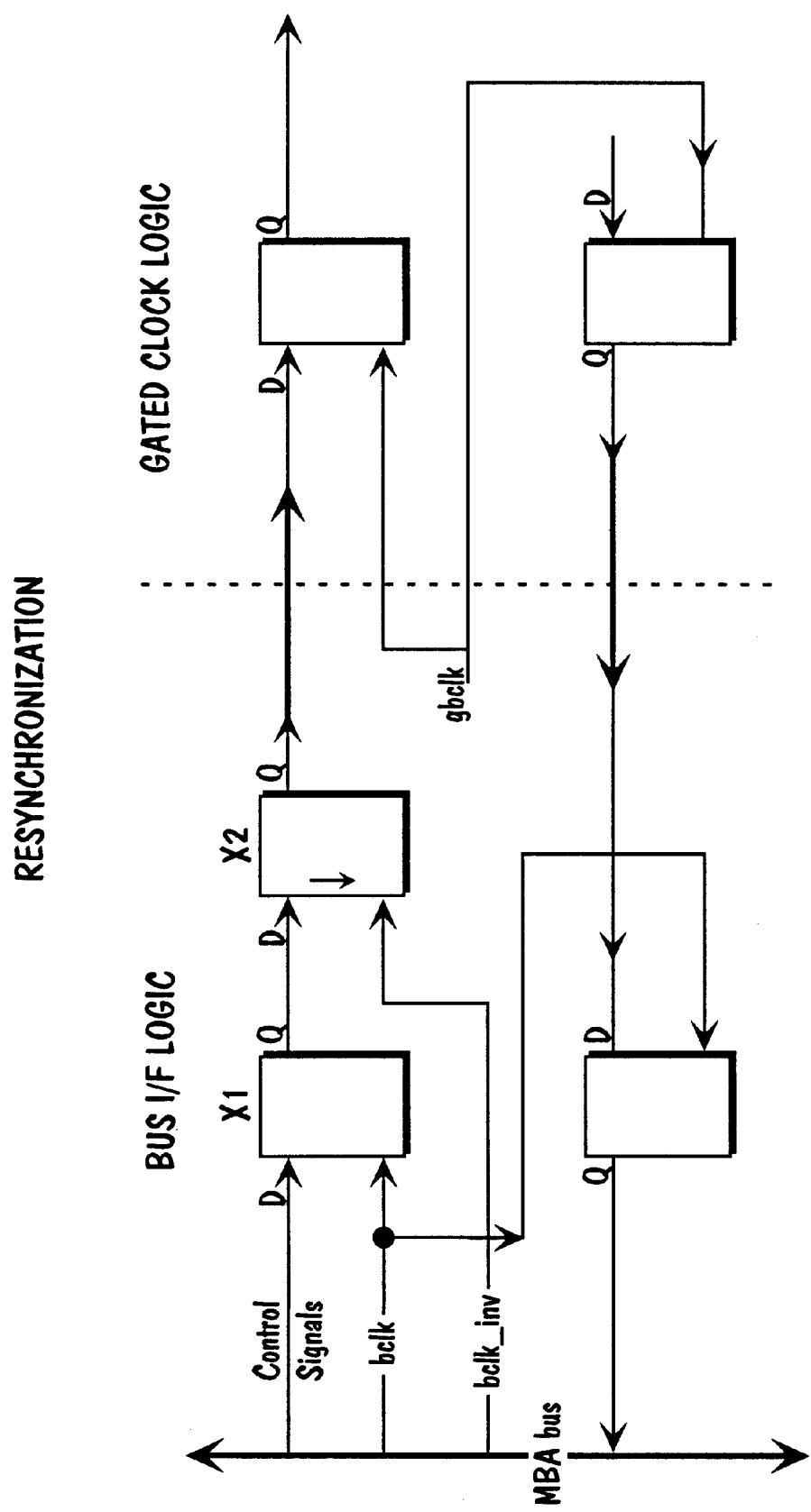
FIG. 9 is a diagrammatic illustration of exemplary resynchronization circuitry.
Figure 10:
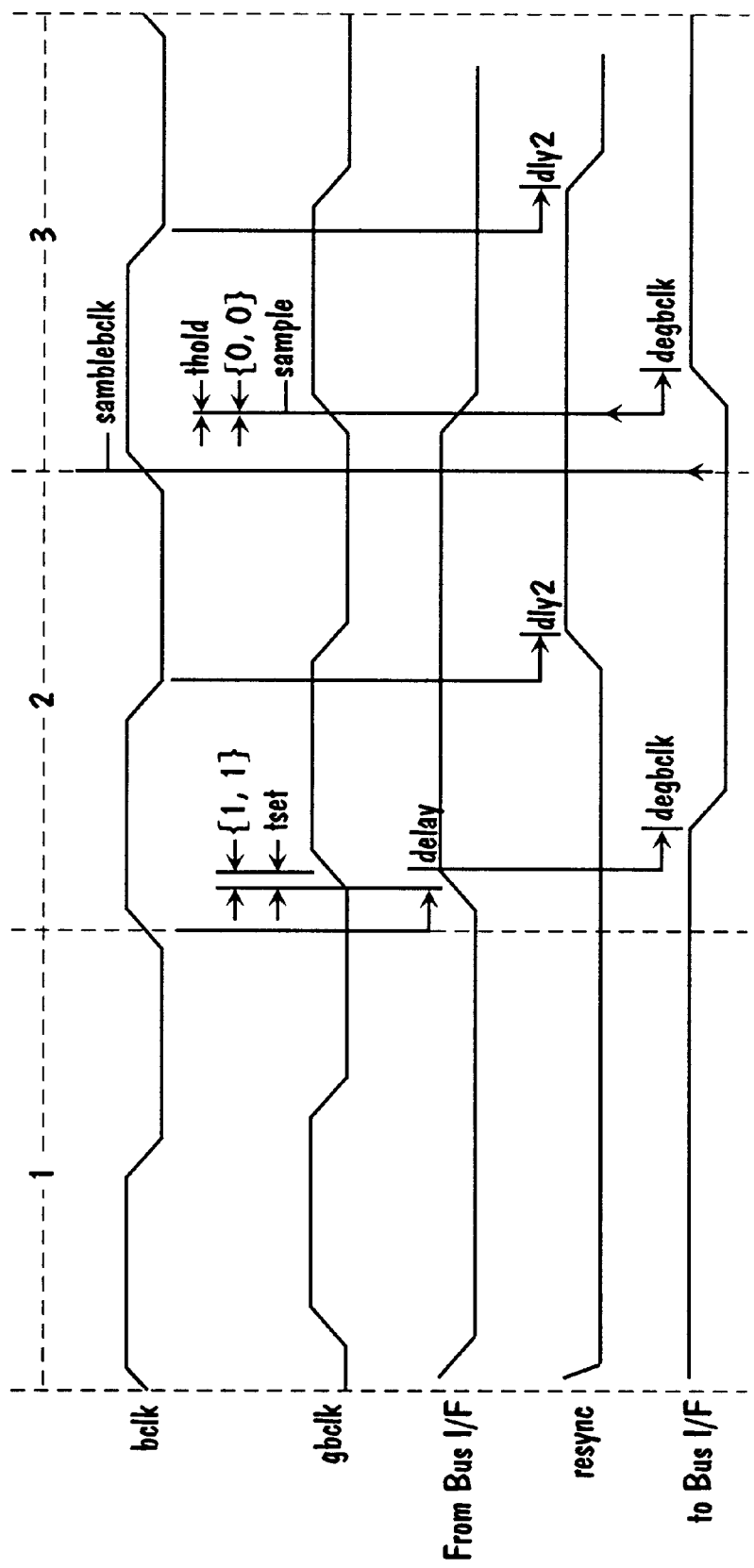
FIG. 10 is an exemplary timing diagram illustrating resynchronization timing.

Resynchronization of the control signals is now described relative to FIG. 9 and FIG. 10. The signal from the bus interface clocked by bclk may produce tset-up and thold timing violations if sampled with the gated bus clock as illustrated in FIG. 9. To avoid this situation, the signal is resynchronized using the inverted bus clock (bclk_inv) in the circuit of FIG. 8 to resynchronize in the manner illustrated in FIG. 9. This resynchronization optimizes performance of the system in an environment where the select clock is routinely passed or stopped. Signals that flow from the core logic to the main bus interface do not generally require resynchronization.

The advantages of the system and method for distributed power management are clearly evident in the power management timing diagram of FIG. 13, which illustrates the minimum period of time during which the gated bus clock signals (gbclk1, gbclk2, . . . , gbclkn) are communicated to each of subsystem modules 1, 2, . . . , n. Four signals are illustrated for each of the modules. The first bus clock signal (bclk) is a periodic signal having logic high portions T1, T2, and Ta, in a repeating periodic pattern. The intervals T1 represent the address phase of a main bus cycle, the portions T2 represent the data phase of a main bus cycle, and the intervals Ta represent the main bus turn-around time during which ownership of the bus changes. The illustration is consistent with the equal opportunity (fairness) bus access rule described hereinafter which allows each bus master a revolving access to the bus.

A second signal "cycle_z_1," is in a particular embodiment of the present invention a three-state active low signal driven by the particular subsystem master module currently having access to the central bus 80. A "master" subsystem module (here module 1) can assert the cycle_z_1 signal after a bus access request has been made and granted by a central bus arbiter 130, which controls current access to the bus 80 by the various subsystem modules or CPU 41.

Figure 11:
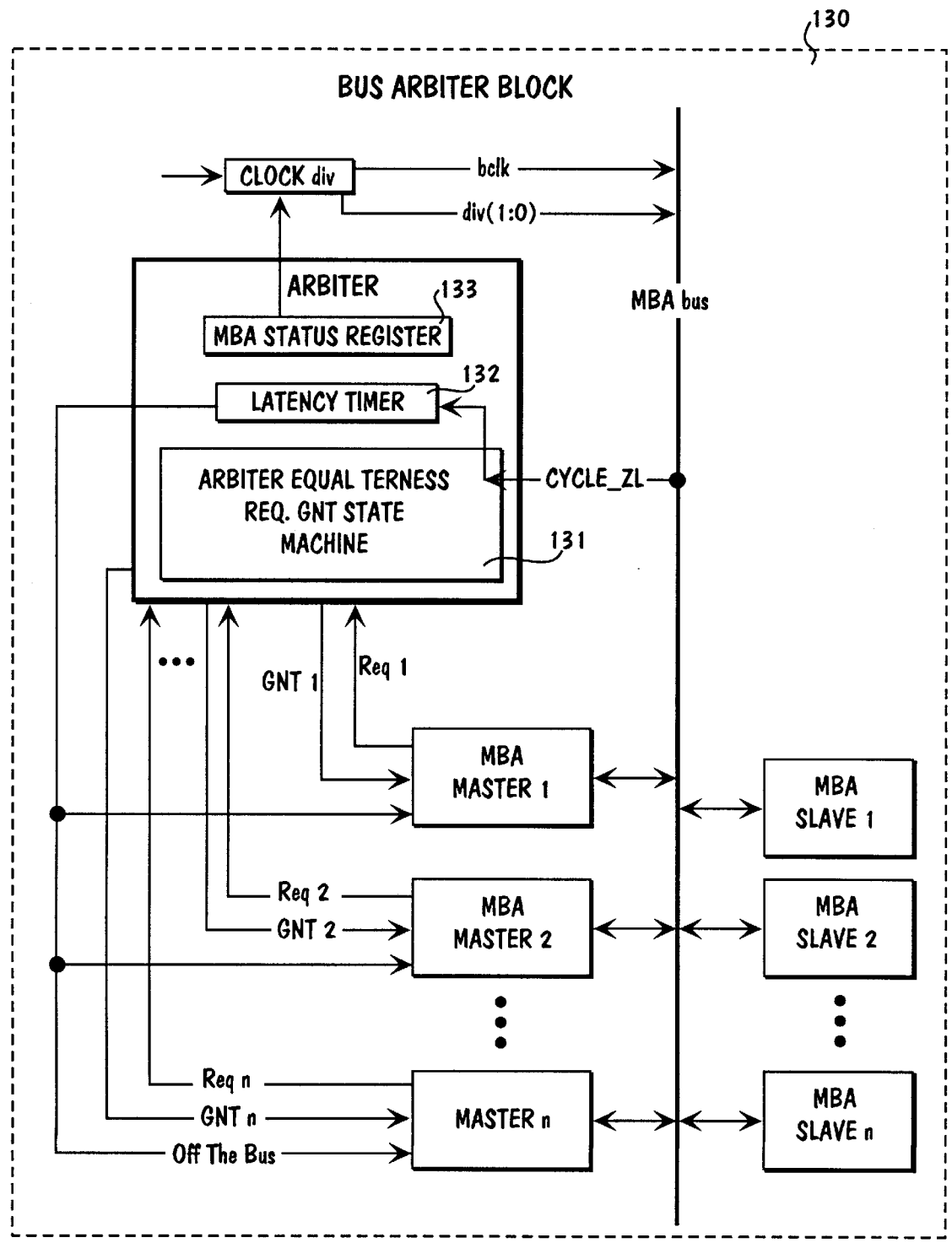
FIG. 11 is a diagram of an exemplary bus arbiter block diagram according to the invention.

Operation of the optional bus arbiter 130 is now described relative to an embodiment illustrated in FIG. 11. It should be noted that the bus arbiter is required for performance of certain main bus arbitration features and procedures that are advantageously incorporated into operational systems, however, the inventive distributed power management system and method do not require this particular or any other bus arbitration structure or operation.

With further reference to FIG. 11, arbiter block 130 desirably includes a request-grant state machine 131 block, a latency timer 132 block, and a main bus status register 133 block. Request-grant state machine 131 arbitrates from among one or more requests to access the main bus by the several master subsystem modules. Different priority schemes can be implemented according to various priority rule schemes. In one embodiment, the main bus implements an equal opportunity or fairness priority scheme, in which the master module that was last served will go to the bottom of the priority chain and all other modules will have a higher priority. This guarantees that each module will eventually be granted access before another module gets a second access. Other priority schemes may also be implemented.

Latency timer 132 monitors the maximum allocated time for a master to stay on the bus, and the number of bus clock cycles that cycle_z_1 stay asserted. In the event of a latency timer time-out situation, the latency timer will command the master to get off the bus with the OFFTHEBUS signal. Main bus status register 133 maintains status and monitors main bus activity, the result of this monitoring activity being feed to the bus clock frequency control or divider 45, which can slow-down or speed-up the bus clock signal (bclk) accordingly, and output the proper divisor signals (for example, div(1:0) or div(n:0)) signals from clock notify block 44 to the bus.

Clock divisor circuit 45 receives the raw bus clock signal and divides that signal by div(1:0) (or more generally by div(n:0)) and provides both the modified bus clock signal to the main bus and an indication of the frequency change in the form of the divisor so that any module maintaining a real time clock can maintain real-time clock integrity in spite of the clock frequency division.

Each master module (for example master1, master2, . . . , masterN is coupled to arbiter 130 so as to provide a bus access request signal (req_n) to the arbiter when access is desired, and coupled to receive a bus access grant signal (gnt_n) when access is granted to the particular module. As already described, latency timer 132 is coupled to receive a cycle_z_1 signal from the main bus and to generate and supply to any of the master modules the OFFTHEBUS signal when they have had ownership of the bus for more than a predetermined period of time. Slave modules are connected to the main bus but do not interact directly with the bus arbiter, they merely respond to requests communicated over the bus.

Figure 12:
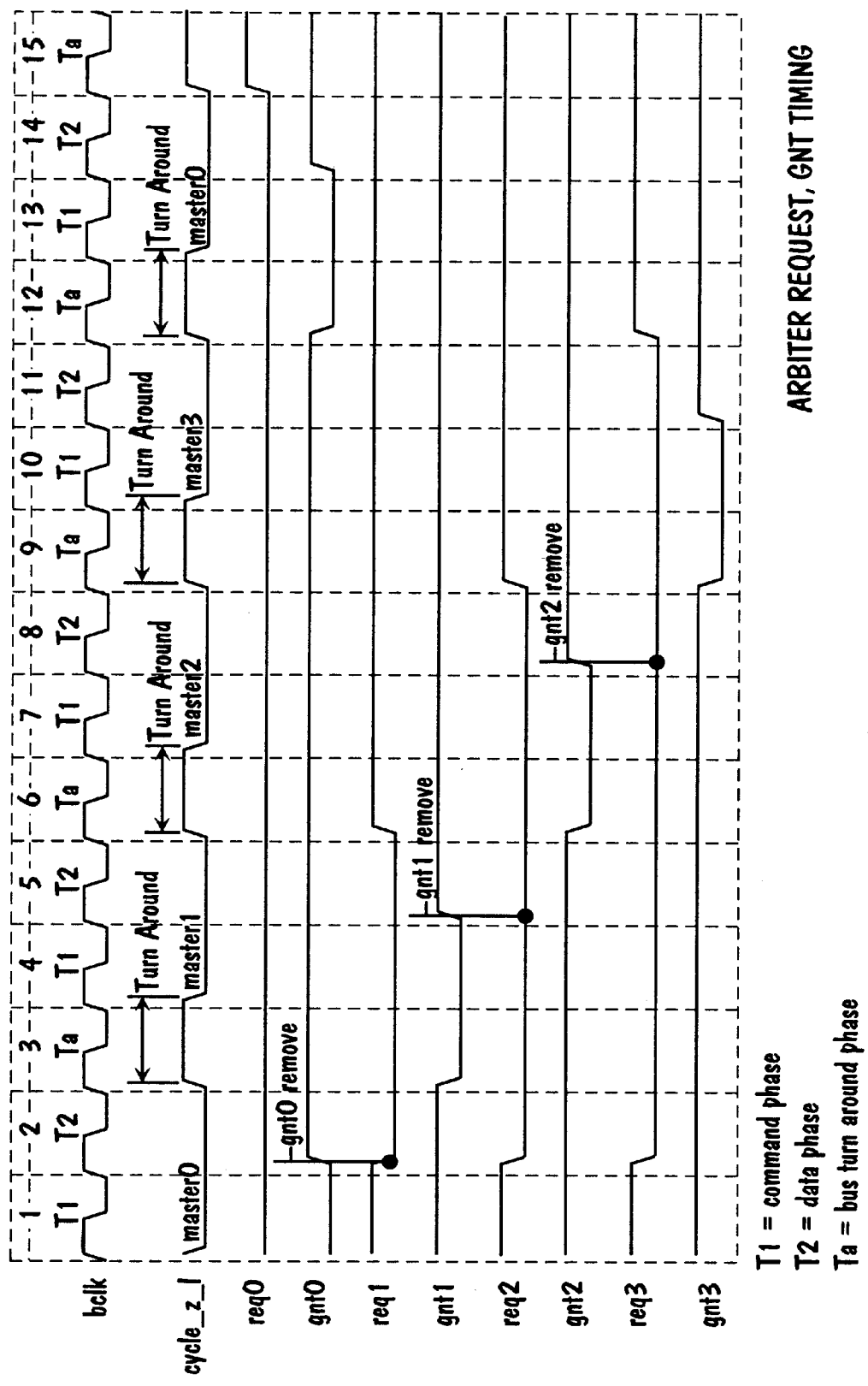
FIG. 12 is an illustration showing an exemplary arbiter block timing, including the timing relationships between the request and grant timings for several subsystems.

Arbiter bus access request and grant timing are now described relative to FIG. 12 which shows the functionality of the arbiter, in acknowledging the master subsystem request, and granting access to the bus according to the priority scheme described earlier. (Recall that Slave subsystem do not request bus access but merely respond to a request made by a master, or by the CPU.) In this example, master0 request the bus by asserting Req0 low "0". The first cycle is allocated to master0, and during that cycle, master1, master2, and master3 request access or ownership of the bus by asserting Req1, Req2, and Req3 low. At this point in time, the four masters are all requesting the bus. Because master0 was the last module served, according to the equal opportunity priority rule scheme, it will only be serviced next after masters 1, 2 and 3 have been serviced. The arbiter asserts the bus grant (GNT) signal one at the time, and then de-asserts the grant signal line after the master has started its allocated cycle. In FIG. 12, deassertion of the GNT line is indicated during the data phase at time T2 of successive bus cycles (e.g. cycles 2, 5 and 8), and assertion of the GNT line at is indicated by $T_a$ representing the bus turn-around time (e.g. at cycles 3, 6 and 9).

The cycle_z_1 signal is valid for the complete bus cycle. The logical "1" to logical "0" transition of the cycle_z_1 signal 152 flags or indicates the start of the bus cycle, and the logical "0" to logical "1" transition flags or signals the end of the cycle. Slave subsystem modules (as compared to master subsystem modules) only monitor this cycle_z_1 signal in order to enable a valid address decode at the start of each cycle T1. Recall that the address decode unit 91 is provided as a component of the bus interface 54 which initiates the process by which the bus clock signal may be gated to the core logic component of that subsystem to permit the desired access. The central arbiter 130 will also monitor the cycle_z_1 signal to determine when to assert or remove the master subsystem bus grant signal.

In addition, the arbiter can control latency timer(s) 46 and provide information to the power management logic through the bus status register 133 regarding central bus 80 traffic. The subsystem select (sel_1, sel_2, . . . , sel_n) signal generated by the subsystem bus interfaces 54n, have already been described relative to the bus interface and clock control gate logic as have the gated bus clock signals (gbclk1, gbclk2, gbclkn).

Figure 13A:
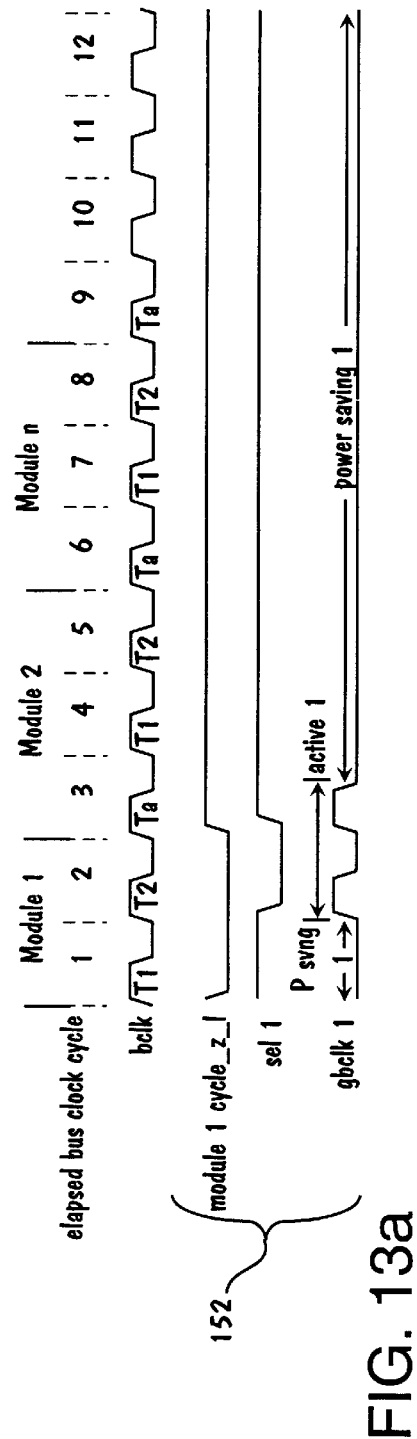
FIGS. 13a–c is an exemplary timing diagram for the distributed power management system showing the manner in which power is saved for each inactive subsystem and periods during which clock is gated to an active subsystem.
Figure 13B:
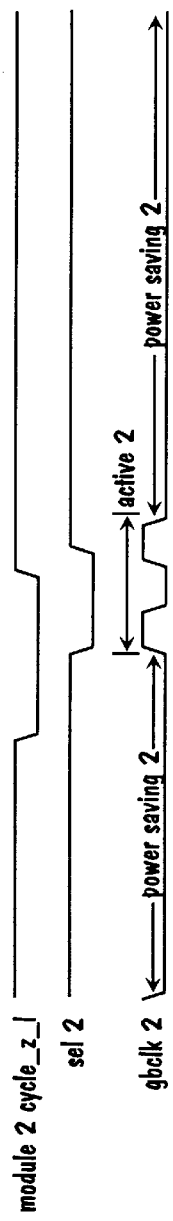
Figure 13C:
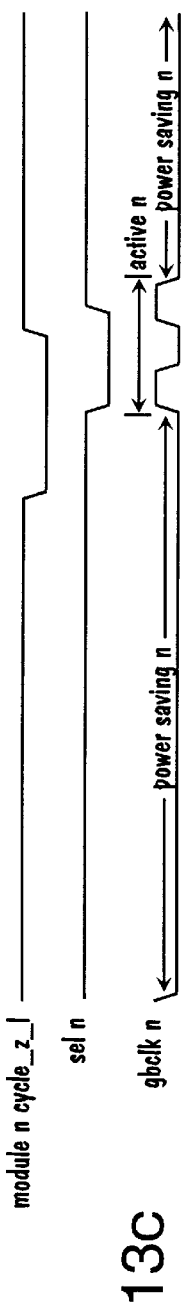

The manner in which power consumption is reduced by gating or withholding the clock from core logic is now described relative to modules 1, 2, and n, and timing diagrams of FIG. 13a, 13b, and 13c. With respect to FIG. 13a, during a first time interval, subsystem module 1 responds to the cycle_z_1 signal cycle targeted to module 1, by a master module upon a rising edge of bus clock signal (indicated by T1), and the sel_1 signal goes low as a result of the target module 1 decoding a valid address, and indicating the master that can execute the cycle so that the gbclk1 is communicated to the core logic of subsystem module 1 during the period of time in which sel 1 signal is asserted and until the end of the next bus clock cycle after which sel 1 signal is deasserted. This interval is designated "active 1". Note that only subsystem module 1 is consuming power as a result of having the bus clock gated to its core logic circuits during portions of elapsed bus clock cycles 2–3, and that subsystem modules not selected during that particular interval of bus clock signals are in the power saving mode. By comparison, conventional systems implementing only a central power management system and/or method will not provide separate gated bus clock signals to individual subsystem components, but rather provide a continuously running clock to each subsystem circuit.

FIG. 13b illustrates analogous operation of module 2 to that already disable relative to FIG. 13a for module 1 but at a later time. However, in FIG. 13b, module 2 asserts a cycle_z_1 signal during interval 2 (approximately corresponding to elapsed bus clock cycles 4–5) and sel 2 signal during that same interval, to thereby enable gbclk2 for the duration in which sel 2 signal is asserted, and until the end of the following full clock cycle, here designated "active 2". Power is consumed by core logic 2 within subsystem 2 only during the period of time designated as "active 2", and power is saved during periods of time identified by "power saving 2". This process is repeated for any other number of subsystem modules that may be configured within the computer system 10, such as for subsystem module n shown in FIG. 13c.

The power saving interval are clearly evident from an inspection of FIGS. 13a, 13b, and 13c. For example, in FIG. 13a, power is consumed as a result of gating the bus clock to core logic 1 only during the period indicated by "active 1". During intervals identified by "power saving 1" the bus clock is gated to the core logic 1, "0" state and no power is consumed as a result of the dynamic switching within the core logic 1 elements, power only being consumed in core logic 1 circuits by virtue of the static power needed to maintain states within that particular core logical block and, of course, the small amount of power consumed by the interface logic and clock control circuits. Power (P) consumed by a circuit is $P=\frac{1}{2}V^2Cf$, where V is the voltage, C is the capacitance, and f is the switching frequency of the device (gate) so that when f=0, no or de minis power is consumed by the circuit.

Figure 14:
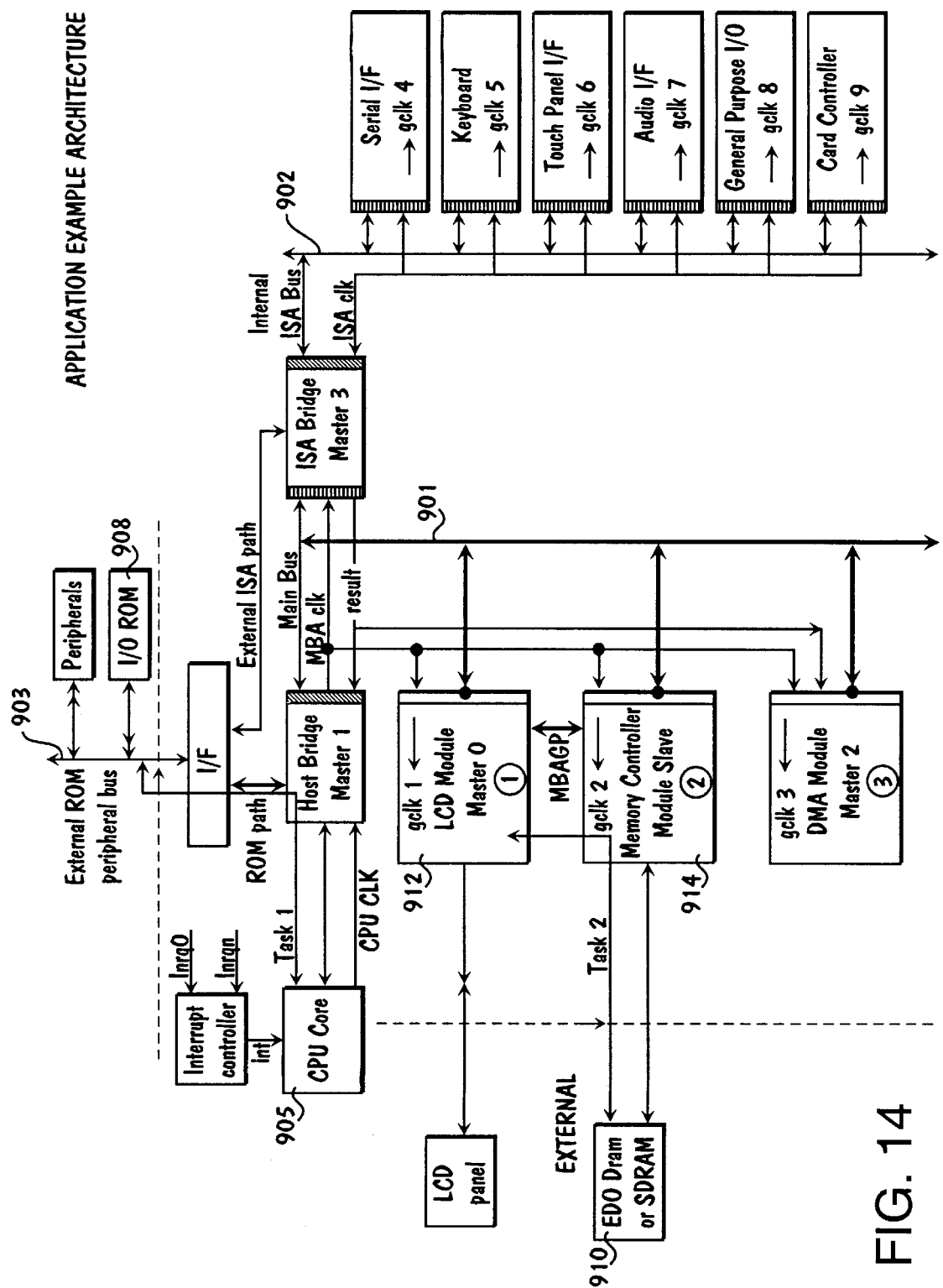
FIG. 14 is diagrammatic illustration showing an exemplary system configuration including resources coupled to the system by an ISA bus and other resources coupled to the system by the main bus.
Figure 15A:
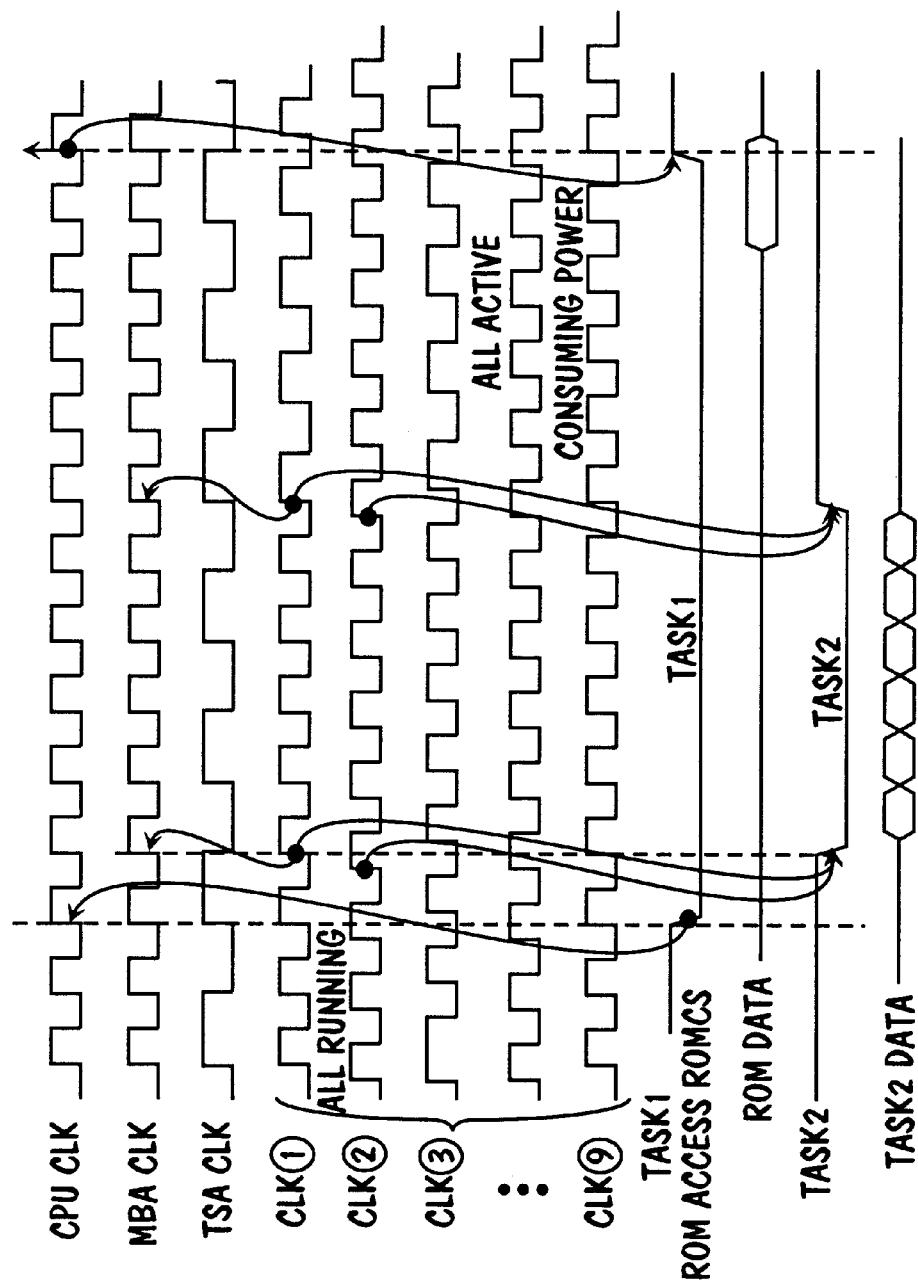
FIG. 15a is an exemplary timing diagram showing performance of a conventional non-distributed power management system during a multitasking processing session.
Figure 15B:
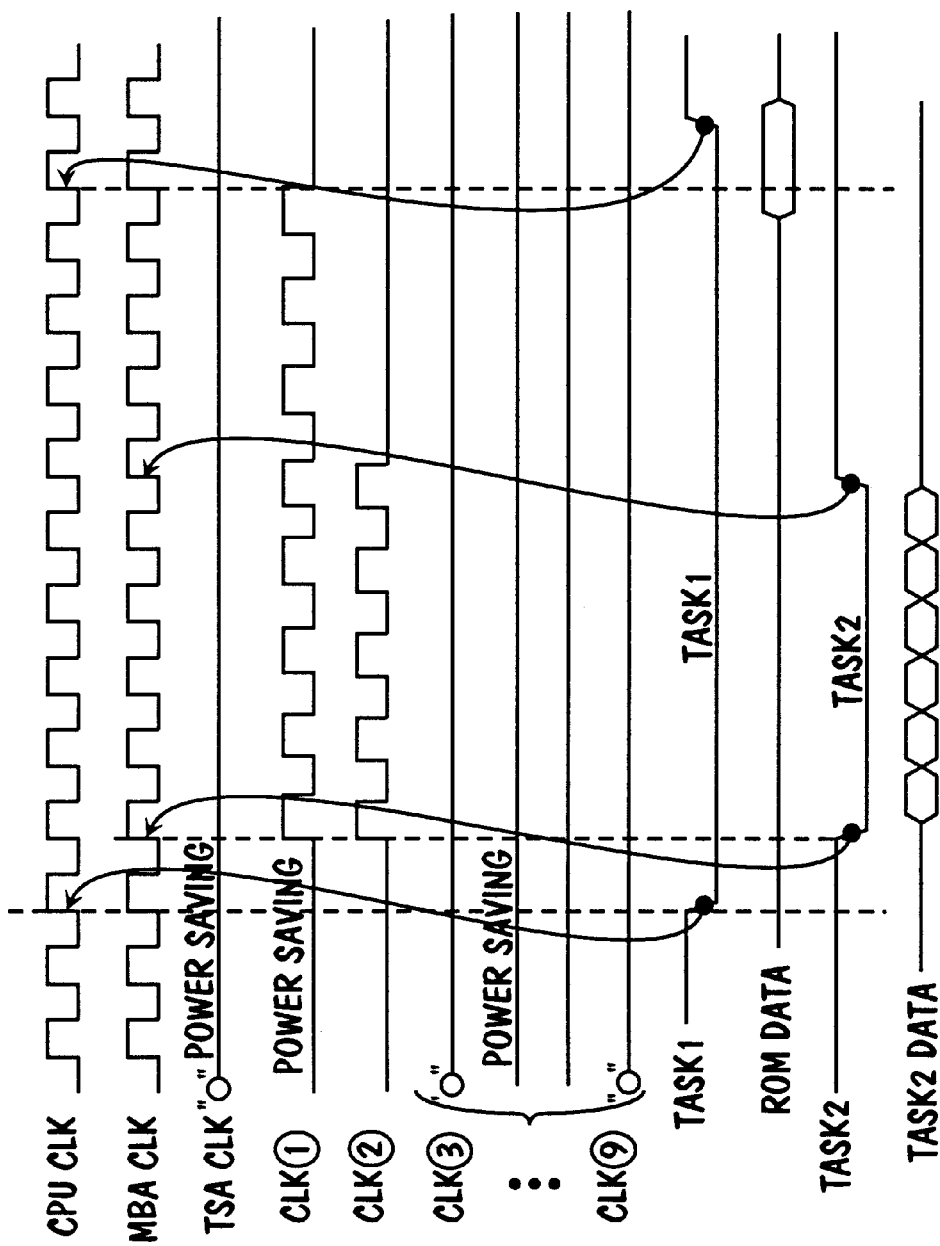

A further discussion of the power saving advantages of this inventive structure and method are provided with respect to FIGS. 14 and 15 which respectively illustrate an exemplary system architecture, and exemplary timing diagrams for conventional multi-tasking clock control (or lack thereof) and the inventive clock control to achieve power consumption savings, where each subsystem is operating in a multi-tasking or concurrent processing mode.

In this example, internal ISA bus 902 is a secondary bus relative to the main bus 901. The external peripheral bus 903 is also a secondary bus. If the CPU core 905 requests data from the ROM 908 (referred to as TASK 1), this data request does not require access to the main bus 901 or the secondary ISA bus 902. Here, the clock that interfaces to the ROM 908 is activated at the same time TASK 1 is initiated. Also, assume that the Liquid Crystal Display (LCD) module 912 requests data from memory 910 (referred to as TASK 2). TASK 2 requires that the gated bus clock (gbclk) of LCD Module 912 and Memory Control Module 914 be activated because each of these modules is required to satisfy LCD 903's request for data. Even though performance of two tasks are performed concurrently, the gated clock signals (gblck_4, . . . , gbclk_9) for the other ISA bus 902 connected modules (Serial I/F 921, Keyboard 922, Touch Panel I/F 923, Audio I/F 924, General Purpose I/O 925, and Card Controller 926), and the gated clock signal gbclk_3 for the DMA Module 930 on the main bus 901 remain inactive and their associated modules remain in their power saving mode. If TASK 2 finishes before TASK 1 finishes, then the gated clock signal of the LCD Module 912 and Memory Controller 914 will transition from the active mode to the power saving mode independently of any CPU interaction or control. The CPU 905 is still busy performing TASK 1. In the conventional system, all the clocks run continuously and their circuits consume power as shown in FIG. 15*a*. By comparison, the inventive distributed power management system allows each module to self control activation of core logic circuits so that only those core logic elements needed during particular bus cycles are provided clock signals.

For a representative subsystem having 4,000 gates in that subsystem, the following comparisons can be made. Assuming that the conventional system providing the same final result communicates the clocking signal to each and every one of the gates within that subsystem, that is approximately 4,000 gates. And, further assuming that power is consumed by about one-third of the number of gates which receive switching clock (K=⅓), and that power consumed per gate equals (using the Nippon Electric Corporation (NEC) formula for 0.5μ semiconductor technology):

---

2.08 × f × (number of gates × K) =     power consumed (mW)
2.08 × 100 MHZ × (4000 gates × 1/3) =     277 milliwatts of power

--- will be consumed by the conventional circuit.

However, for the inventive exemplary circuit in which only 270 gates of the total 4270 gates are provided within the subsystem bus interface and the remaining 4000 are provided in the core logic which is not clocked the power consumption will be:

2.08×100 MHZ×(270 gates×⅓)=19 milliwatts of power.

This represents a power consumption to about seven percent (7%) of the power consumed in the conventional implementation, a reduction of approximately 93%. This comparison is exemplary and an approximation to those results that will be achieved in practice. Those workers having ordinary skill in the art in light of this description will realize that the actual power consumed by a monolithic circuit will generally depend on the particular circuit design, including on the size and length of the traces, and on individual device characteristics.

Figure 16:
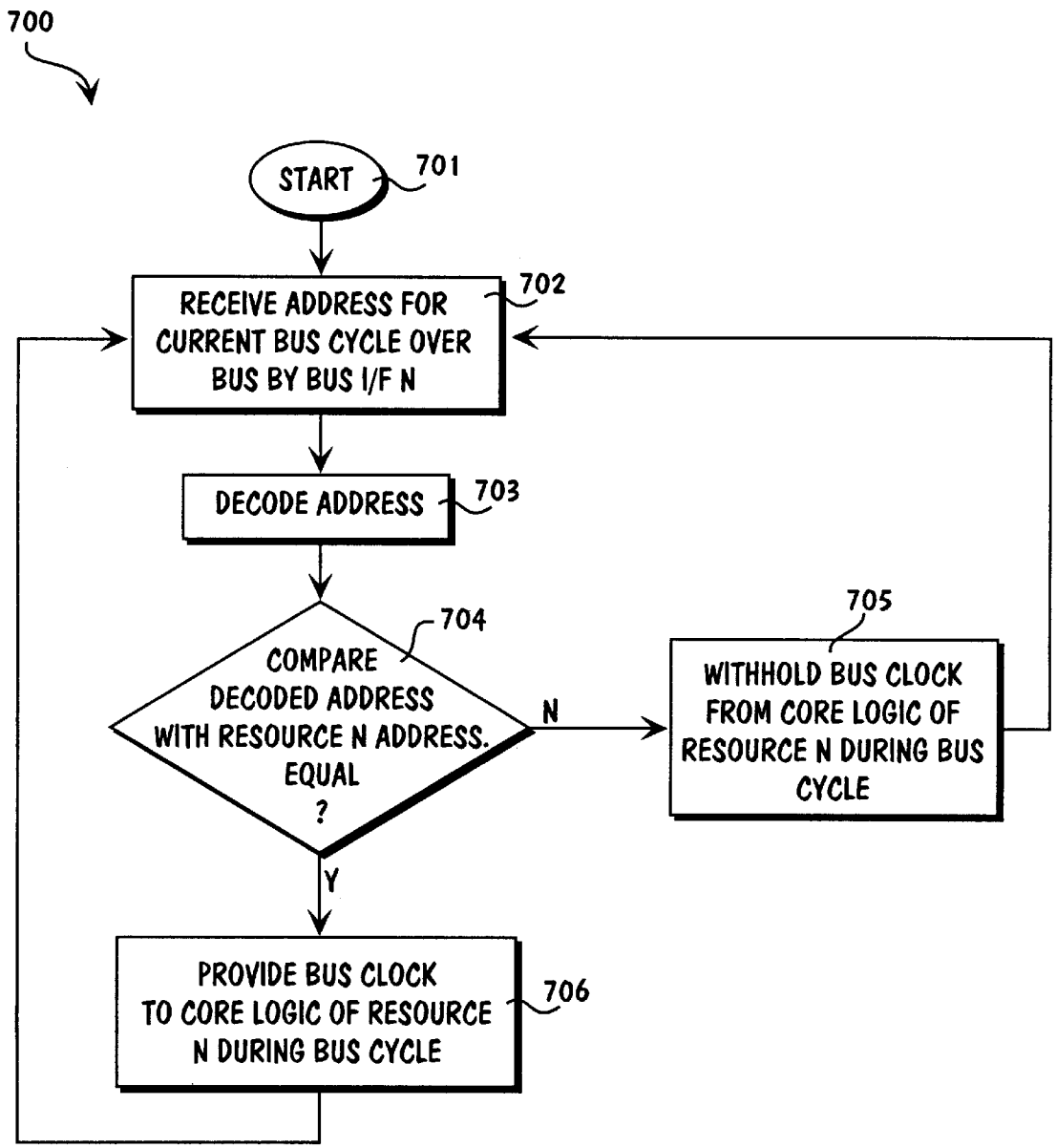
FIG. 16 is a diagrammatic flow-chart illustrating one embodiment of the inventive distributed power management method.

Apparatus and system suitable for performing the inventive method have been described in considerable detail. FIG. 16 is a flow chart diagram which shows top-level operation of an embodiment of the inventive distributed power management method 700. The bus interface logic of each subsystem module or system resource implementing distributed power management monitors the main bus for addresses (or other indicators) communicated over the bus (Step 702). Where address information is used, the address is decoded (Step 703), and then a comparison is performed in each subsystem between the address associated with that subsystem and the decoded address (Step 704). If the address appearing on the system bus matches (equals) the address associated with the particular subsystem, indicating that operation of that subsystem is needed, then the bus clock is provided to the core logic of that subsystem so that the core logic can perform the required operation (Step 706). If the address appearing on the system bus does not match (not equal) the address associated with the particular subsystem, indicating that operation of that subsystem is not needed during that bus cycle, then the bus clock is withheld from the core logic of that subsystem and power consumption that would otherwise be consumed by that core logic is reduced (Step 706).

The structure and method already described has emphasized a parallel bus configuration, but the inventive distributed power management system and method are not limited to such parallel bus configurations or processes. Other structures and methods for signaling the subsystems or modules are applicable for the DPMS and DPMM besides those that use Address bus decoding. Three alternate approaches are now described, including a structure and method that provide some CPU interface logic to generate module select signals, a structure and method that communicate selection data over a serial bus or wire loop, and a wireless structure and method wherein communication between the CPU and the subsystems is achieved using wireless links, such as Radio Frequency (RF) or optical links including Infrared.

Figure 17:
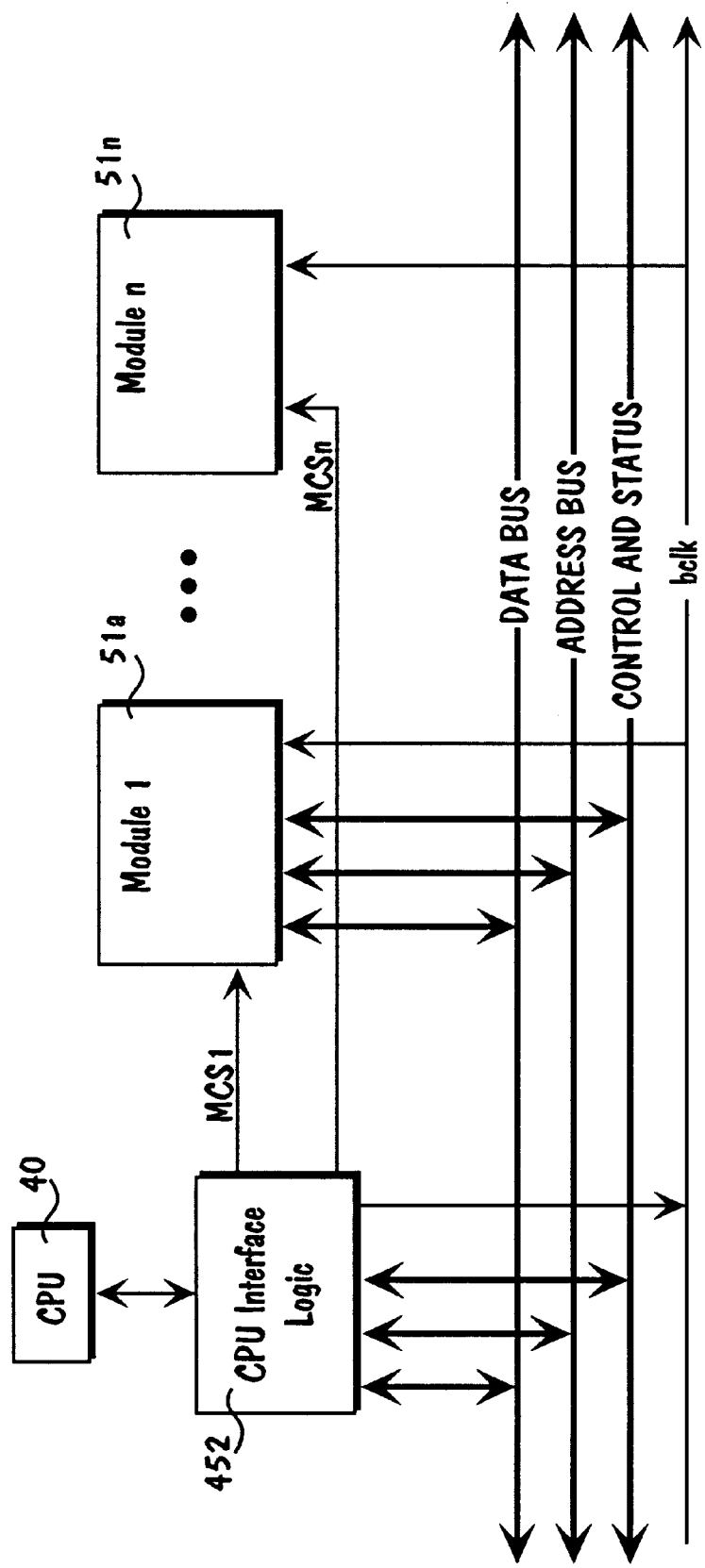
FIG. 17 is a diagrammatic representation of another embodiment of a computer system implementing a distributed power management system using a CPU Interface logic block to supply module select signals.

With reference to FIG. 17, CPU 40 is connected to a CPU Interface Logic Unit 452 which receives communications from CPU 40 and identifies the need to activate one or more subsystems 51*n*. In this embodiment, the Interface Logic Unit 452 implements the functionality of the Address Decode logic block 91 previously described, such that the Interface Logic Unit 452 is coupled to receive address information from the CPU 40 and to decode that address information in a conventional manner. Once the address of a subsystem or module is identified, the Interface Logic Unit 452 generates a module select signal (MCSn) and communicates that select signal over a suitable link, such as a bus or wire, for example. The logic within module 451*n* is the same as that earlier shown and described relative to module 451n except that module 451n need not include address decode logic in the slave bus interface.

If module1 451a is identified, then a module 1 select signal (MSC1) is asserted and communicated to the logic within module 1, which upon receipt will gate the bus clock (bclk) signal to the core logic as before, and when deasserted with block communication of the bus clock to the core logic. In some embodiments, the module select signal may be a "chip select" signal. Thus power conservation is achieved as before by minimizing the number of circuits or gates which are dynamically switched. This implementation also provides the operation benefits during multi-taking operation as already described relative the other parallel bus based implementation.

The CPU Interface logic 452 passes other data, address, control and status information to conventional busses. The data bus, Address bus, and control and status bus components may still be provided on one or more conventional busses.

Figure 18:
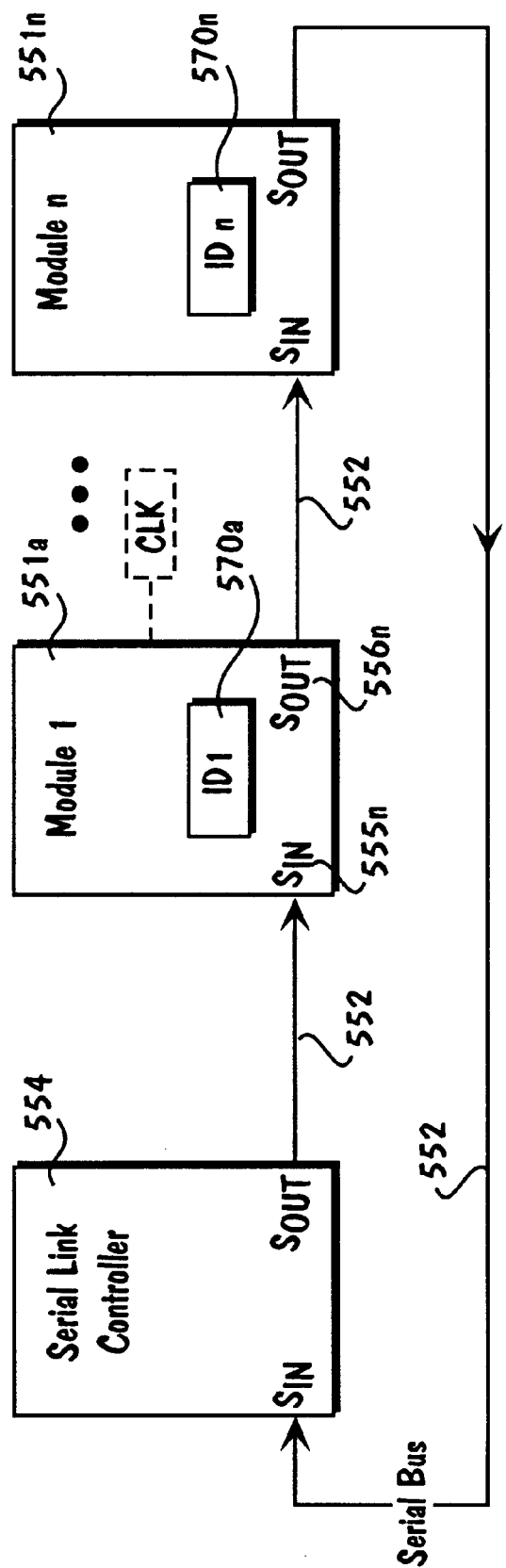
FIG. 18 is a diagrammatic representation of yet another embodiment of a computer system implementing a distributed power management system implementing a serial bus or interface to interconnect modules and communicate module select signals.

A serial link implementation is now described with reference to the embodiment in FIG. 18, which provides a plurality of subsystem modules 551a, ..., 551n connected by a serial bus 552 to form a closed signaling loop. The loop may also include a Serial Link Controller 554. The protocol for a serial linked system is based on a module address or module Identifier (ID) byte 570n which in the exemplary embodiment is provided as part of a command header of the serial protocol data stream. The data stream is communicated over the serial link 552 and sequentially passed between the Serial link controller and the subsystem modules. When a module 551n receives the command header at a serial input port $S_{in}$ 555n, it processes the data or information contained in the header to determine the intended target subsystem, and upon recognizing that the particular module is the intended target, generates select or activation signal to supply or gate a clock signal to the core logic within the particular module.

In these serial link embodiments, the clock signal may either be supplied with the data along the serial link, or optionally provided separately by each module 551n or alternatively by a separate clock generator circuit 560n associated with each subsystem module 551n. When provided separately, the clocks for the different subsystems would generally operate asynchronously unless synchronization means were provided. Such external clock circuits could also optionally operate a different clock rates to match the performance requirements of the particular subsystem with which the clock is associated.

If the subsystem module does not match the transmitted ID, the module will route the received serial stream to its serial output port $S_{out}$ that connects to the following subsystem modules connected to the serial link. Each serial module receiving the serial stream compares its unique ID with the ID appearing in the serial stream. Where it is desired or necessary for more than one subsystem module to be active, multiple ID's can be communicated either in the same serial data stream header or in different headers.

An exemplary serial bus protocol includes a Command Header comprising an opening flag, a subsystem ID, and a command, and a Data Field comprising data and a closing flag. The serial link may be a Universal Serial Bus (USB) or any other transport of commands and data where the serial bus connects multiple subsystems, devices, or peripherals. In some instances it is anticipated that only some of the subsystems, devices, or peripherals coupled by the serial bus or link may be able to implement distributed power management. The serial link may for example, implement a local area network (LAN), a token ring, or any other conventional network; or it may merely connect one or more peripheral devices to the CPU.

Figure 19:
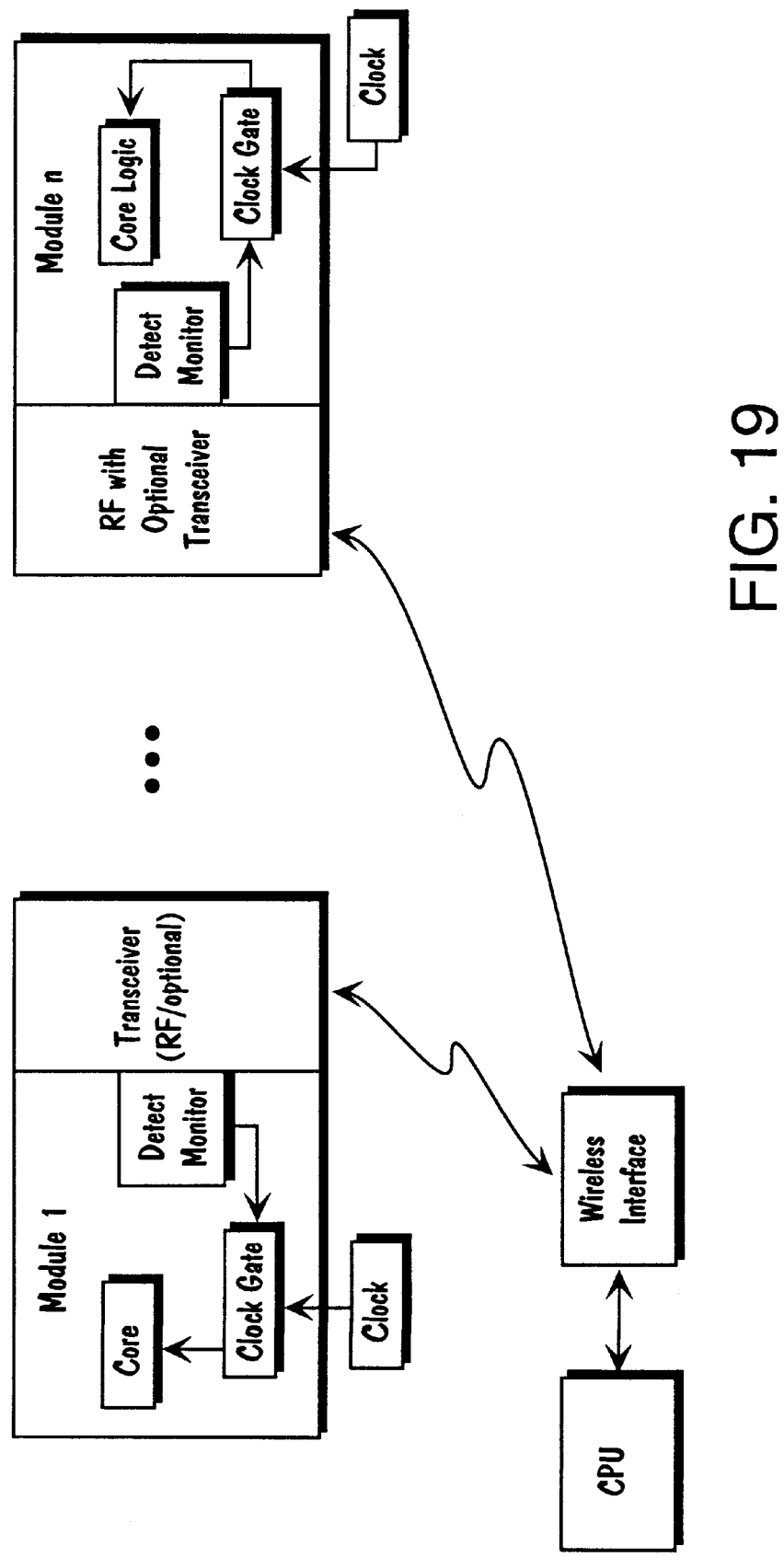
FIG. 19 is a diagrammatic representation of even another embodiment of a computer system implementing a distributed power management system implementing wireless transmission of module ID or module select signals.

The inventive structure and method may also be embodied in a wireless system by signaling a subsystem module using a transmitted ID that is similar to the serial protocol described previously in this specification. However, in the wireless implementation, the ID is transmitted by an optical, radio frequency, or other electromagnetic wave not requiring a physical connection. A simplified block diagram of a wireless embodiment is illustrated in FIG. 19. Wireless embodiments will typically provide separate clocks associated with each module (either internal or external), although clock signal could be provided to each module in the same wireless transmission or via a separate wireless link. Of course even among the embodiments that implement a physical connection between components, the physical connection may be by wire, optical fiber, transmission line, or any other medium capable of supporting the required communication.

ADDITIONAL ALTERNATIVE EMBODIMENTS

The inventive Modular Bus Architecture (MBA) and an enhanced version of the inventive MBA referred to as the Fast Modular Bus Architecture (FMBA) have been developed to assist in providing a standard bus optimized for battery operated single chip products (systems-on-a-chip), though the invention is not only limited to battery operated products or to systems on a single chip. Unless stated otherwise in this discussion, references to the MBA also refer to the FMBA. Specific characteristics that distinguish the FMBA from the MBA are described hereinafter in greater detail. The Industry standard buses such as PCI do not satisfy the requirement for low power consumption. PCI also has build in Plug-and-Play features and system resources ID protocols which are not required for an internal ASIC bus. The inventive Modular Bus Architecture introduces two additional power savings states in addition to the operating system power management states. The two MBA Architecture hardware activated power savings are: (1) Distributed power management structure and method; and (2) MBA bus clock speed adjustment according to bus activity. Aspects of these two power saving structures and methods are described here and in co-pending U.S. patent application Ser. No. 08/877,140 filed Jun. 17, 1997 and hereby incorporated by reference. Additional aspects of the innovation of adjusting bus clock speed according to bus activity, as well as several other embodiments and inventive features are also described in greater detail hereinafter.

The inventive modular bus architecture provides several advantageous features, including: (1) creates an architecture frame for systems-on-a-chip (SOC) designs; (2) increased power savings even when systems are in the active state (MBA modules are self-power managed in order to allow re-use of modules in several products); and (3) decrease ASIC design time and effort, by creating a ready to use MBA Architecture Frame and FMBA/MBA modules library. This provide more efficient design and faster time to market for products.

FMBA/MBA SYSTEM-ON-A-CHIP (SOC) ARCHITECTURE

In a preferred embodiment, the Fast Modular Bus Architecture/Modular Bus Architecture (FMBA/MBA) utilizes two buses, the system bus (MBA bus) and the peripheral I/O bus. The FMBA/MBA system bus is a high bandwidth synchronous bus that supports multi-master modules. The interface to the CPU core is via the MBA Host bridge module, and the interface to the on Chip I/O peripheral bus is also a bridge. The slow peripheral I/O bus bridge implements a result protocol, releasing the MBA bus to allow concurrent task execution. The MBA bus has a central Arbiter that arbitrates the request of the MBA masters to access the bus. The Arbiter also monitors the activity of the bus and dynamically controls the speed of the bus clock for the purpose of saving power in the case the bus is idle or with low activity.

Figure 20:
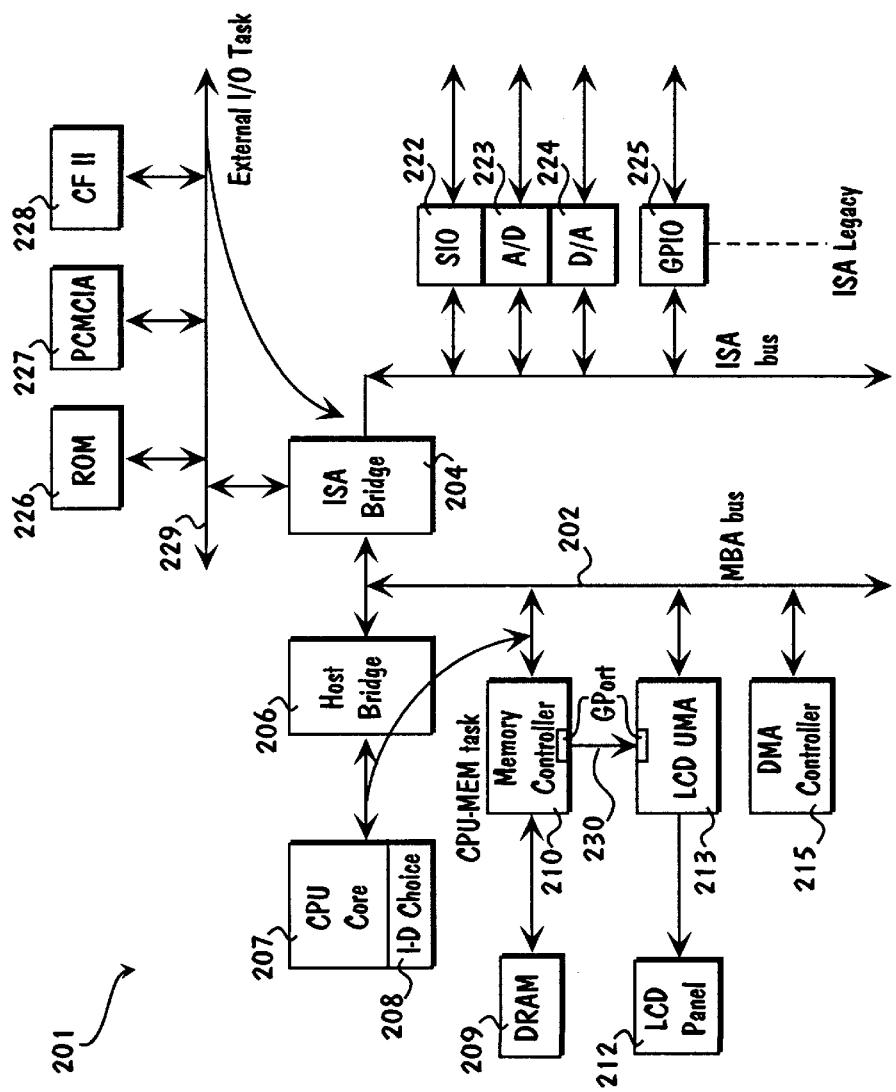
FIG. 20 is a diagrammatic representation of an embodiment of a system configuration for implementing MBA concurrent architecture.

FIG. 20 illustrates a system configuration 201 for implementing the exemplary MBA concurrent architecture. CPU core 207 associated with ID cache 208 is coupled via host bridge 206 to the MBA bus. MBA bus 202 also serve to connect memory controller 210 to DRAM 209, and LCD panel 212 to LCD UMA 213. DMA controller 215 is also coupled to the MBA bus 202. Memory controller 210 is also connected to LCD UMA 213 by way of a bus graphics port (Gport) connection 230. ISA bridge 204 serves to couple several ISO bus devices to the MBA bus 202. For example, SIO 222, analog/digital (A/D) converter 223, digital/analog (D/A) converter 224, and GPIO 225, as well as any number of ISA legacy devices, may be connected or coupled to MBA bus 202 via ISA bridge 209. An additional bus 229 couple ROM 226, PCMCIA 227, and CFII 228, to the MBA bus via the ISA bridge.

FMBA/MBA Architecture Frame

Figure 21:
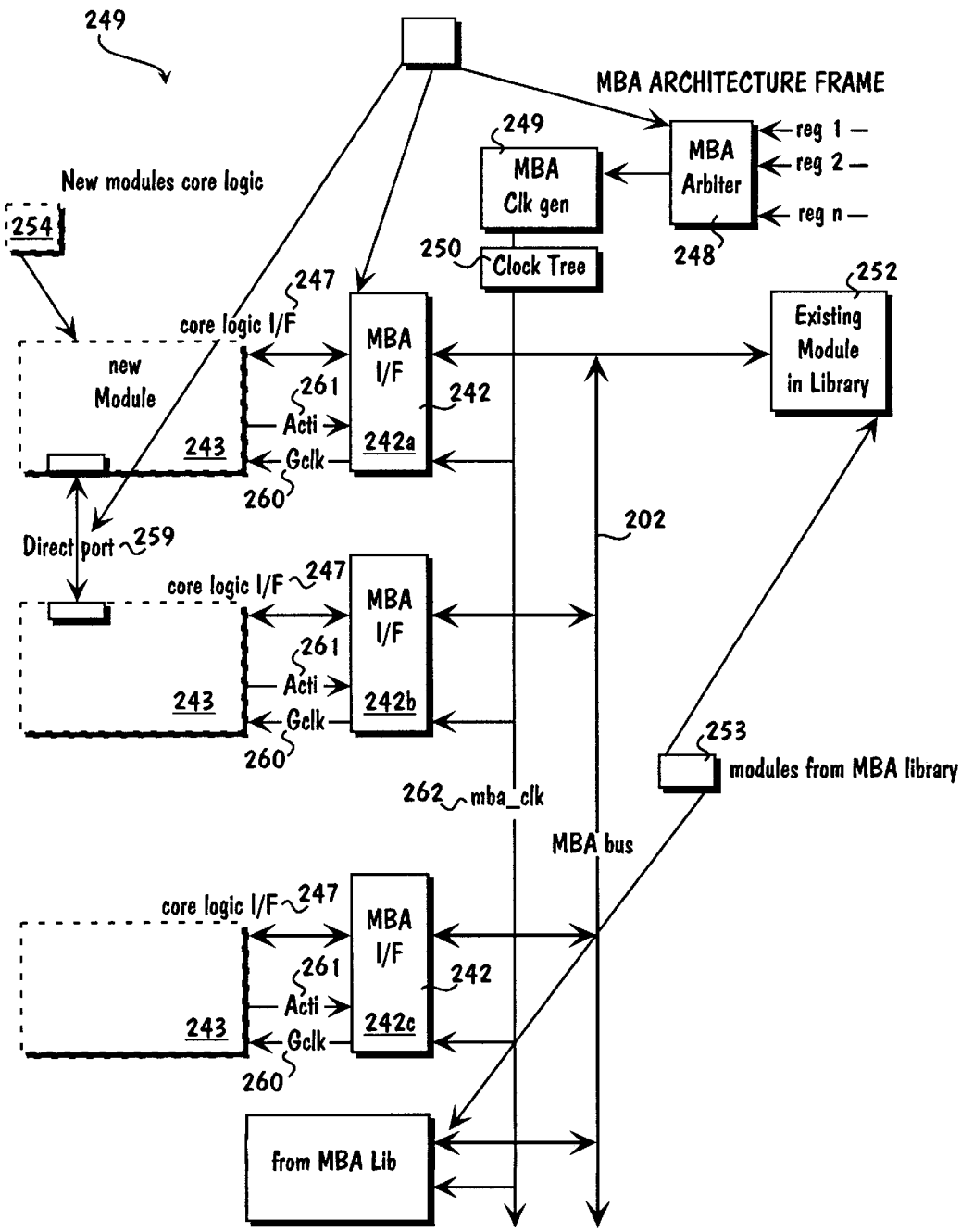
FIG. 21 is a diagrammatic representation of an embodiment of the inventive MBA architecture frame.

We now describe an exemplary FMBA/MBA architecture frame 249 with respect to the diagrammatic illustration in FIG. 21. The FMBA/MBA architecture frame generally comprises the MBA bus 202, MBA arbiter 248, MBA clock generator 249, clock tree 250, and one or more MBA interfaces 242 (242a, 242b, . . . ). MBA architecture frame may also be considered to optionally include an existing MBA module library 252, containing one or more existing MBA modules 253, new module core logic 254, and direct-port or side-port structures 259 which permits direct coupling between modules so that communication over the MBA bus 202 is not required for module-to-module interactions. It is noted that MBA interface 242 provides a gated clock signal (gclk) 260 to each module 243 and receives an activate (Acti) signal 261 from the new module back to the MBA interface. MBA bus clock (mba_clk) signal 262 is communicated from MBA clock generator 249 via clock tree 250 and distributed to each MBA interface. MBA interface 242 controls wether gated clock 260 is presented to the module, depending on the power management state of that module.

The Architecture Frame 249 is the back-bone for starting the design of new systems-on-a-chip. The design is typically started from the top and the new module design engineers interact and test at the system level. The design of new modules interact only to the core logic interface 247 as illustrated in FIG. 21. The MBA interface 242 which is part of the Architecture Frame has built in the distributed power management structure and method. The MBA I/F can be configured to be a slave interface or a master interface by setting parameters in the Verilog file. The System memory map and I/O map there are also entered as parameters.

The FMBA/MBA Architecture Frame facilitates the design in, evaluation, and simulation at the system level, of vendors IP's to be used on the system. The MBA Architecture Frame also provides for optional side-band buses 259 or dedicated direct ports between MBA modules. One such exemplary dedicated ports is the graphic port 230 instead of the memory controller and LCD controller, illustrated in FIG. 20 which allows direct communication between the connected controllers.

Figure 22:
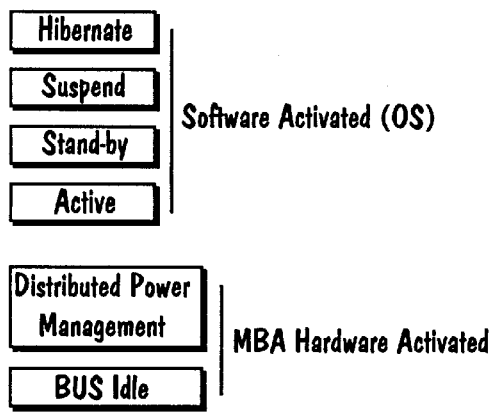
FIG. 22 is a diagrammatic representation showing software operating system activated power management states and MBA hardware activated power management states or modes.

The inventive system-on-a-chip design supports software operating system (OS) activated power management states or modes such as hibernate, suspend, stand-by, and system active (See for example FIG. 22), as well as the new innovative MBA hardware activated power management states or modes. As software operating system activated power management states are known (See for example, the Advanced Configuration and Power Interface Specification, Revision 1.0, Dec. 22, 1996, and updates thereto published jointly by Intel Corporation, Microsoft Corporation, and Toshiba Corp, and herein incorporated by reference) this description emphasizes the additional MBA hardware activated power states.

Distributed Power Management.

Figure 23:
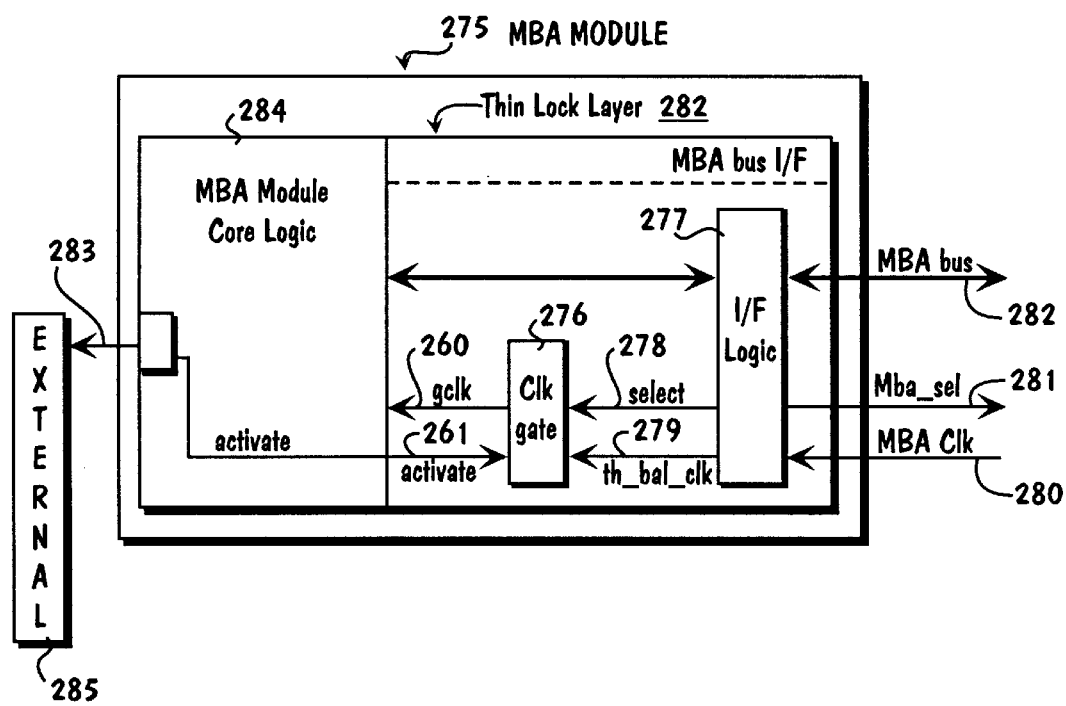
FIG. 23 is a diagrammatic representation of an embodiment of an MBA module architecture showing relationship between input and output on the MBA bus, MBA clock input to the interface logic, and MBA select signal output by the MBA bus interface.

The inventive distributed Power Management method is now further described relative to the diagrammatic illustration in FIG. 23. The exemplary MBA module architecture illustrating FIG. 23 shows a relationship between input and output on the MBA bus 202, MBA clock 280 input to the interface logic 277 and MBA select signal 281 output by the MBA bus interface. MBA interface 242 is seen to include an interface logic 277 component and a clock gate component 276. Interface logic 277 is coupled to MBA bus 202 to receive data, commands, status, and the like information, such as the MBA select (mba_sel) signal to select the particular MBA module core logic 284, and in response to the receipt operates to generate select signal 278. The MBA clock signal propagated on the MBA bus (MBA_clk) is communicated to interface logic 277 and is used to generate a secondary MBA clock (mba_clk) signal 279 which is sent to clock gate component 276. Interface logic 277 also communicates a select signal (select) 278 which tells the clock gate circuit 276 to gate the secondary mba_clk signal to the MBA Module Core Logic 284 when it has been selected. When bus select signal 278 indicates that the particular MBA module 275 is to be accessed, bus select signal 278 sent to clock gate component 276 causes the gated clock 260 to be enabled, and gated clock is communicated to MBA Module Core Logic 284 thereby providing operation of the entire MBA module 275. MBA module 275 includes a thin layer of logic 282, usually referred to as the interface logic layer 277 but optionally also including the clock gate circuit logic 276. At least the interface logic 277 and optionally the clock gate circuit logic 276 operating continuously in one embodiment so as to be capable of responding to the select and gated clock signals. Other circuitry within MBA module 275 may be a low power consumption noted and clock signal is not communicated thereto. In this manner MBA module 275 has a very low power or energy consumption at all times other than when it is actually be used.

MBA module 275 also includes an optional external connection 283 to an external device or system. In the event that this external system 285 requires access to the particular MBA module 275, the MBA module 275 is also capable of generating an activate signal 261 back into clock gate to circuit 276 in order to initiate communication of gated clock to the MBA module. Once gated clock is restored to the MBA module 275 the external system is able to the fully utilize the operational capabilities of the MBA module 275. Normally some path will adjust from the external device by interface 282 to the thin layer 282 in order to activate the MBA module 275.

In operation, each MBA module is normally off in that gated clock is off on disabled ("0"). The power consumed when a circuit is not clocked is essentially zero (note power command is proportionate to Frequency f, $P=KV^2Cf$), hence power consumption is zero (or substantially zero) relative to the power consumption in a clocked operating state. The only time that the gated clock will be activated for a particular module is upon the MBA I/F logic detecting that a bus cycle is allocated to or intended for that module via the MBA select signal 278, or if an external event that interfaces to the module is requesting service. In the latter case, the core logic will assert the activate signal 261 to start the gated clock.

The exemplary MBA module Architecture illustrated in FIG. 23 shows one example of a logic partitioning used to implement an embodiment of the distributed power management. The circuits are separated into a first small portion which is clocked so as to remain in an active or ready state, and a second larger portion which is woken up when the first portion detects the need. The Clock gate 276 is part of the MBA I/F logic 242 which is a thin layer of logic 282 that runs off the continuous MBA_clock 280. The Core logic 284 of the Module 275 runs off the gated clock (gclk). By thin layer we mean that the number of circuit components or elements are reduced to minimize the power consumed when this layer is in operation.

Under this architecture the MBA modules are self power managed, allowing the re-use of the modules for different products, without the need of redesign system dependant power management capabilities.

Clock Adjustment According to Bus Activity and Task Performance Requirements

In an additional optional enhancement to the power savings or conservation scheme, the MBA bus arbiter monitors the activity of the bus via the MBA master's request signals (Req 1, Req 2, and Req 3n) and also monitors the task performance requirements. Depending on the activity, the arbiter commands the MBA clock generator circuit to divide down or multiply up the speed of the MBA clock. This is accomplished, at least in part, through the use of the MBA bus divide signals div(1:0). This signal notifies the modules of the current speed of the bus clock.

FIG. 24 illustrates an exemplary embodiment of an MBA architecture which provides dynamic control of the MBA bus clock speed communicated to each MBA module. MBA arbiter 248 is coupled to receive one or more request signals (Req1, Req2, Req3, . . . ) from one or more master MBA modules to have access to the MBA bus. The MBA arbiter 248 has been described earlier any more generic context as the central bus interface 43. As described earlier central bus interface 43 a comprises latency timer or timers 46, clock division notify circuit 44 clock frequency control circuit 45, and optional bus arbiter logic 130. These elements (providing a function of MBA clock 249) generate an MBA clock signal MBA_clk) and a clock division signal (div:(1:0)). Both the clock and division signals are sent to the individual MBA interfaces 242; however, depending upon the coding of the division signal communicated to each particular module, the gated clock signal used by the core logic portion of each module may be different. For example, module 1 receives a first gated clock signal (gclk1), module 2 receives a second gated clock signal (gclk2), and module 3 receives a third gated clock signal (gclk3). The frequencies of these particular gated clock signals will advantageous the be adjusted to operate that module in the most efficient manner given be performance factor associated with that module for the particular task. In coding of the devices signals and performance factors are described in greater detail elsewhere in this description.

MBA Architecture Decreases ASIC Design Effort

The inventive design method provides an environment and infrastructure in which MBA modules are designed and/or built as background tasks and need not be on a critical design path. The separation between background task module design and the design of other components is illustrated in exemplary manner in FIG. 25.

Inventive structure and method also provide an inventive design method 294 that advantageously utilizes the inventive structure and operating methods and procedure. The MBA environment and infrastructure in which MBA modules are designed and/or built as background tasks 283 need not be on a critical design time path segment with the foreground task 284 of specific ASIC design 290. The separation between background tasks 283 module designed and foreground task 284 include the design of other components is illustrated in exemplary manner and FIG. 25, which shows as background tasks 283, the development of MBA modules 285, verification of MBA modules 286, the building of the MBA library modules 287 and the associated MBA module documentation 289, as well as the development of MBA engineering tools 288. Once this infrastructure is in place, ASIC design 290 for a new module chip or system can proceed as the primary foreground task 284.

Figure 26:
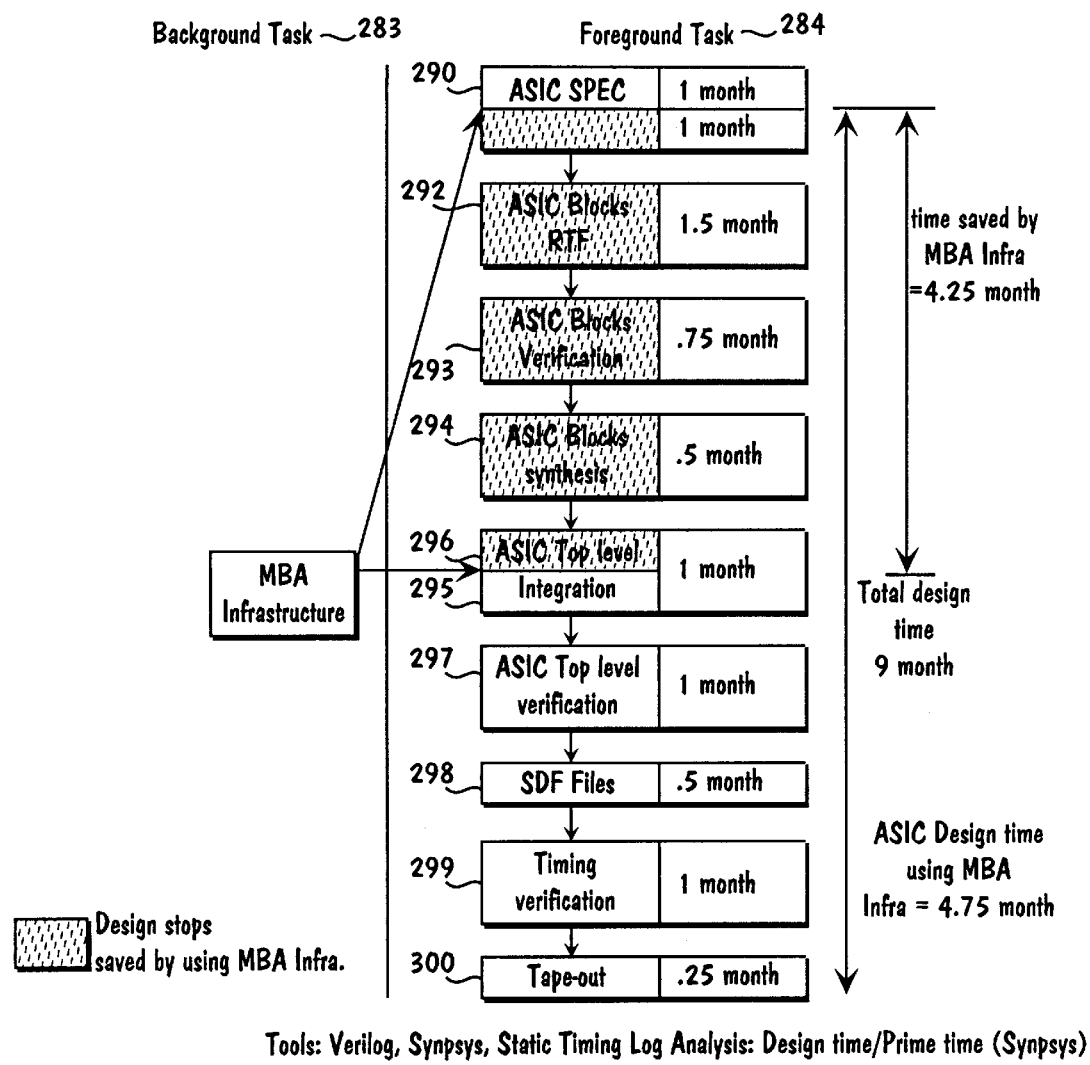
FIG. 26 is a diagrammatic representation illustrating how ASIC development time is reduced using inventive design method.

By using the MBA design environment and infrastructure, the ASIC development time can be reduced considerably, for the exemplary tasks in FIG. 26, by one-half or more. The time savings which may typically be realized using the FMBA/MBA architectural frame versus conventional design development approaches are illustrated in FIG. 26. Background tasks 283 are shown on the left-hand side and foreground tasks 284 are illustrate on the right hand side of the drawing, with the proviso that tasks that would have been characterized as foreground tasks in a conventional environment have been moved from the left background tasks 283, to the right foreground tasks 284, and interposed between the ASIC specification phase (1 month) 290, and the latter half of the ASIC top level integration phase 296. The portion of the ASIC specification phase 291, ASIC blocks RTL 292, ASIC blocks verification 293, ASIC blocks synthesis 294 and portion of the ASIC top level integration 296 have removed as foreground tasks with approximate time-saving by the MBA infrastructure above 4.25 months. Only a portion of the ASIC top level verification, SDF files 298, timing verification 299, and Tape-out 300 phases typically performed remain, a foreground task. The design steps saved by using the MBA infrastructure has reduced the nine-month design task to 4.75 months. Of course those workers having ordinary skill in the art will appreciate that this numerical example is exemplary only, and that's the particular time savings will depend on the nature of the ASIC to be designed; however, the savings are clear.

Additional Advantages

The inventive FMBA/MBA Architecture frame effectively addresses the heretofore un-met need for power management in systems-on-a-chip designs and devices, especially for battery operated or powered devices. In addition to battery operated or powered devices, the inventive structures and methods are also applicable to systems powered by fuel cells, solar power arrays, or for example, where power is stored in capacitive storage devices.

The inventive FMBA/MBA architecture frame also reduces ASIC design time and permits the identification of any problems with a design or implementation at a much earlier design phase. Problems that may be discovered or identified earlier in the design cycle include for example, chip level performance, static timing analysis, scan insertion, ATPG, clocking methodology for low power design at the module and/or chip level, and the like. The inventive structure and method also allow the ASIC designer to focus on key design features, rather than designing a complete system piece-by-piece. The invention also allows chip-level simulation to be performed at the beginning of the design cycle. Finally, this aspect of the invention provides a parallel design methodology rather than the traditional design development methodology which was largely sequential or serial.

DYNAMIC POWER MANAGEMENT COUPLED TO TASK PERFORMANCE REQUIREMENTS

The dynamic task power management method implemented on the FMBA/MBA (referred to as MBA) Architecture adds further (and more precise) power management to the system active state, by dynamic clock frequency control to the otherwise free running MBA bus clock and consequently to the MBA modules gated clock. The inventive dynamic task power management method is implemented by assigning two signals to each MBA master module. The signals are directed to the MBA Arbiter and provides information regarding task performance requirements that the master module will execute on the MBA bus. In the preferred embodiment of the invention, the MBA Arbiter re-assigns (i) priority, and (ii) MBA bus clock speed, according to a task performance factor. Of course, though less desirable, the inventive structure and method provide an arbiter that resigns only one of either priority, or MBA bus clock speed. The MBA clock speed is adjusted according to the speed requirement (performance requirement) of the task being executed. In a default or idle condition, when no tasks are running, the FMBA/MBA clock defaults to the lowest speed possible. Of course the gated clock to particular devices would be stopped to each device that is not being accessed during that cycle, so that when no tasks are accessing any devices, all gated clocks would be stopped. The task performance factor is a number or other indicator that specifies the task performance requirements and is typically determined prior to or during the design. Task performance factors are described in greater detail elsewhere in this description.

With this method the MBA bus clock speed is maximum only when the task requires that level of operation so that high-power or energy consumption rates are experienced only when system demands so dictate. At other times, even though the system is in an active state, the system operates at a lower frequency or even at the lowest frequency possible, such as for example at the MBA bus idle state frequency. Accordingly under the inventive method, a low power consumption state is achieved even when the system is active.

System Architecture and Signals Description

Figure 27:
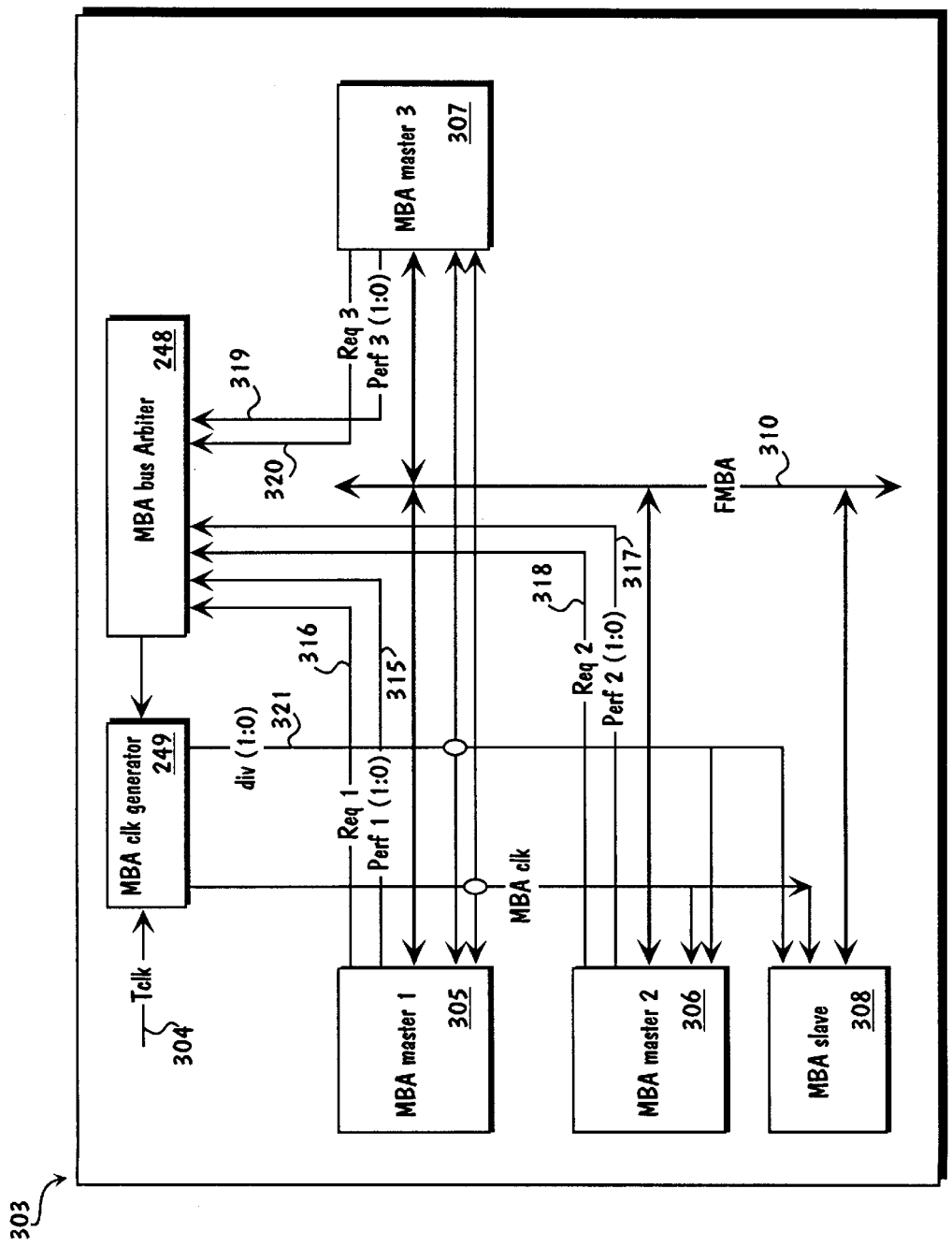
FIG. 27 is a diagrammatic representation of an embodiment of the inventive architecture showing some signals used for dynamic task power management.

We now describe aspects of the invention with respect to the diagrammatic illustration of FIG. 27, showing an exemplary embodiment of the inventive architecture (apparatus) and signals used in the dynamic task power management method. We now described in embodiment of a system including dynamic power management with reference to the diagram in FIG. 27.

For purposes of explanation, system 303 includes MBA bus arbiter 248, MBA clock generator to 49, first, second, and third MBA master modules 305, 306, and 307, and MBA slave module 308. MBA/FMBA bus 310 provides in its low-module communication between and among the MBA/FMBA modules. (The fast modular bus architecture (FMBA) is described in greater detail hereinafter.) As the nature of MBA bus arbiter 248, MBA clock generator 249, and both master and slave modules have been described earlier, this discussion focuses on provision of the performance factor signals (Perf(n:0) or Perf(1:0) depending upon the particular embodiment) 315, 317, 319, and their relationship to the request signals 316, 318, 320 and divisor (div(n:0)) signals 321. The MBA clock signal (MBA_clk) 304 (also referred to as Tclk because in one embodiment of the invention, the CPU output clock (Tclk) is used to generate the MBA clock signal) is generated by MBA clock generator 249.

Request signals (for example, Req1, Req2, Req3) are generated by mater modules needing access to the MBA or FMBA bus and sent to MBA/FMBA bus arbiter 248. Performance factor signals (for example, Perf1, Perf2, Perf3) are also generated by mater MBA modules (including by any host bridge modules). In one embodiment of the invention, the performance factor bits (signals) are parameterized and assigned to each system device address range. When an address for an MBA master module is communicated over the bus selecting an MBA module, the performance factor bits associated with that MBA module are communicated by the module requesting access to the bus so that the desired performance and power-saving combination are achieved.

In effect, the bus request signals (Req 1, Req 2, Req 3) 316, 318, 320, sent to MBA bus arbiter 248 initiate process where in conjunction with the performance factor signals 315, 317, 319, the divisor signals 321 sent to each module are adjusted in accordance with those performance factors. The divisor signals are intended to inform other components of the system that the clock has been adjusted in accordance with the specified performance factor, and that for purposes of maintaining accurate timing of any real-time clocks that may be present. Alternatively, separate real time clocks may be provided in which instance the divisor signals are not needed. The manner in which the performance factor signals are utilized is further described suspect the timing diagrams of FIG. 28.

Figure 28:
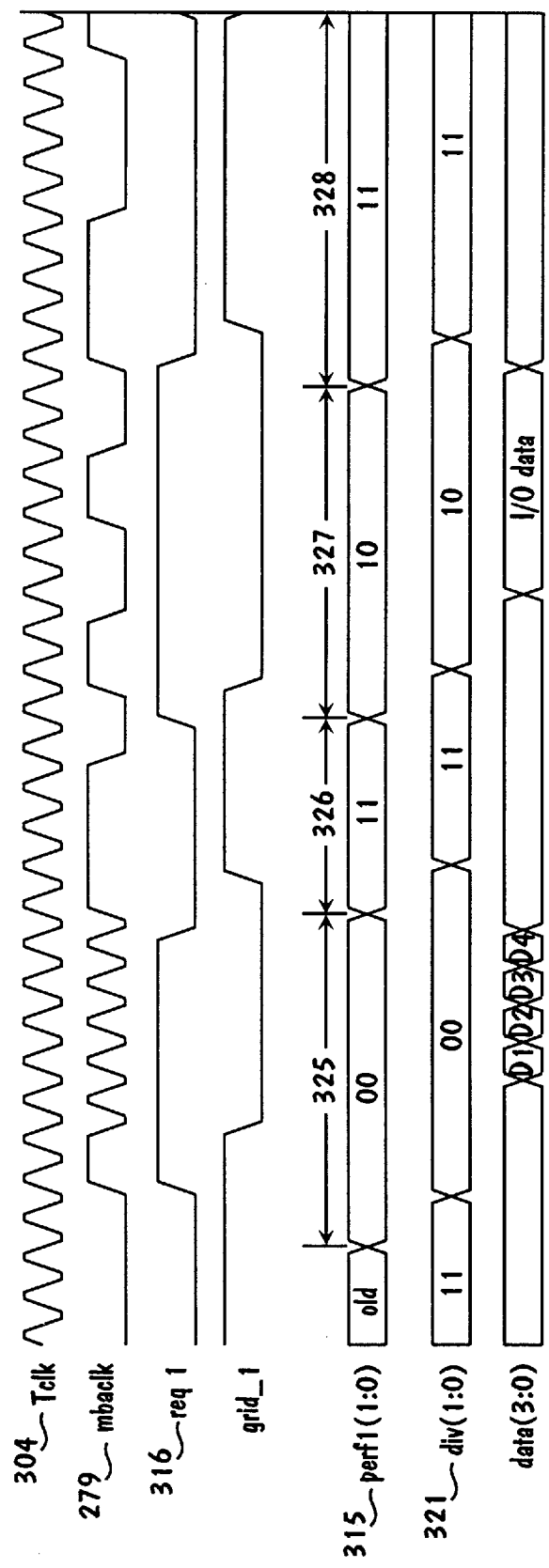
FIG. 28 is a diagrammatic representation showing timing diagrams illustrating the manner in which the performance factor signals are utilized in one embodiment of the invention.

The timing diagram in FIG. 28 shows the relationship between Tclk 304, mba_clk 279, the occurrence of bus access request signal (req1) from MBA master 1 305, bus access grant signal (gnt1_I) received from MBA bus arbiter 248, and further relationship to performance factor signal (Perf1(1:0)), divisor signal (div(1:0)), and data signal (data (1:0)). In an alternative embodiment and the more general case, the performance factor signal is represented by Perf1 (n:0)), divisor signal div(n:0), and data signal data(31:0) or some other number of bits.

The T-clock signal (Tclk) runs continuously at a predetermined rate, usually the rate of the CPU, while the rate of the MBA clock signal (mba_clk) varies as a function of the state of be divisor signal 321 sent to the particular module. The request by a module for bus access may be granted by the bus arbiter according to relationship already described herein before. In this example, the request for bus access has been made by master module 1, the first request for a cache line read requiring high-performance response, and a second request for write cycle normally having a low performance response factor.

We see the state of the performance factor signal Perf (1:0) 315 transition into the "00" or high-performance task factor during the D-cache line read operation phase 325, followed by a "11" or very low performance default task factor phase 326 when the module is not be used, followed by the transition to the "10" or low performance task factor during the I/O write cycle 327, again followed by the "11" default performance factor phase 328 after the completion of the I/O write cycle operation. One may readily see that be divisor signal 321 tracks the performance factor signal 315 with only some slight delay resulting from synchronization, and the like. Data transfer occurs during the respective D-cache line read operation or I/O data write cycle operation.

Each MBA master and MBA slave receives the same divisor signals. The performance factor signal sent by each master module to the MBA bus arbiter does not directly effect of the frequency of the clock running for each individual module. In one embodiment of the invention, the clock frequency is modified for each cycle, according to the performance request factor and each module sees this frequency (common MBA_clk), however, the for modules that are not participating in the particular cycle, the gated clock (gated_clk) is "OFF" and they do not see the clock.

Each MBA master module has MBA bus Request signal (Req), and also has a performance factor encoded in a performance factor signal, such as the two-bit or two-value signal Perf(1:0) or the multi-bit or multi-value performance factor Perf(n:0), the performance factor signals are asserted at the same time, then the request signals and are routed to the MBA central arbiter. In one embodiment of the invention, the performance factor signal states are as indicated in Table IA Perf(1:0) use two bits and a second embodiment in Table IB use three bits to provide more degrees of control over performance, but those workers having ordinary skill in light of this description will appreciate that the task performance requirements may be communicated by other means, and that structures for an encoded signal in the form of Perf(1:0) or more generally Perf(n:0) may take alternative forms and the subjective descriptors "high performance", "medium performance", "low performance", and "very low performance" are intended to convey the idea of ranges of performance from minimum in the active state to maximum in the active state. Clearly, fewer levels could be implemented, and if additional lines (or signal bits) are provided such as would be provided with the three bits of Perf(2:0) or n-bits of Perf (n:0)even greater gradation may be provided. Also, the default factor may be selected from any available level; however, for best power savings the lowest performance state (slowest bus clock frequency) would typically be used as the default.

TABLE IA

First Exemplary Performance Factor Signal Perf(1:0) Encoding

| Perf (1:0) | Description |
| --- | --- |
| 00 | High performance |
| 01 | Medium performance |
| 10 | Low performance |
| 11 | Very Low performance (default) |

TABLE IB

Second Exemplary Performance Factor Signal Perf(n:0) Encoding

Perf (n:0), n = 2

| perf2 | perf1 | perf0 | Description |
| --- | --- | --- | --- |
| 0 | 0 | 0 | Very Highest performance |
| 0 | 0 | 1 | High performance |
| 0 | 1 | 0 | Good performance |
| 0 | 1 | 1 | Intermediate performance |

TABLE IB-continued

Second Exemplary Performance Factor Signal Perf(n:0) Encoding

Perf (n:0), n = 2

| perf2 | perf1 | perf0 | Description |
| --- | --- | --- | --- |
| 1 | 0 | 0 | Adequate performance |
| 1 | 0 | 1 | Lower performance |
| 1 | 1 | 0 | Low performance |
| 1 | 1 | 1 | Very Low performance |

Typically, the system designer assigns the particular performance factors for each task performed by any MBA master module. For example, typically input/output (I/O) outputs to LED or Keyboard are "very low performance" tasks; serial interface ports are "low performance tasks"; USB, single memory read writes to DRAM and DMA I/O channels are "medium performance" tasks; and Data Cache Line operations, display and graphic tasks, and high speed modem operations will be "high performance tasks."

The Performance factor request signals Perf(1:0) are associated with the MBA Arbiter priority scheme, MBA clock frequency, and the MBA clock divide signals div(1:0) in a first embodiment or div(n:0) in a second embodiment. The MBA bus specification defines the div(1:0) signals in the manner indicated in Table IIA and the div(n:0) signals in the manner indicated in Table IIB. The div(n:0) signals providing a greater number of levels of performance and power conservation than the div(1:0) signals. A clock divisor circuit receives the raw bus clock signal and divides that signal by div(1:0) or div(n:0) and provides both the modified bus clock signal to the main bus and an indication of the frequency change in the form of the divisor so that any module maintaining a real time clock can maintain real-time clock integrity in spite of the clock frequency division.

Assuming for simplicity of description that the two-bit Perf(1:0) signals are used, the timing diagram in FIG. 28 illustrates the Host bridge (MBA master 1 in FIG. 27) requesting the MBA bus for two tasks with different performance factors. The first cycle is a D-Cache line read (for example, a burst of four Dwords on the MBA bus). Here, Perf(1:0)=00 to indicate a high performance task. The second cycle is and I/O write cycle with low performance factor Perf(1:0)=10.

More specifically, when performance factor Perf(1:0)=00 (high performance) the clock divide signal div(1:0)=00 (full speed); when Perf(1:0)=01 (medium performance) the clock divide signal div(1:0)=01 (half speed); when Perf(1:0)=10 (low performance) the clock divide signal div(1:0)=10 (quarter speed); and when Perf(1:0)=11 (very low performance) the clock divide signal div(1:0)=11 (eighth speed). Other clock divide signal encodings such as the three-bit Perf(n:0) signaling may alternatively be used, and such encoding need not be in a linear progression.

TABLE IIA

First Exemplary Clock Divide Signal Encoding

| div(1:0) | Description |
| --- | --- |
| 00 | 1:1 Full speed |
| 01 | 1:2 Half speed |
| 10 | 1:4 Quarter speed |
| 11 | 1:8 Eighth speed |

TABLE IIB

Second Exemplary Clock Divide Signal Encoding div(n:0)

| divn | div2 | div1 | div0 | Description |
|---|---|---|---|---|
| 0 | 0 | 0 | 0 | 1:1 Full speed |
| 0 | 0 | 0 | 1 | 1:2 Half speed |
| 0 | 0 | 1 | 0 | 1:4 Quarter speed |
| 0 | 0 | 1 | 1 | 1:8 Eighth speed |
| 0 | 1 | 0 | 0 | 1:16 Sixteenth speed |
| 0 | 1 | 0 | 1 | 1:32 Thirty-second speed |
| 0 | 1 | 1 | 0 | 1:64 Sixty-fourth speed |
| 0 | 1 | 1 | 1 | 1:128 One-hundred-twenty-eighth speed |
| ... | ... | ... | ... | ... |
| 1 | 1 | 1 | 1 | 1:(n = 1) × 2 |

MBA Arbiter Task Performance Factor Priority Scheme

Figure 29:
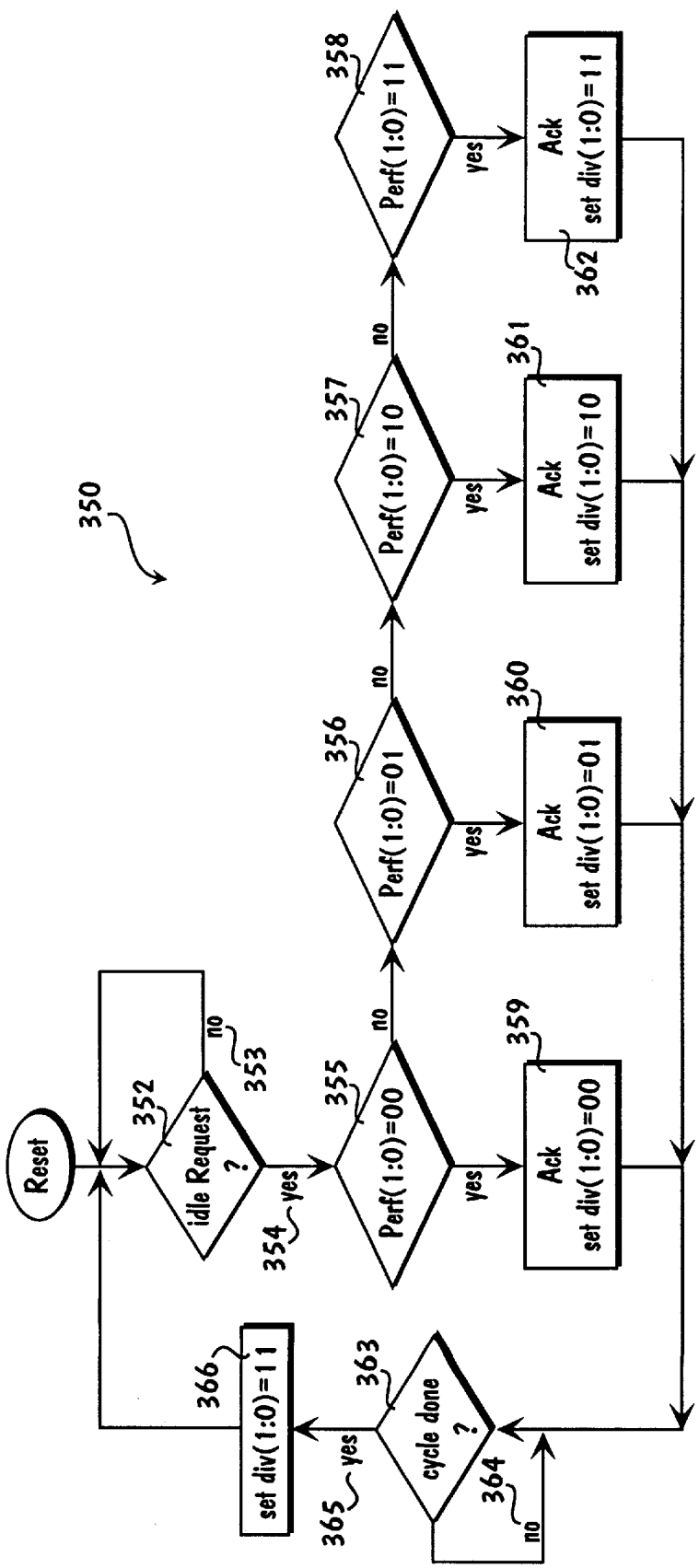
FIG. 29 is a diagrammatic representation illustrating manner in which an embodiment of the MBA Arbiter arbitrates priority based on the task performance factor and controls the clock frequency.
Figure 30:
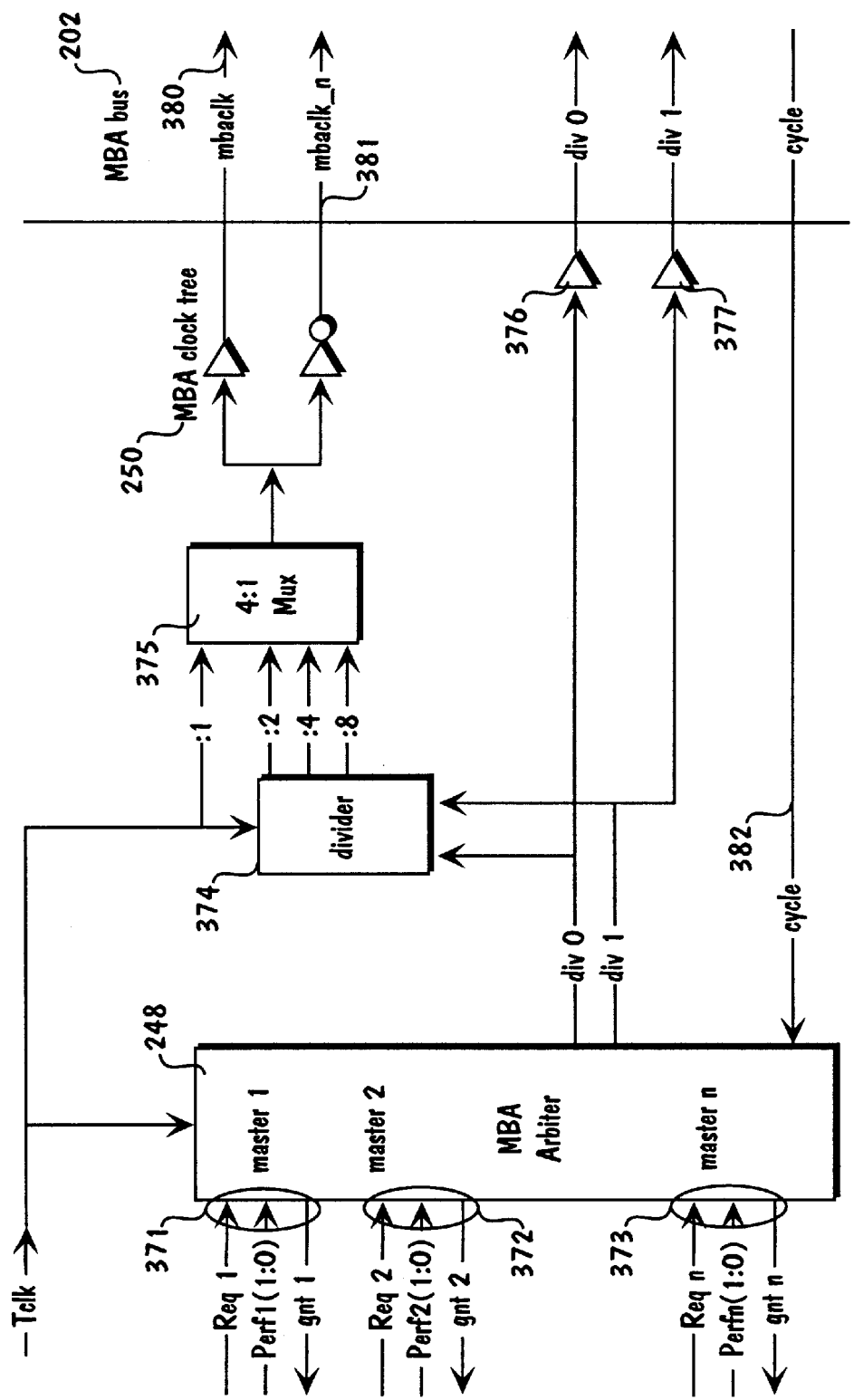
FIG. 30 is a diagrammatic representation of an embodiment of the MBA clock generator circuit controlled by the MBA Arbiter.

In FIG. 29 there is illustrated an exemplary MBA Arbiter, arbitrating priority based on the task performance factor and controlling the MBA clock frequency accordingly. FIG. 30 illustrates the MBA clock generator circuit controlled by the MBA Arbiter.

In FIG. 29, the exemplary flowchart diagram illustrates a procedure 350 in which an exemplary MBA arbiter 248 arbitrates priority based on the particular task performance factor and controls the MBA clock frequency to a predetermined value accordingly. The system is reset (step 351) upon the occurrence of a reset signal or power-on. Typically the reset or power-on takes the system to an idle state. While idle, a test is performed to determine if there's been a bus request (step 352) by a master module. If no idle request has occurred (step 353) then the system continues in idle and continues to test for a bus request until a bus request does occur. When an bus request occurs (step 354) a series of tasks are performed to determine whether the performance factor was specified as the "high-performance" (00), "medium performance" (01), "low performance" (10), or "very low performance" or the default condition (11). For the performance factors identified in Table IB, the levels are specified as any of: Very Highest performance, High performance, Good performance, Intermediate performance, Adequate performance, Lower performance, Low performance, Very Low performance. These descriptive labels are arbitrary and are merely intended to convey a progression of performance from highest to lowest and a corresponding opposite progression of power consumption from highest power consumption to lowest power consumption.

The steps for the two-bit performance factors illustrated in FIG. 29 are cascaded and correspond to steps 355, 356, 357, and 358. A similar procedure and method will readily be appreciated by those workers having ordinary skill in the art in light of this description for performance factors specified with more (or fewer) bits. The testing starts for the highest performance factor and continues until the low performance factor is reached. If during any stages of task, the performance factor associated with the idle request matches, an acknowledgment (ack) signal is sent to the requestor the divisor signal is specified by the bus arbiter and set to the corresponding value (steps 359, 360, 361, 362) and as specified in Table II by the clock generator circuit and clock tree 250, already described. After setting the divisor value, the test is performed determine if the cycle for which the performance task factor applies has been completed (step 363) if the test determines that the cycle is not done, then the cycle is repeatedly performed (step 364) until cycle has completed (step 365) at which time the divisor signal is sent back to the default value for low performance (here, "11") (step 366) and the procedure returns to perform another tasks and see if the subsequent idle request has been received (352). This procedure is performed repeatedly during operation of the system.

An exemplary MBA clock generator circuit 249 operable in conformance to the method just described relative to FIG. 29 is illustrated in FIG. 30. MBA arbiter 248 includes means for receiving request (Req1) performance factor Perf1 signals, (1:0), . . . , n and for sending grant signals (gnt1), . . . , gntn for each of n master modules. For example, a set of inputs and outputs for master module-1 371, master module-2 372, and master module-n 373 are provided in the MBA arbiter 248. Recall that in the preferred embodiments of the invention, slave type modules cannot participate in dynamic bus speed modification.

The MBA arbiter generates a div0 and a div1 signal, which are communicated to a 4:1 multiplexer 375 and also separately to amplifiers/buffers 376, 377 for communication over the MBA bus 202. Divider circuit 374 receives the T-clock (Tclk) signal and divides it by some predetermined factors. In this embodiment, Tclk is divided by factors 2, 4, and 8. The T-clock signal is also communicated directly to multiplexer 375. The div0 and div1 signals act as control signals into multiplexer 375 to select as its output signal, a clock signal operating at the same frequency as T-clock (1:1), or as one of the divided or lower frequency clock signals (1:2, 1:4, 1:8). Output of multiplexer 375 is communicated to MBA clock tree 250 (see FIG. 21) which generates amplified/buffered non-inverted (mba_clk) 380 and inverted (mbaclk_n) 381 versions of the signal onto the MBA bus 202. A bus cycle (cycle) signal 382 is received by MBA arbiter 248 from a master module after it received a grant to access the bus and operates to inform every other module that a bus access cycle has started.

Those workers having ordinary skill in the art in light of the description provided herein, will appreciate that the inventive dynamic task power management structure and method provide additional power savings to the distributed power management method of the MBA Architecture, without significant impact on the overall system performance.

Aspects of this embodiment of the invention are expected to provided further benefits when faster memory devices become available, for example, dual-data rate synchronous data RAM, Also, for RAMBUS memory, it will be possible to shift data at both edges of a clock.

FAST MBA WITH CONFIGURABLE INTERFACE AND SINGLE-EDGE OR DUAL-EDGE FIFO

We now describe alternative embodiments for a modular bus architecture (MBA) and fast modular bus architecture (FMBA) having a configurable interface and either single-edge FIFO or double-edge FIFO.

Dual-Edge FIFO Interface

Figure 31:
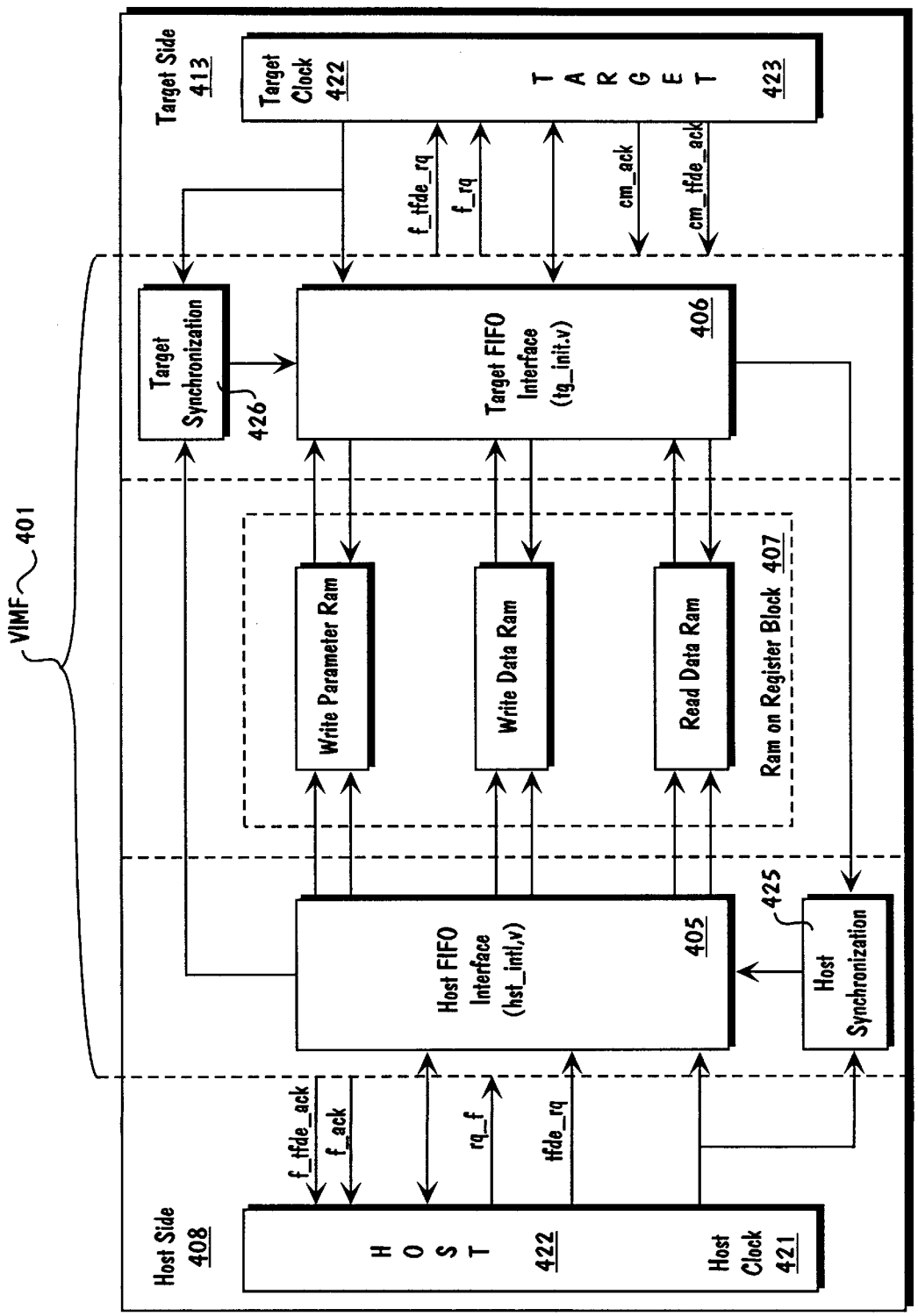
FIG. 31 is a diagrammatic representation of an embodiment of a dual-edge clocked FIFO interface

We now describe one dual-edge embodiment of the FIFO interface with respect to FIG. 31. Dual-Edge FIFO (DFIFO) 401 provides means to interconnect internal modules at FMBA/MBA back-end level (core logic level) 402, block level (MBA/FMBA module level) 403, or chip level (usually including the processor and one or more MBA modules) 404 for reused purposes. DFIFO typically includes three primary modules or components: (i) host FIFO interface 405, (ii) target FIFO interface 406, and (iii) RAM (or register block) 407. The FIFO or DFIFO is used as a back end interface because it is very easy to design to, as many workers having ordinary skill in the art are familiar with interfacing generic FIFOs. The host interface 405 is responsible for accepting data from host side 408 and flags situations it is full or when valid read data is present in the read data FIFO. Target Interface 406 on the target side 413 is responsible for transferring data out from FIFO 410, accepting read data from target core module 411, and flags when the read data FIFO is full.

Dual-Edge FIFO Design Configuration

Dual-Edge FIFO 420 is designed to accept data transfer on single edge and/or on both edges of host clock 421 from host side 408, and at the same time the dual-edge FIFO 420 can transfer data out on a single edge and/or on both edges of the target clock to the target side 413 without redesigning host FIFO interface (hst_fintf.v) 405 and target FIFO interface (tg_fintf.v) 406. Host 422 initiates a write request with data transfer rate on dual edges of clock by asserting request to access FIFO (rq_f) and request transfer data rate on dual edge of clock (tfde_rq) signals. If DFIFO 401 is configured to support data transfer rate on dual edge of clock, it will acknowledge the request by asserting FIFO acknowledges request from host (f_ack) when FIFO has space available to take more data in and FIFO acknowledges transfer data rate host request (f_tfde_ack) signals. In an analogous manner, but in an opposite direction, the DFIFO 401 can initiate a write request with data transfer rate on dual edges of clock to target by asserting FIFO request to access target (f_rq) and FIFO request data transfer rate on dual edges of clock (f_tfde_rq). If target can handle data transfer rate on dual edge of clock, it will accept the request from FIFO by asserting target core module acknowledge FIFO request (cm_ack) and target core module acknowledge data transfer rate FIFO request (cm_tfde_ack).

In each of the embodiments synchronization is provided for connecting one clock domain to a different clock domain, for example to correct for clock offset or skew. Host synchronization 425 provides synchronization between the host clock 421 and target clock 422, and target synchronization 426 provides synchronization between the target clock 422 and host clock 421.

The dual-edge FIFO is designed to be configured in different ways without requiring redesign of the host FIFO interface (hst_fintf.v) 405 or target FIFO interface (tg_fintf.v) 406. For example, the DFIFO can be configured in several ways, including for example: (i) as a synchronous FIFO (by removing or bypassing synchronization); (ii) as an asynchronous FIFO using synchronization signals; (iii) with different combination RAM (or block register) and/or size to for example, provide the proper amount or size of RAM; or (iv) to provide only single edge at a time and a different data rate.

We now describe four examples of the use of the invention dual-edge FIFO at the block level and/or chip level relative to the diagrammatic illustrations of FIG. 32, FIG. 33, FIG. 34, and FIG. 35. Each of these examples is an illustrative example as to how a single hardware structure may be used or configured in different ways to provide the appropriate or desired connectivity, function, and/or interface.

In FIG. 32 there is shown a first exemplary FMBA/MBA Host Bridge (HBU) 462 having a Dual-edge FIFO 460 of the type described herein before. In this exemplary embodiment, there is: (i) a single edge data transfer from CPU interface 461 on the CPU side; and (ii) a single edge data transfer from dual-edge FIFO 463 to ROM controller 464 on the target side. The dual-edge FIFO 462 allows the Host Bridge 462 to support any type of processor, microprocessor, or CPU. For example, processors made by Intel, AMD, ArmStrong, National Semiconductor, Motorola, Apple Computer, IBM, or the like are supported. If and when a new or replacement CPU is desired (such as when the design is updated to take advantage of faster processor clock speeds), only the CPU interface logic 465 (a particular example of Host FIFO interface 405) needs to redesigned to support new CPU, the rest of logic need not be changed and can stay the same.

In FIG. 33 there is illustrated an exemplary FMBA/MBA Host Bridge dual-edge FIFO in which there is: (i) a single edge data transfer to CPU core 471, and (ii) a dual-edge data transfer to an FMBA back-end interface 472.

In this example Host Bridge 462 and Dual-edge FIFO 463 are compared to those described relative to FIG. 32. In the application example illustrated in FIG. 34, a Memory Control Unit (MCU) 482 host dual-edge FIFO 463 has a dual-edge data transfer to DDRDRAM (or RAMBUS) 483 and a dual-edge data transfer to FMBA back-end interface 484. In the application example of FIG. 35, MCU 482 dual-edge host FIFO 463 has a dual-edge data transfer to DDRDRAM (or RAMBUS) 485 and a single-edge data transfer to MBA back-end interface 486. In these examples, the dual-edge FIFO of FMBA supports dual-edge data transfer while still permitting connectivity to single-edge MBA structures which only support single-edge data transfer. This conversion between dual-edge and single-edge operation is advantageous in permitting existing MBA modules and module designs to be used for FMBA designs, thereby increasing the number of module designs available.

Figure 36:
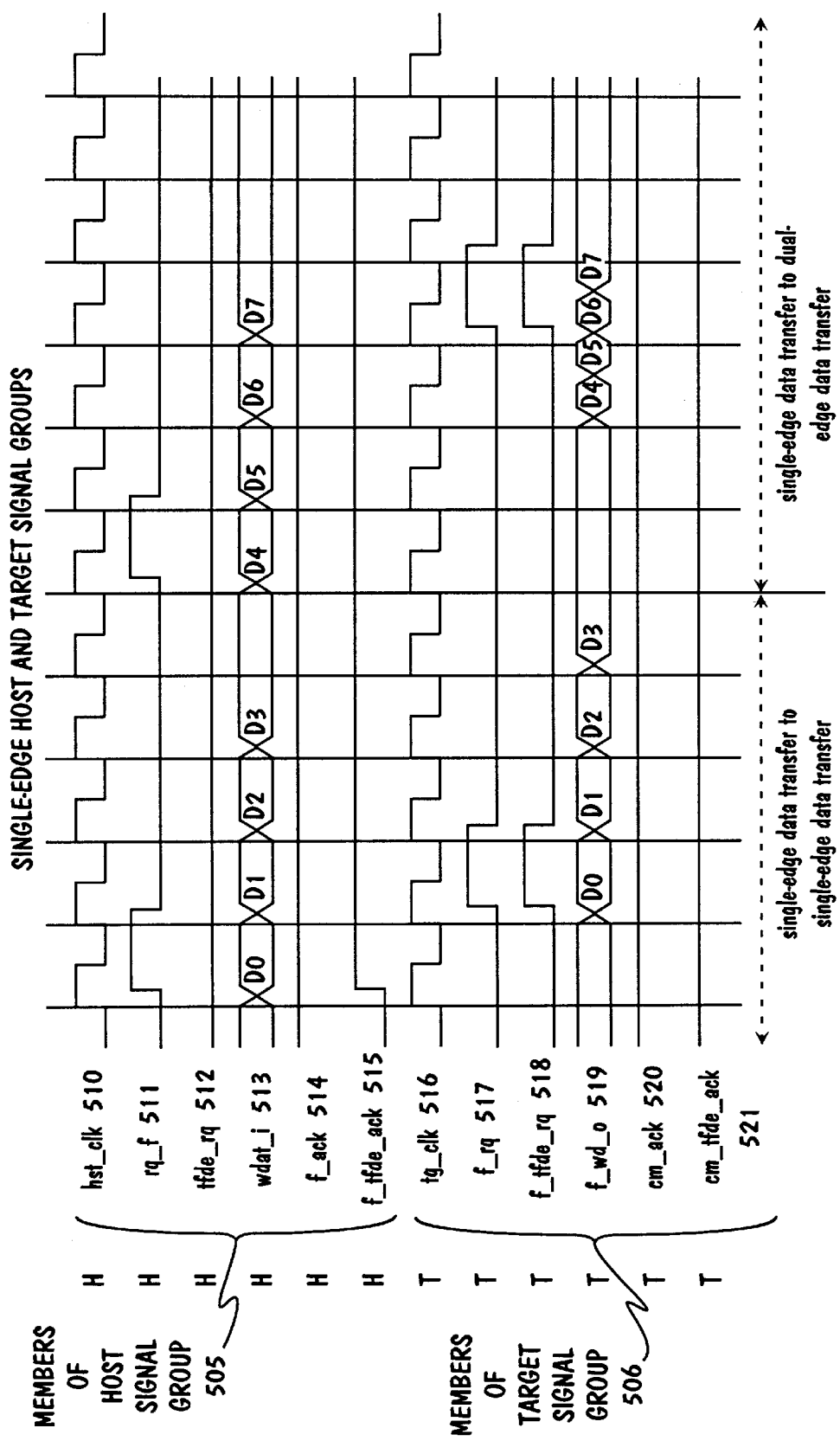
FIG. 36 is a diagrammatic representation illustrating a timing diagram showing signal timing for a host and target signals for single-edge data transfer to single-edge data transfer and for single-edge data transfer to dual-edge data transfer.

FIG. 36 is a timing diagram showing signal timing for a host signal group 505 and a target signal group 506 for single-edge data transfer to single-edge data transfer (see left-hand portion of timing diagram) and for single-edge data transfer to dual-edge data transfer (see right-hand portion of timing diagram). The host group signals are the signals that are generated and/or sent by the host side 408 and are as described in Table III. The target group signals are the signals that are generated and/or sent by the target side 413 and are as described in Table IV. The designations D0, D1, D2, D3, D4, D5, D6, D7 refer to data phases. Typically, data may be 8 bits, 16 bits, 32 bits, 64 bits, or more. In FIG. 36, the host write data (wdat_i) signal 513 is a single-edge data transfer while the FIFO write data out (f_wd_o) 519, the output of the FIFO, is a dual-edge data transfer.

Figure 37:
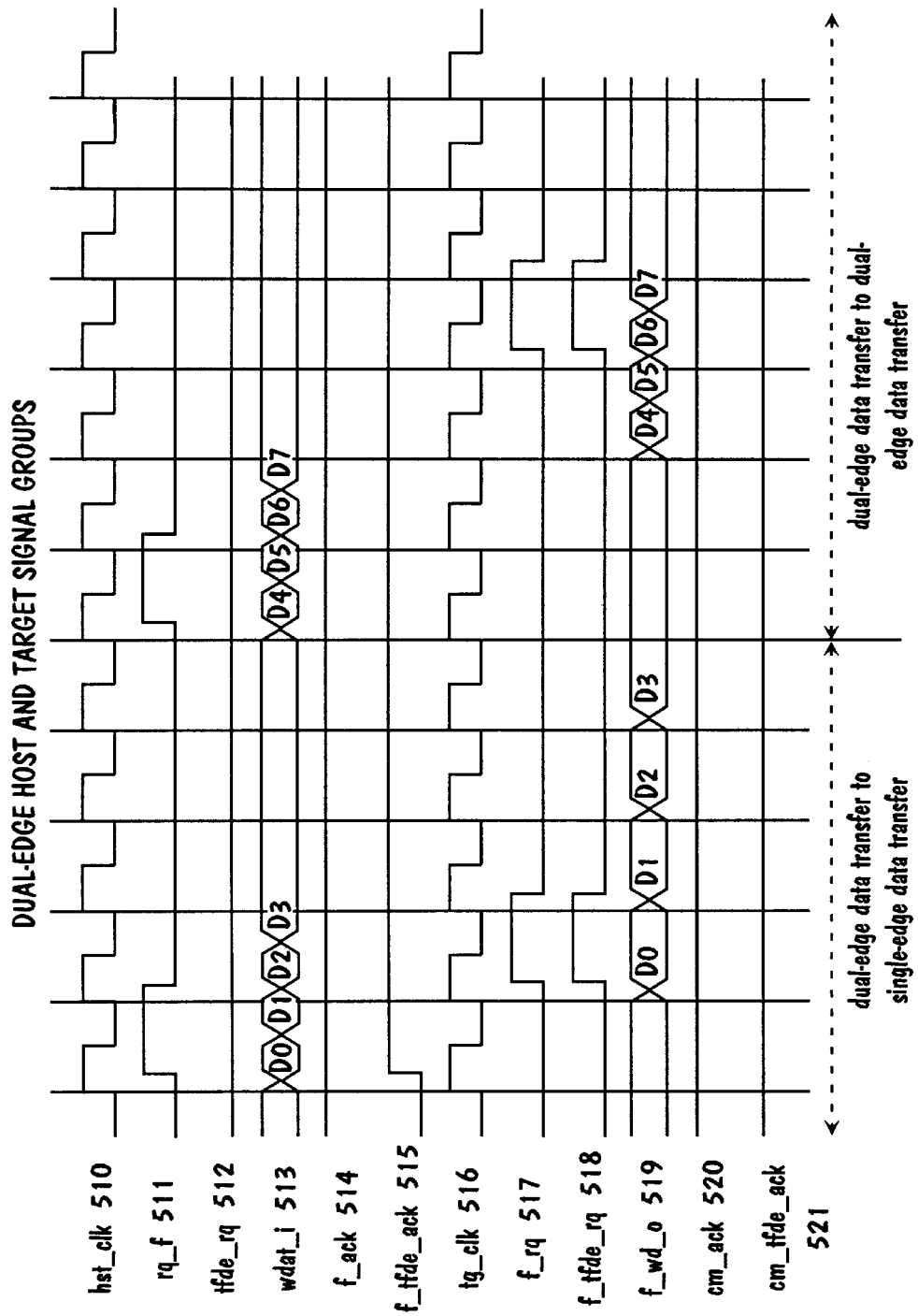
FIG. 37 is a diagrammatic representation illustrating a timing diagram showing signal timing for a host and target signals for dual-edge data transfer to single-edge data transfer and for dual-edge data transfer to dual-edge data transfer.

FIG. 37 is a timing diagram showing signal timing for a signal member of host signal group 505 and signal member of a target signal group 506 for dual-edge data transfer to single-edge data transfer (see left-hand portion of timing diagram) and for dual-edge data transfer to dual-edge data transfer (see right-hand portion of timing diagram). FIG. 37 provides a timing diagram analogous to that illustrated in FIG. 36 except that it shows signal and signal timing for dual-edge data transfer to single-edge data transfer (see left-hand portion of timing diagram) and for dual-edge data transfer to dual-edge data transfer (See right-hand portion of timing diagram). One notable difference between the signal timing in FIG. 36 and FIG. 37 is that in FIG. 37, the host transfers D0, D1, D2, D3 data phases on a dual-edge clock while the target receives these same data phases at one-half the rate as it is only capable of single-edge operation.

Figure 38:
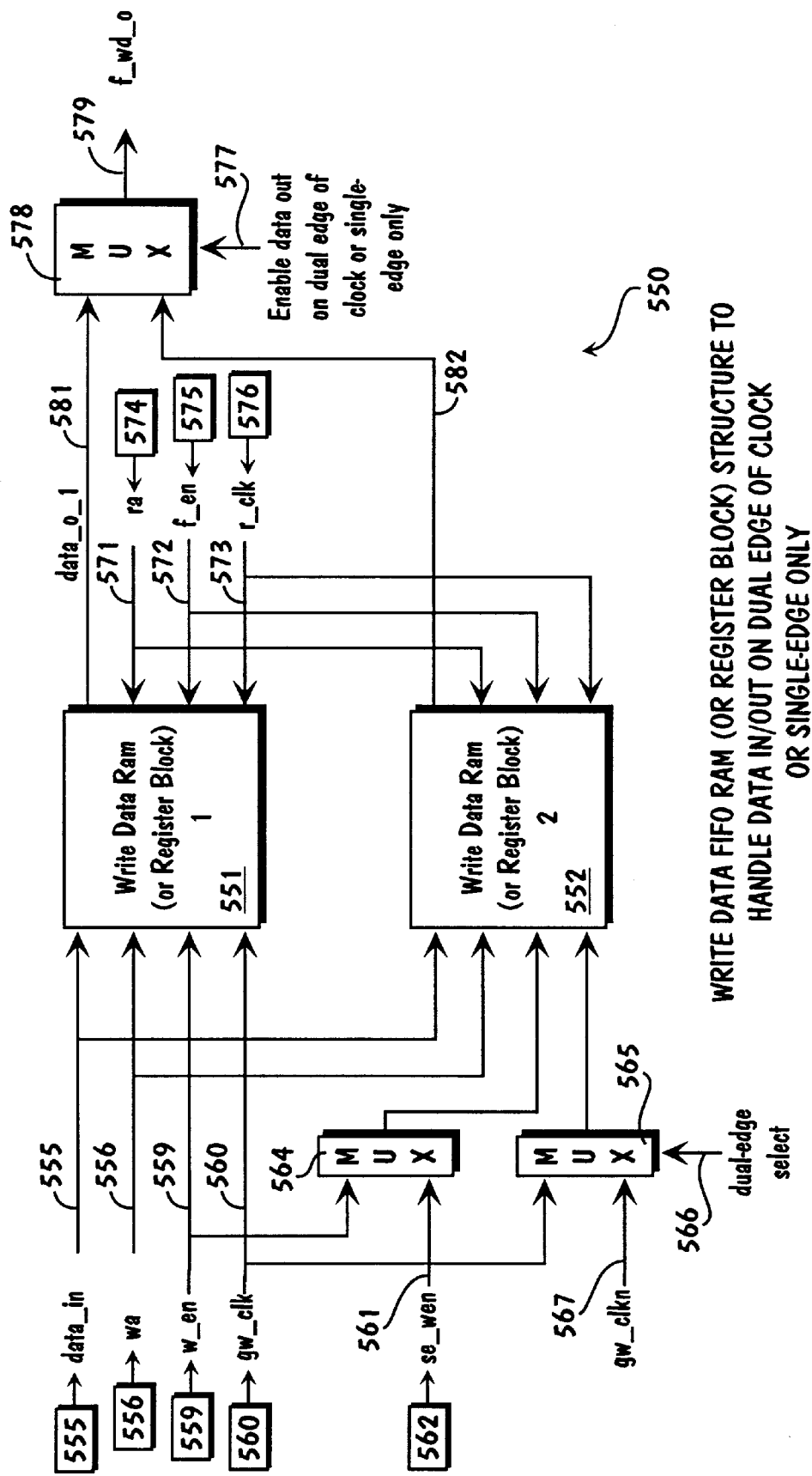
FIG. 38 is a diagrammatic representation of an embodiment of a Write Data FIFO RAM (WDFIFO) handling data I/O on dual-edge or single-edge clock signal.

FIG. 38 illustrates an exemplary embodiment of a Write Data FIFO RAM (or Register Block) structure 550 to handle data in/out on dual-edge clock or single-edge clock. First and second write data RAMs 551,552 each receive input data (data_in) 553. The data_in 553 is stored in first write data RAM 551 with the positive edge of the gated write clock signal (gw_clk) 558, where the gated write clock signal is generated by the clock gate circuit. This clock gate circuit is described in greater detail elsewhere in this application. Control signals, including write address control signal (wa) 554 and write enable control signal (wr_en) 557, are generated by the FIFO control state machine circuit. A second write data RAM 552 can be configured to operate as an extension of first write data RAM 551 by selecting the multiplexers 564, 565 via the dual-edge select signal 566 which is generated by a configuration register. In this exemplary configuration the write enable signal 557 and the gated clock signal 558 operate to store data with the positive edge of the gated write clock signal in the second write data RAM 552 in a similar manner as for the write data RAM 551 described earlier. By selecting the multiplexers (muxes) 564,565 via the dual-edge select signal 566 to select the control signals (se_wen) 561 and the "gated clock signal" (gw_clkn) 567, data is stored in second write data RAM 552 with the positive edge of the "gated clock not" signal (gw_clkn) 567 which is the version of the gated clock signal (gw_clk) 558. This means that data is stored in the second write data RAM 552 with a negative edge of the gated clock signal (gw_clk) 558.

The data output of the FIFOs is read out with the read clock signal (r_clk) 573 and the control signals read address (ra) 571 and read enable (r_en) 572 supplied by the FIFO control state machine. The data output from write data RAM 551, referred to as data out 1 (data_o_1) 581, corresponds to positive edge data only. The data output coming from the second write data RAM 552, referred to as data out 2 (data_o_2) 582, is positive edge or negative edge sample data depending on the write operation selected via multiplexers 564, 565 as described above. The output multiplexer 577 is control by the state machine depending on the dual edge or single edge configuration mode register bit dual edge select signal 566.

Figure 39:
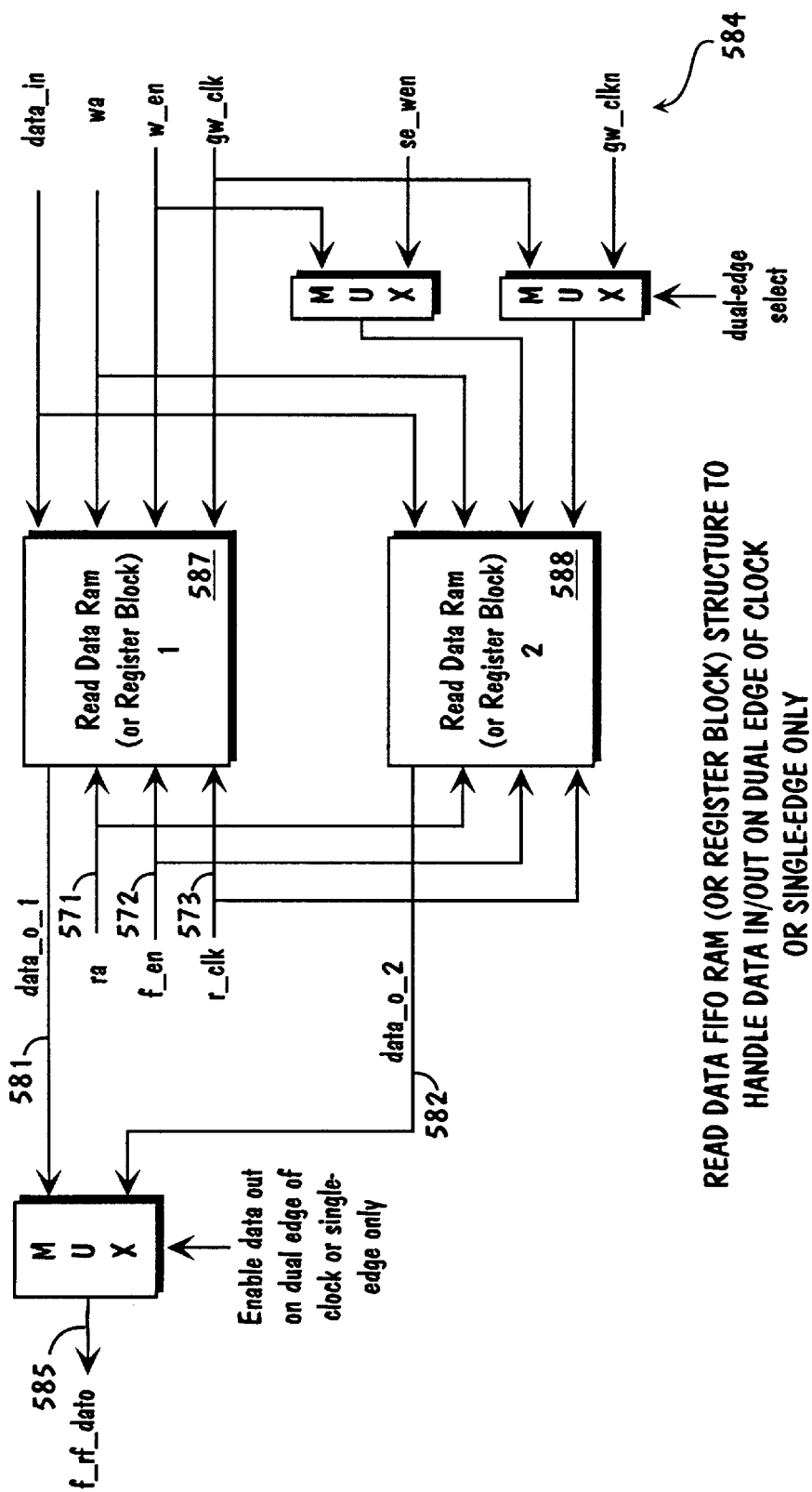
FIG. 39 is a diagrammatic representation of an embodiment of a Read Data FIFO RAM (RDFIFO) handling data I/O on dual-edge or single-edge clock signal.

FIG. 39 illustrates an exemplary embodiment of a Read Data FIFO RAM (or Register Block) structure 584 to handle data in/out on dual-edge clock or single-edge clock only. This is a different physical buffer for read operations and effectively operates in the reverse direction relative to the write buffer in FIG. 38. It is readily apparent from the structure and the signals, that the structure and operation is very much similar to that just described for the write data FIFO RAM 550 in FIG. 38, except that the read data RAM generates a read FIFO data (f_rf_dato) signal 585 at its output 586, in response to an enable data out signal (e_out) 590.

The inventive dual-edge FIFO features provide and/or support: (i) Parameterized synchronous or asynchronous FIFO, (ii) Parameterized RAM size and RAM data bus width, (iii) Parameterized data rate transfer (either singular (positive) edge clocking or dual-edge clocking), (iv) configurable to support different combinational Write Parameter RAM and Write Data RAM, or Write Parameter RAM and Read Data RAM, or write data RAM only without read; (v) Flushing of current FIFO request, and flushing of entire FIFO requests may be used in case error occurs; and (vi) Parameterized control bit register "enough space acknowledge" (req_esp_ack) to indicate FIFO go-ahead to request target access even if not all write data is in the memory yet.
Host Write Cycle And Parameter.

Figure 42:
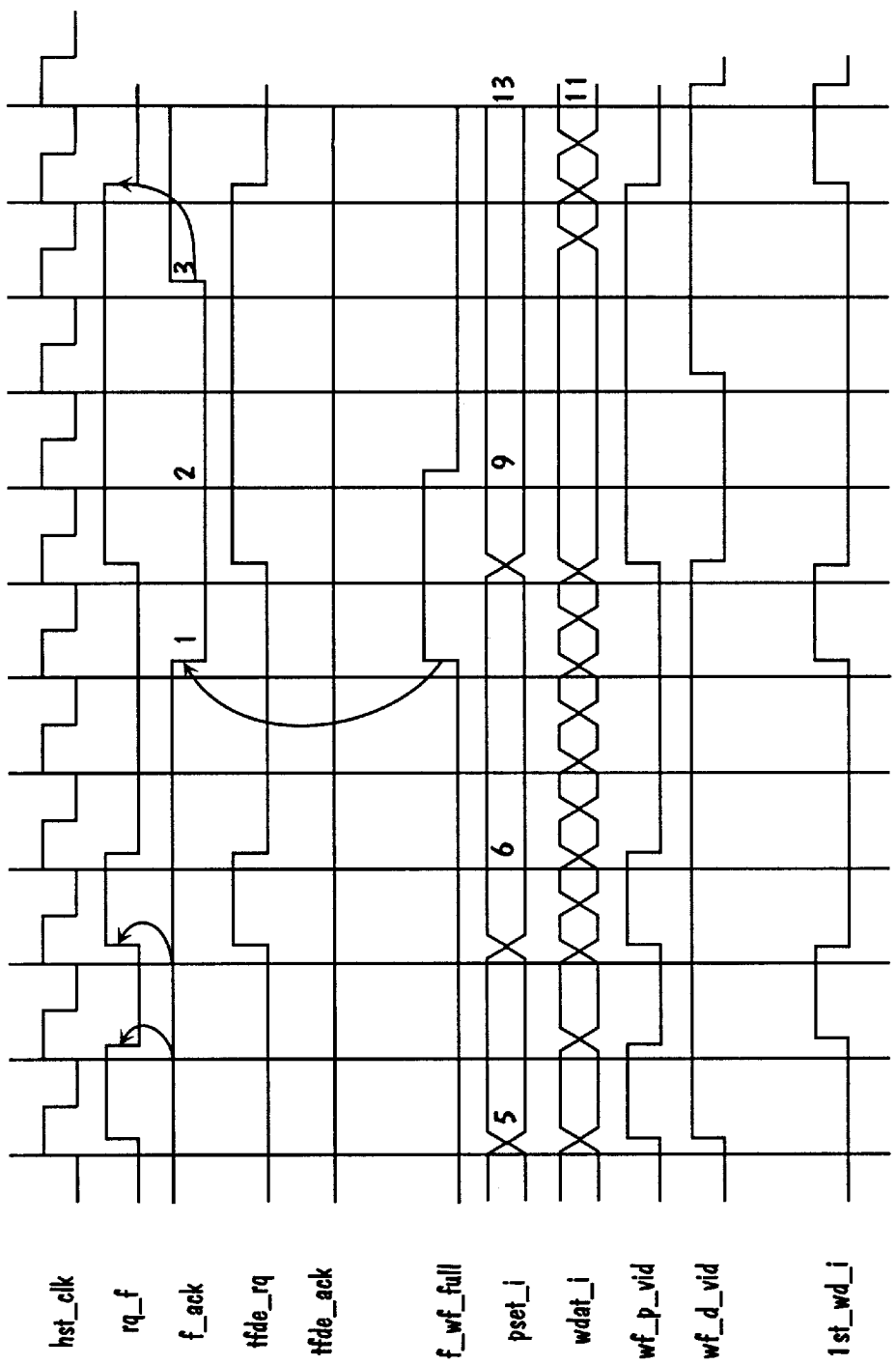
FIG. 42 is an exemplary signal timing diagram showing among other features, the host interface timing for the host request to send data into the write FIFO.

We now describe operation during a host write cycle relative to the diagram in FIG. 42. The host initiates a write cycle request by asserting a request to access FIFO signal (rq_f) and keeping it until FIFO asserts FIFO acknowledges request from host (f_ack). Host makes parameter set (address, command, byte enable, burst size, burst request, burst type) and write data available during asserting request to access FIFO (rq_f) by asserting Host parameter set valid (wf_p_vld) and Host write data valid (wf_d_vld). Host wants to transfer data rate on both clock edges by asserting request transfer data rate on dual edge of clock (tfde_rq) and keeping it until FIFO asserts FIFO acknowledges request from host (f_ack). If FIFO asserts FIFO acknowledges transfer data rate host request (tfde_ack) that indicates FIFO can accept data transfer rate on both edges of clock.

If single write back-to-back, host keeps asserting request to access FIFO (rq_f) and makes parameter set and write data available in every request. If burst write cycle, after FIFO asserts FIFO acknowledges request from host (f_ack), host deasserts request to access FIFO (rq_f) and at the same time loading next write data into FIFO by asserting Host write data valid (wf_d_vld). Write operations should not be performed into the FIFO when it is full, as data will be lost.

After the FIFO becomes not empty, a data transfer request is initiated from FIFO to the target by asserting FIFO request to access target (f_rq) or by asserting FIFO request data transfer rate on dual edges of clock (f_tfde_rq) if data transfer rate on both edges of clock and keeping it until target core module asserts target core module acknowledge FIFO request (cm_ack). If burst write cycle, after target asserts Target core module acknowledge FIFO request (cm_ack), FIFO deasserts FIFO request to access target (f_rq) and at the same loading next write data from FIFO if target asserts Target core module indicates it can accept next write data from FIFO (cm_ok_nxwdo). Host can write data into FIFO simultaneously it transfer data out to target core module
Host Read Cycle Operation Having described the Host write cycle operation, we now turn our attention to operation during a host read cycle relative to the diagram in FIG. 44. Host initiates a read cycle request by asserting request to access FIFO (rq_f) and keeping it until FIFO asserts FIFO acknowledges request from host (f_ack). Host makes parameter set (address, command, byte enable, burst size, burst request, burst type) available during asserting request to access FIFO (rq_f) by asserting Host parameter set valid (wf_p_vld). Host asserts Request transfer data rate on dual edge of clock (tfde_rq) if it want to have data transfer rate on both edges of clocks.

Whenever target core module has read data valid, it asserts Target core module indicates read data host request is valid (cm_rdat_vld), then read FIFO latches read data Target core module read data (cm_rdat_i) on the next clock and assert FIFO not empty, data valid in read FIFO (f_rf_not_empty). No more read data should be sent to the read FIFO if it is full as indicated by the Read data FIFO full (f_rdf_full=1). Host starts reading data out from read FIFO by asserting Host indicates reading data out from read FIFO (rd_i) whenever read FIFO is not empty.

Figure 40:
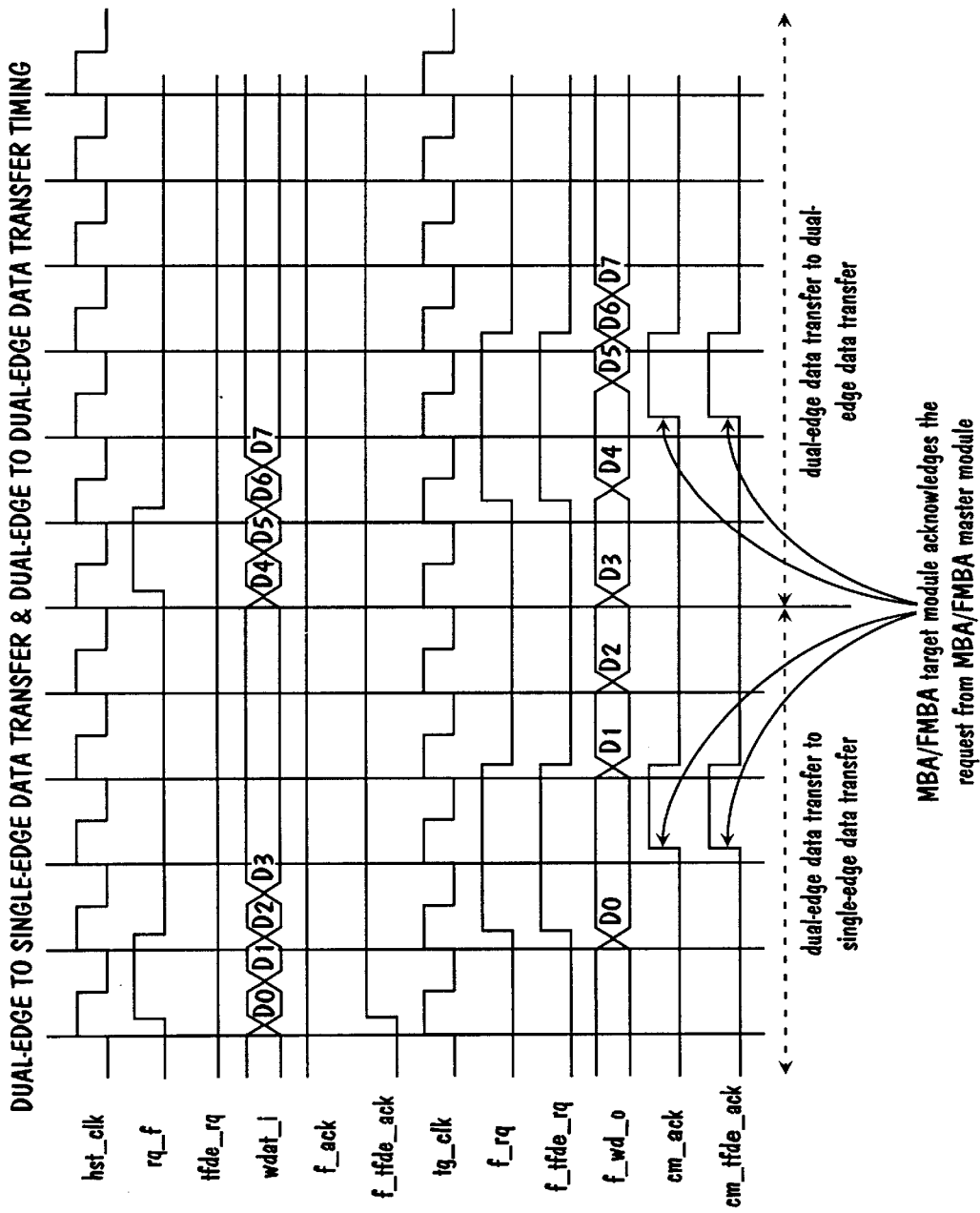
FIG. 40 is an exemplary signal timing diagram for a dual-edge to single-edge data transfer and dual-edge to dual-edge transfer timing.
Figure 41:
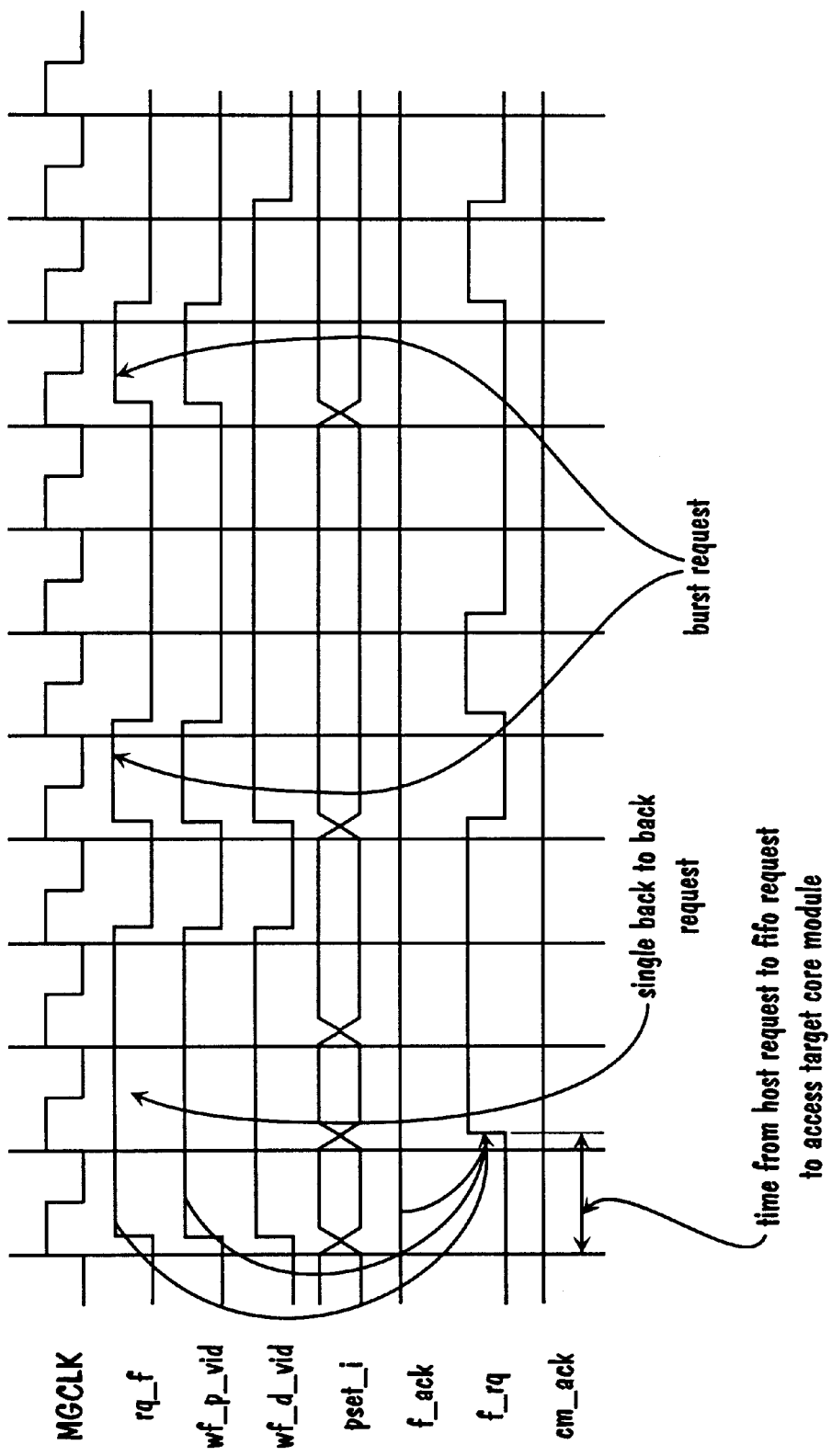
FIG. 41 is an exemplary signal timing diagram showing the relationship between the time of the host request to the time of FIFO request to access target core module, the timing of the single back to back request, and the burst request.

The timing diagrams shown in FIGS. 40–46 illustrate other functional and operational features of the inventive structure and method. FIG. 40 is an exemplary signal timing diagram for a dual-edge to single-edge data transfer and dual-edge to dual-edge transfer timing. In FIG. 41 we show among other features, the relationship between the time of the host request to the time of FIFO request to access target core module, the timing of the single back to back request, and the burst request.

In FIG. 42 we show among other features, the host interface timing for the host request to send data into the write FIFO. At #1, the write FIFO is fall. At #2, the write FIFO is not full any more, but it does not have enough space to take all the data. At #3, the write FIFO has enough space to take all the data. At #4, the signal f_ox_nxwd_i is a "don't care" during data transfer on both clock edges. At #5, #6, and #9 the cycle has not finished yet and the bus value must be kept the same. At #11 and #13 the cycle has finished but no new cycle has begun so the bus value must be kept the same.

Figure 43:
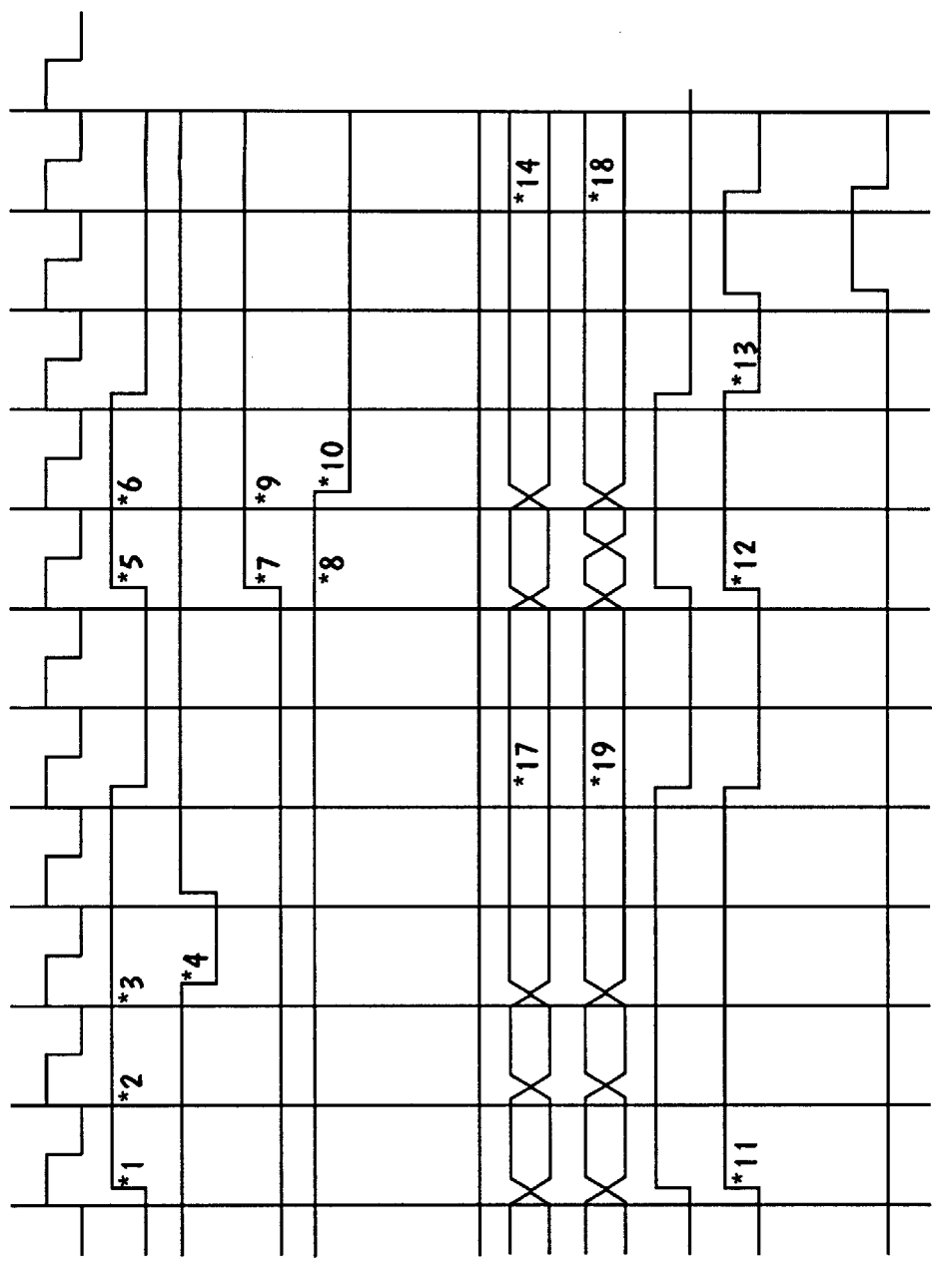
FIG. 43 is an exemplary signal timing diagram showing among other features, the host interface timing for back-to-back single write request.

In FIG. 43, we show among other features, the host interface timing for back-to-back single write request. At #*1, #*2, and #*3 occurrence of a back-to-back single write request. At #4, the core module request send data to master write FIFO, but it is not ready to accept the data. At #*5, #*7, and #*8, a burst write request and a data transfer rate on dual edges of the clock request are accepted. At #*6, #*9, and #*10, a burst write request and a both clock edge transfer rate are requested but not accepted. At #*11, the core module write data is valid. At #*14 the core module write data are not valid yet. At #*12, if the core module timing are critical, the signal cm_w does not have to be valid immediately, it can move to the next clock cycle. At #*14, #*16, #*17, and #*19, the cycle finishes, but no new cycle has begun yet, so all bus values must stay the same.

Figure 44:
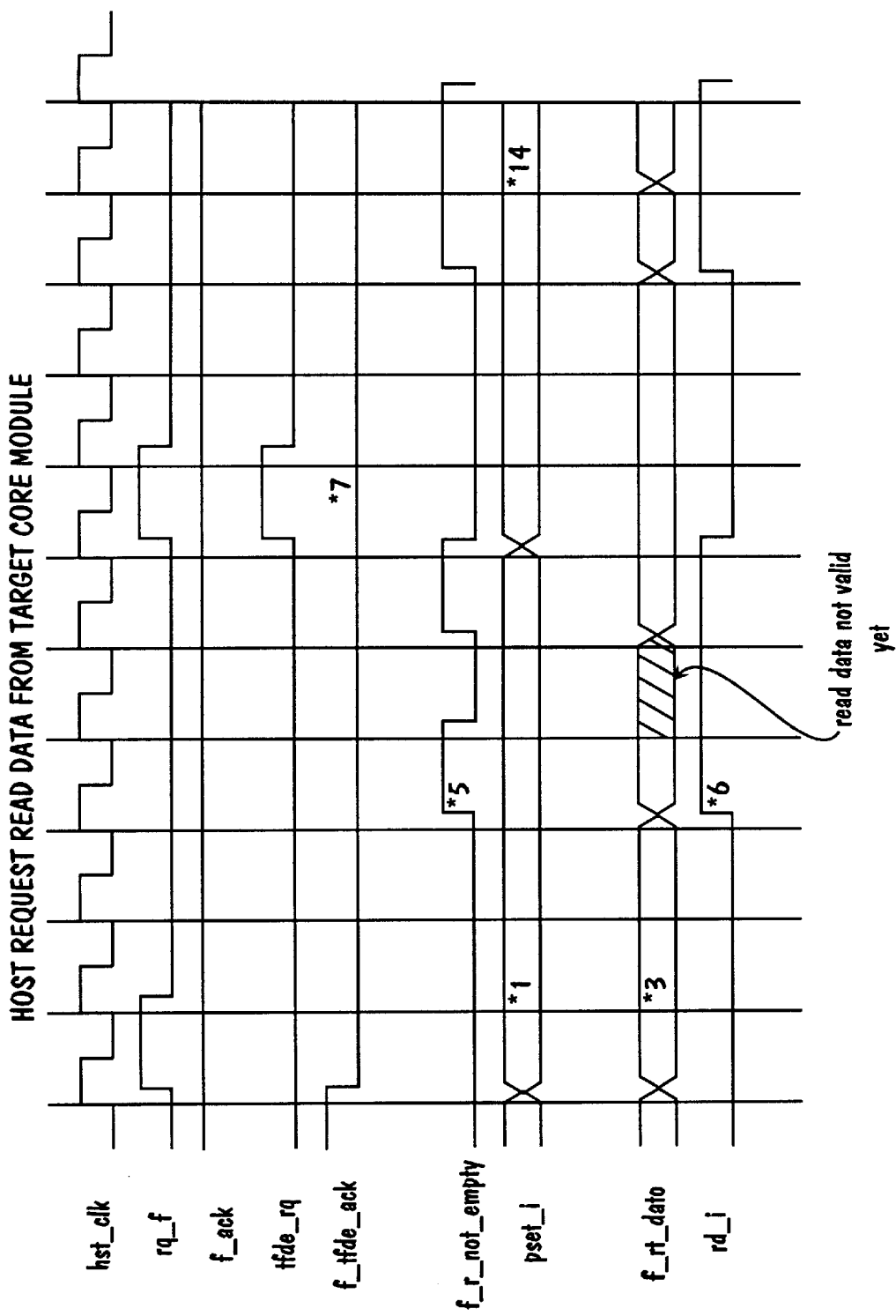
FIG. 44 is an exemplary signal timing diagram showing among other features, timing for a host request read data from target core module.

In FIG. 44, we show among other features, timing for a host request read data from target core module. At #1, the same bus value must be kept until the cycle finishes. At #3, the same data value must be kept until the read data is ready. At #5 and #6, the read FIFO enables the next read data out only when f_rf_not_empty=1 and rd_i=1. At #7, the host request data transfer rate on both clock edges, but the FIFO is not accepted.

Figure 45:
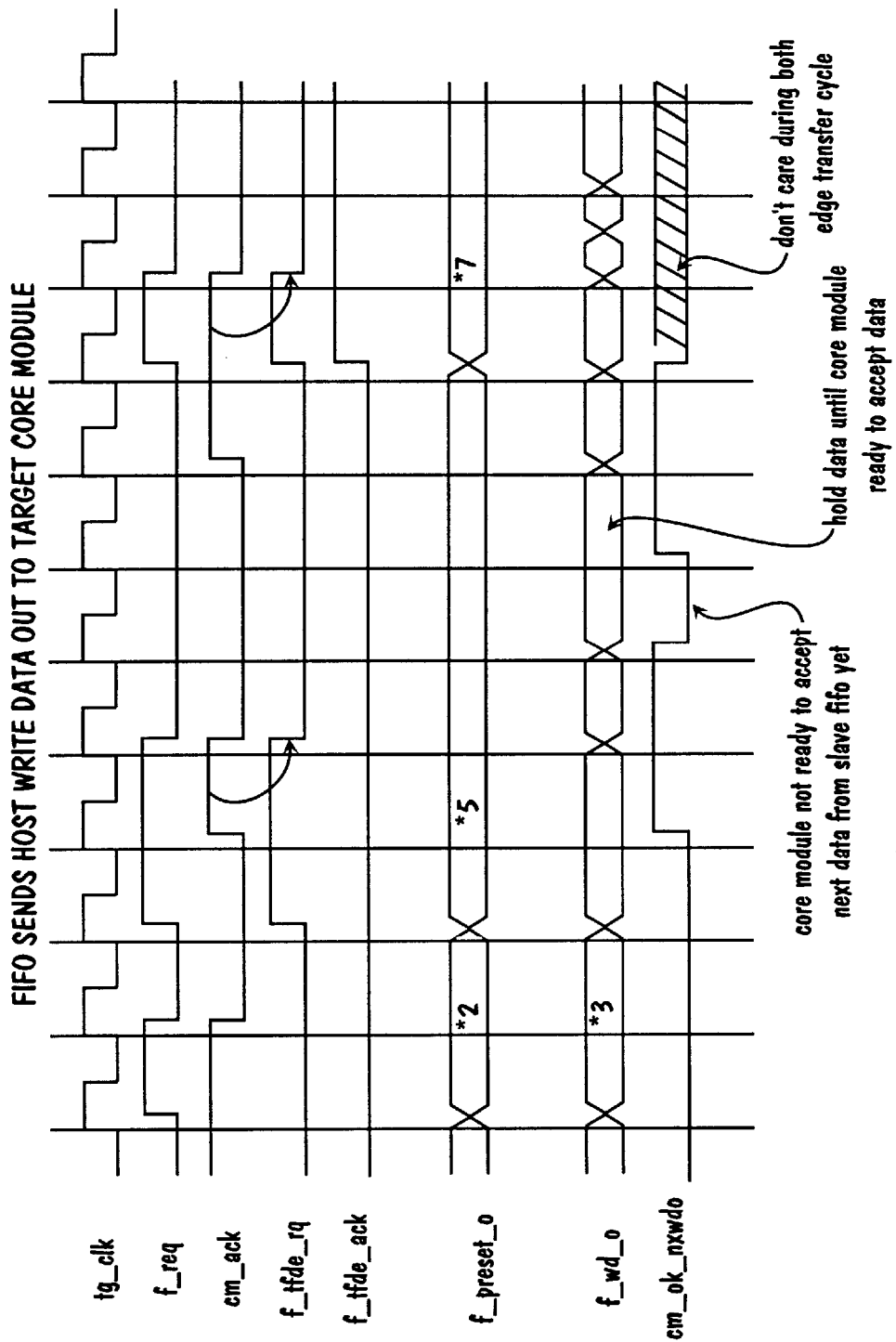
FIG. 45 is an exemplary signal timing diagram showing the target interface signal timing we show among other features, timing for the FIFO sending a host write data out to target core module.

In FIG. 45, for the target interface signal timing we show among other features, timing for the FIFO sending a host write data out to target core module. More particularly showing the relationship between the core module not ready to accept next data from the slave FIFO yet, the hold data until core module ready to accept next data, and the don't care region for the cm_ok_nxwdo signal. At #*2, #*3, #*5, and #*7 the same value must be kept until the new cycle is active.

Figure 46:
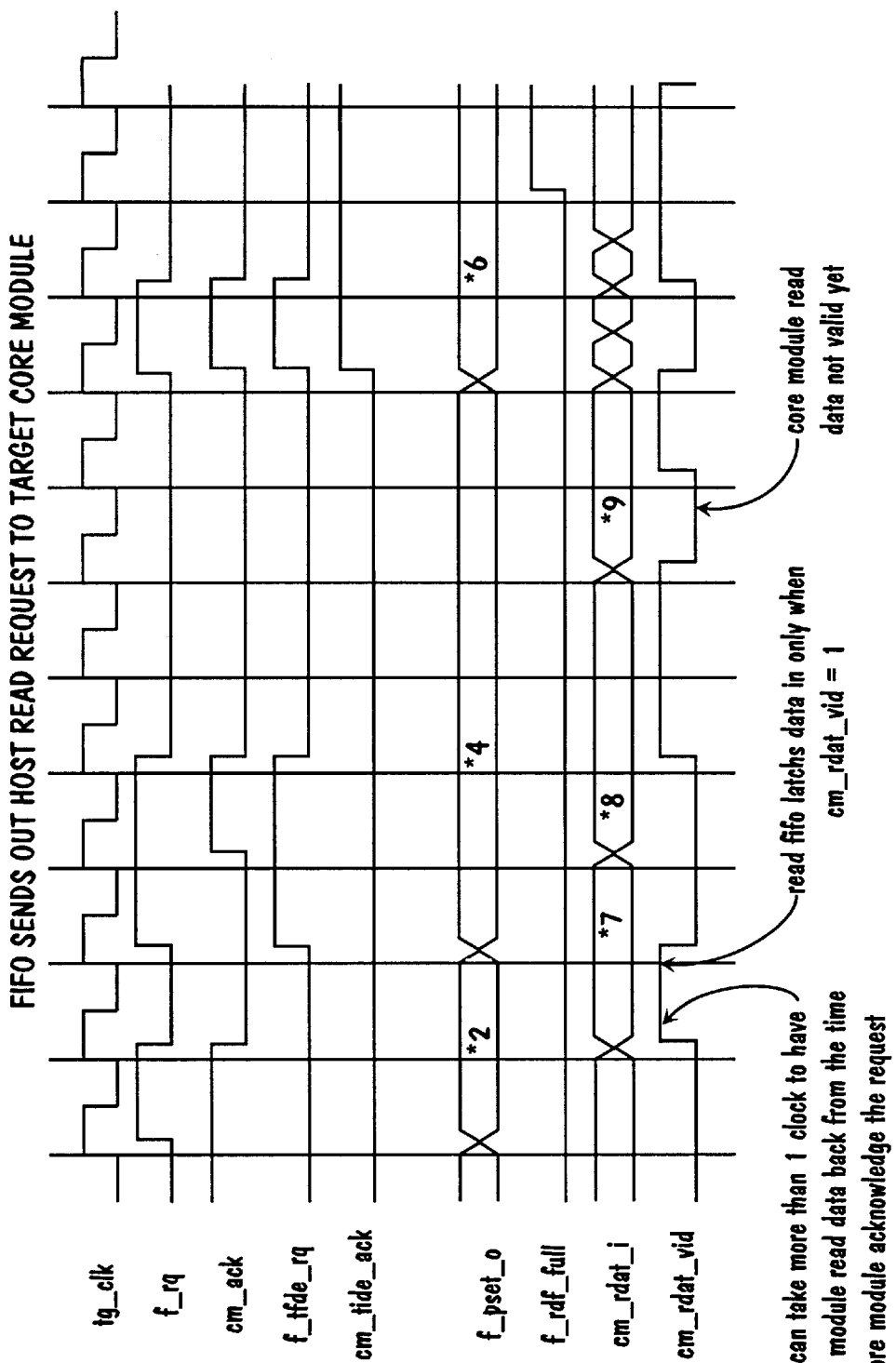
FIG. 46 is an exemplary signal timing diagram showing the target interface signal timing we show among other features, timing for the FIFO sending out host read request to the target core module.

In FIG. 46, for the target interface signal timing we show among other features, timing for the FIFO sending out host read request to the target core module. We particularly point out for the cm_rdat_vld signal that it can take more than one clock to have core module read data back from the time the core module acknowledges the request. The read FIFO latches data in only when cm_rdat_vld=1. At #*2, #*4, and #*6, the same value must be kept until a new request is active. At #*7 and #*9, the core module must hold the read data value until new request and new read data valid. At #*8, the core module must hold the read data value the same until the slave FIFO is ready to accept the enable next read data if the core module is ready.

Signal descriptions are provided in Tables III (Host Signal Group) and Table IV (Target Signal Group) below. All signals are desirably registered at the positive edge of the clock (for example as it comes out from Q-output of flip-flop), except any signal which starts with letter c0, c1, or c2 (which comes from a combination logic element).

TABLE III

Host Signal Group

| Signal Name | I/O | Clock Domain | Registered Required | Function |
|---|---|---|---|---|
| rq_f | I | hst_clk | yes | "1" Request to access FIFO |
| tfde_rq | I | hst_clk | yes | "1" Request transfer data rate on dual edge of clock |
| a_i | I | hst_clk | yes | [n:0] Host request address |
| be_i | I | hst_clk | yes | [n:0] Host request byte enable |
| cmd_i | I | hst_clk | yes | [n:0] Host request command |
| bstsize_i | I | hst_clk | yes | [n:0] Host request burst size |
| bstreq_1_i | I | hst_clk | yes | "0" Host request burst cycle |
| bsttype_i | I | hst_clk | yes | Host request burst type |
| wf_p_vld | I | hst_clk | yes | "1" Host parameter set valid |
| wf_d_vld | I | hst_clk | yes | "1" Host write data valid |
| 1st_wd_i | I | hst_clk | yes | "1" Host indicates burst last write data |
| wdat_i | I | hst_clk | yes | [n:0] Host write data |
| rd_i | I | hst_clk | yes | "1" Host indicates reading data out from read FIFO |
| reg_esp_ack | I | hst_clk or parametrize | yes | "1" Control register bit enable FIFO to acknowledge host request only when parameter FIFO has space available & write data FIFO has enough space to accept all write data in every clock. "0" Control register bit enable FIFO to acknowledge host request any time when parameter/write data FIFO has space available. It doesn't need to have enough space to accept all write data in every clock |
| hst_clk | I | hst_clk | yes | Write clock |
| f_ack | O | hst_clk | yes | "1" FIFO acknowledges request from host when FIFO has space available to take more data in. |
| f_tfde_ack | O | hst_clk | yes | "1" FIFO acknowledges transfer data rate host request |
| f_wf_full | O | hst_clk | yes | "1" FIFO indicates either parameter or write data FIFO is full (cannot accept any more data in). Data will be lost if keep writing data into FIFO when it is full |

TABLE III-continued

Host Signal Group

| Signal Name | I/O | Clock Domain | Registered Required | Function |
|---|---|---|---|---|
| f_ok_nxwd_i | O | hst_clk | yes | "1" FIFO indicates it can accept next write from host |
| f_rf_not_empty | O | hst_clk | yes | "1" FIFO not empty, data valid in read FIFO |
| f_rf_dato | O | hst_clk | yes | [n:0] Read data from read FIFO |

TABLE IV

Target Signal Group

| Signal Name | I/O | Clock Domain | Registered Required | Function |
|---|---|---|---|---|
| cm_ack | I | tg_clk | yes | "1" Target core module acknowledge FIFO request |
| cm_tfde_ack | I | tg_clk | yes | "1" Target core module acknowledge data transfer rate FIFO request |
| cm_ok_nxwdo | I | tg_clk | yes | "1" Target core module indicates it can accept next write data from FIFO |
| cm_rdat_vld | I | tg_clk | yes | "1" Target core module indicates read data host request is valid |
| cm_rdat_i | I | tg_clk | yes | [n:0] Target core module read data |
| tg_clk | I | tg_clk | yes | Read clock |
| f_rq | O | tg_clk | yes | "1" FIFO request to access target |
| f_tfde_rq | O | tg_clk | yes | "1" FIFO request data transfer rate on dual edges of clock |
| f_a_o | O | tg_clk | yes | [n:0] FIFO request address |
| f_be_o | O | tg_clk | yes | [n:0] FIFO request byte enable |
| f_cmd_o | O | tg_clk | yes | [n:0] FIFO request command |
| f_bstsize_o | O | tg_clk | yes | [n:0] FIFO request burst size |
| f_bstreq_1_o | O | tg_clk | yes | "0" FIFO request burst cycle |
| f_bsttype_o | O | tg_clk | yes | FIFO request burst type |
| f_wd_o | O | tg_clk | yes | [n:0] FIFO write data out |
| f_wd_vld | O | tg_clk | yes | "1" FIFO indicates write data valid (this signal is optionally used because in some systems the host cannot keep up write data transfer every clock or host write data may not be ready during the middle of transferring write data) |
| f_rdf_full | O | tg_clk | yes | "1" Read data FIFO full |

SYSTEM-ON-A-CHIP ARCHITECTURE AND DESIGN METHOD

As already described, aspects of the invention provide structure and method for a system-on-a-chip architecture based on the modular bus Architecture (MBA) or fast modular bus architecture (FMBA). The Architecture has embedded two added inventive methods for System Power Management when operating in the Active State: (1) MBA distributed power management; and (2) Dynamic task performance power management methods; in additional to any other power management or power conservation structure or method that may be implemented independent of its hardware, firmware, or software basis.

The MBA bus, and MBA bus Central Arbiter include the logic, and generate and respond to the signals required, to implement the above power management structures and methods (procedures). The MBA Architecture Frame is the back-bone to build battery operated Systems on a Chip. The MBA Architecture frame is parameterized, which permits a top-down design methodology.

Figure 47:
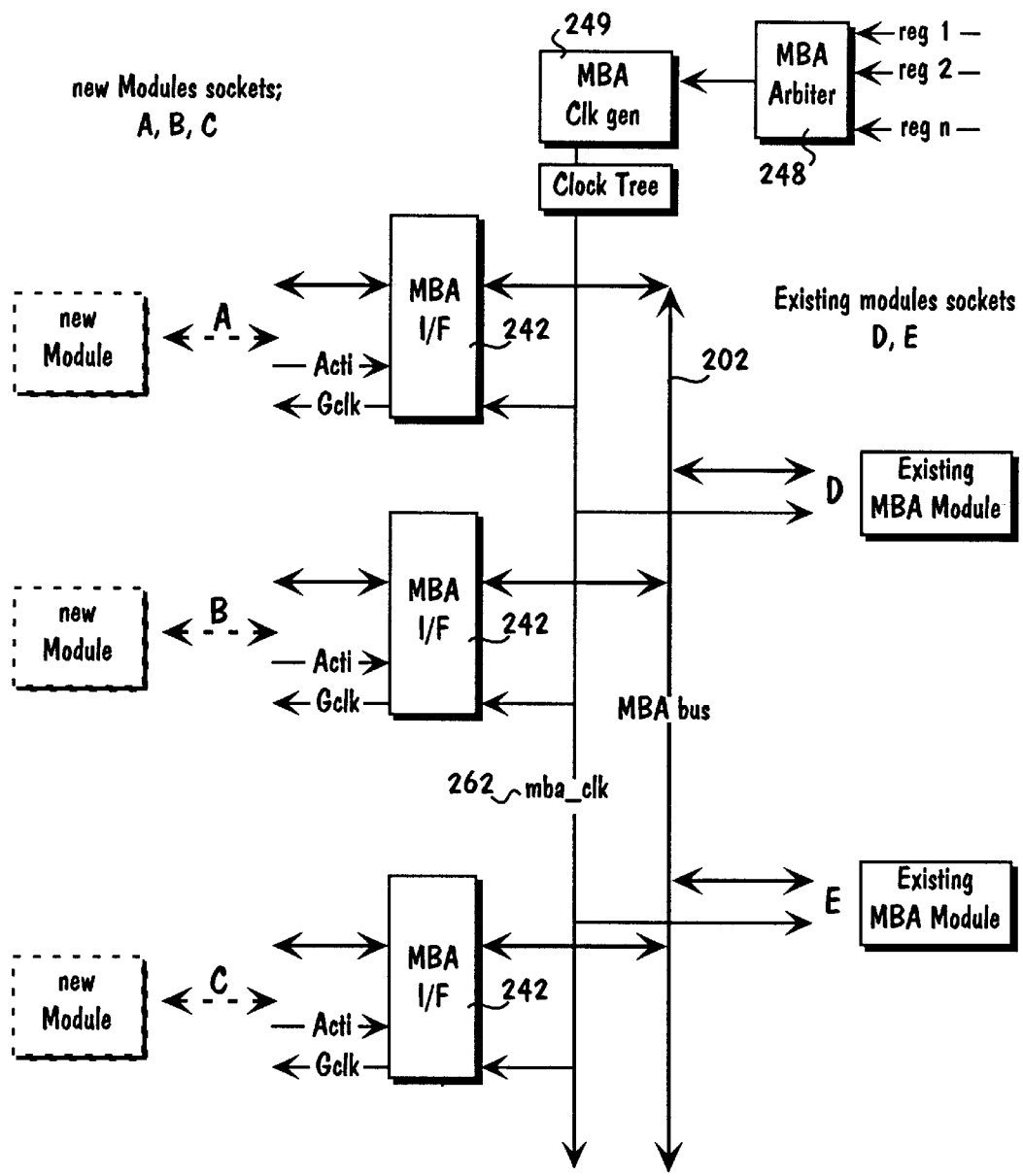
FIG. 47 is a diagrammatic representation of an alternative embodiment of the MBA architecture frame in the context of a system on a chip design prior to adding a RAMBUS controller.

The MBA Architecture Frame includes an MBA central Arbiter 248, MBA bus clock generator 249, MBA bus 202, and MBA bus Interface logic 242, as illustrated in FIG. 47. (See also an alternative embodiment of the MBA Frame in FIG. 21.)

This embodiment of the MBA Architecture Frame also includes within the MBA Arbiter and the MBA clock generator circuit means for implementing MBA dynamic task performance power management. It also contains the MBA I/F logic which includes the MBA clk gate.

The MBA architecture includes two types of sockets. The first type are referred to as "existing library modules" (type-1 modules). The second type of socket is referred to as a "new modules" (type-2 modules). Existing modules (type-1 modules) from the MBA module library plug-in sockets are identified as: D and E in FIG. 47. New modules (type-2 modules) plug-in sockets: A, B, C in FIG. 47. Other aspects and elements in the embodiment of FIG. 46 have already been described relative to FIG. 21.

The invention also provides a top-down design method within the MBA architectural frame already described. In one aspect, the inventive design method provides a procedure for designing a "new" system on a chip. In the description to follow, we describe an embodiment of the procedure which adds one new module, in this example, a RAMBUS memory controller, to the MBA frame. Those workers having ordinary skill in the art in light of this disclosure will however appreciate that the method may be extended to provide more than one module, or iterated to add multiple new modules sequentially, and that modules other than a RAMBUS memory controller may be adding in analogous manner.

It is noted that by "system-on-a-chip" we mean a single chip having all of the essential elements of a computer, except that memory may optionally be provided on one or more separate chips.

One embodiment of the inventive design method 800 is now described and includes the following steps:

Step 801- Get MBA Architecture Frame from MBA library.
Step 802- Configure Architecture Frame to have one new module socket, the rest of sockets will be modules from the MBA library.

-continued

| | |
|---|---|
| Step 803- | Configure memory and I/O system decode map on host bridge unit. |
| Step 804- | Configure new module MBA I/F logic, as master or slave, and as single edge or dual edge. |
| Step 805- | If the new module is a master module then configure new module tasks performance factors. |
| Step 806- | Configure new module register I/O space and memory space. |
| Step 807- | Compile design (In some embodiments, compilation step may wait until all modules have been added.) |
| Step 808- | Repeat Steps 801–807 if and as necessary to add additional modules. |
| Step 809- | Done. |

Figure 48:
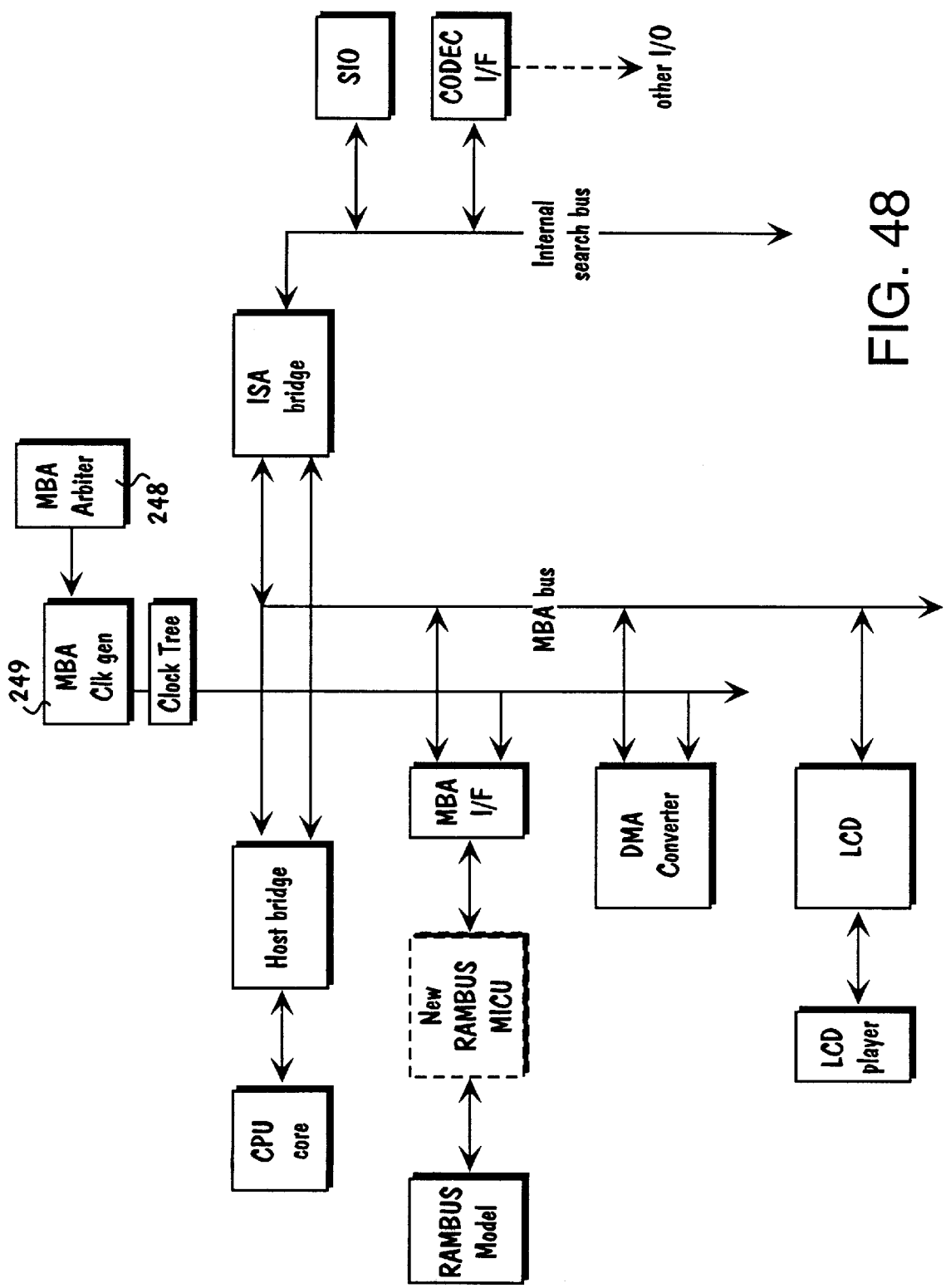
FIG. 48 is a diagrammatic representation of an alternative embodiment of the MBA architecture frame in the context of a system on a chip design after adding a RAMBUS controller.

The completed system will appear as shown in FIG. 48, after the RAMBUS controller has been added. The constituent elements have already been described relative to the illustration in FIG. 20, and the descriptions are not repeated here.

The inventive method may also optionally include simulation, testing, and fine tuning (for example, of the performance factors) if necessary or desired. The designer can start simulating the new memory controller by executing commands from the CPU, activating the DMA controller and LCD controller and evaluating overall system performance. Fine tune system task performance factors, if necessary. Selected or all performance factors may optionally be selectable under user control if desired by providing appropriate user interface, storage means, and the like.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. All publications and patent applications cited in this specification are herein incorporated by reference as if each individual publication or patent application were specifically and individually indicated to be incorporated by reference.

We claim:

1. In a computer system having a device, and a communications link for communicating with said device, a method for dynamically managing power consumption by said computer system comprising:

associating a particular device identifier with said device;

monitoring communications over said communications link to determine whether said communications include said particular device identifier;

withholding a clock input from said device when said communications do not include said particular device identifier; and providing said clock input to said device only when said communications include said particular device identifier;

said providing of said clock input causing said device to transition from a non-operational power conservative state to an operational state wherein said device consumes more power than in said non-operational state;

establishing a performance requirement for a task to be executed; and dynamically controlling a frequency of said clock input according to the performance requirement established for the task being executed.

2. A distributed power management apparatus for a computer system having a processor and at least one bus coupled for communication with said processor, said apparatus comprising:

a plurality of devices each having a particular unique device identifier and coupled for communication with said bus;

a plurality of monitoring circuits monitoring communications over said bus during each predetermined time period to determine any device identifiers broadcast over said bus during said predetermined time period and comparing said broadcast device identifiers to said particular unique device identifiers, each of said monitoring circuits being associated with only one of said devices and only one of said particular unique device identifiers; and a control circuit selectively controlling a device operating input to a particular device when none of said broadcast device identifiers match said unique particular device identifier, and for dynamically controlling a characteristic of said device operating input to its associated device when one of said broadcast device identifiers match said unique particular device identifier for its associated device.

3. The distributed power management apparatus in claim 2, wherein said dynamically controlling a characteristic comprises dynamically controlling a frequency of a clock device operating input according to a performance requirement established for a task being executed.

4. In a computer system having a device, and a communications link for communicating a broadcast device identifier to said device, said computer system operating to perform a plurality of overlapping tasks in a multi-tasking environment, a method for managing power consumption in said computer system comprising:

associating a unique device identifier with said device;

monitoring communications over said communications link, by said device, during a time period to determine broadcast device identifiers contained within said monitored communication;

comparing said broadcast device identifier with said unique device identifier associated with said device to determine whether said broadcast device identifiers match said unique device identifier for said device;

controlling a device operating input to said device in response to said broadcast device identifier matching or not matching said unique device identifier associated with said device; and providing said device operating input to said device only when said broadcast device identifier matches said unique device identifier for said device;

modifying a characteristic of said operating input in response to performance requirements associated with a task using said device for said task;

said computer system operating to perform a plurality of substantially simultaneous operational tasks in a multi-tasking environment, broadcasting said unique device identifier only during a time period in which said device is actually being accessed by said computer system, independent of whether a particular processing task using said device associated with said unique device identifier during said time period has been completed; and controlling said characteristic to match said performance requirement during a time period in which said device is actually being accessed by said computer system to perform said task associated with said performance requirement.

* * * * *